(12) United States Patent
Yasutomi et al.

(10) Patent No.: US 12,311,451 B2
(45) Date of Patent: May 27, 2025

(54) CUTTING METHOD AND CUT ARTICLE

(71) Applicant: NIPPON STEEL CORPORATION, Tokyo (JP)

(72) Inventors: Takashi Yasutomi, Tokyo (JP); Akinobu Kobayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 858 days.

(21) Appl. No.: 17/438,056

(22) PCT Filed: Jan. 9, 2020

(86) PCT No.: PCT/JP2020/000526
§ 371 (c)(1),
(2) Date: Sep. 10, 2021

(87) PCT Pub. No.: WO2020/183882
PCT Pub. Date: Sep. 17, 2020

(65) Prior Publication Data
US 2022/0250177 A1    Aug. 11, 2022

(30) Foreign Application Priority Data

Mar. 12, 2019  (JP) ............................... 2019-044628
Mar. 12, 2019  (JP) ............................... 2019-044629
Mar. 12, 2019  (JP) ............................... 2019-044631

(51) Int. Cl.
*B23D 15/08*   (2006.01)
*B21D 28/14*   (2006.01)
(Continued)

(52) U.S. Cl.
CPC ............. *B23D 15/08* (2013.01); *B21D 28/14* (2013.01); *B21D 28/26* (2013.01); *B21D 28/34* (2013.01); *B23D 35/001* (2013.01)

(58) Field of Classification Search
CPC ........ B23D 15/08; B21D 28/02; B21D 28/14; B21D 28/26; B21D 28/34; B21D 35/001; B21D 35/002; B26D 28/16
(Continued)

(56) References Cited

U.S. PATENT DOCUMENTS 4,362,078 A  * 12/1982  Ohnishi ................. B21D 28/06
                                                                    83/862
4,370,910 A     2/1983  Suzuki et al.
(Continued)

FOREIGN PATENT DOCUMENTS

JP         60-232812 A    11/1985
JP         1-255117 A     10/1989
(Continued)

OTHER PUBLICATIONS

Kada et al., "Advanced Forming Analysis for Bar and Wire Rod with Finite Element Method", Nippon Steel Technical Report, Nippon Steel Corporation, Mar. 2007, No. 386, pp. 59-63.

*Primary Examiner* — Jennifer S Matthews
(74) *Attorney, Agent, or Firm* — Birch, Stewart, Kolasch & Birch, LLP

(57) ABSTRACT

There is provided a cutting method for cutting a workpiece using a cutting tool comprising a die and a punch, including: arranging the workpiece between the die and the punch, and in a state in which a wedge-shaped first cutting part of the die and a wedge-shaped second cutting part of the punch are opposed, pushing the punch relatively to the die side to cut the workpiece; wherein: a front end angle $\theta_1$ of the first cutting part and a front end angle $\theta_2$ of the second cutting part are each 10° or more and 120° or less, and a front end radius $R_1$ of the first cutting part and a front end radius $R_2$ of the second cutting part are each 0.5% or more and 35.0% or less of a sheet thickness.

14 Claims, 33 Drawing Sheets

(51) Int. Cl.
*B21D 28/26* (2006.01)
*B21D 28/34* (2006.01)
*B23D 35/00* (2006.01)

(58) Field of Classification Search
USPC .......................................... 83/671, 693, 692
See application file for complete search history.

(56) References Cited

U.S. PATENT DOCUMENTS

| | | | |
|---|---|---|---|
| 11,247,257 B2 * | 2/2022 | Glueck | ................ B21D 35/001 |
| 2018/0272408 A1 | 9/2018 | Yasutomi et al. | |

FOREIGN PATENT DOCUMENTS

| | | | | |
|---|---|---|---|---|
| JP | 2000-108077 A | 4/2000 | | |
| JP | 2004-34183 A | 2/2004 | | |
| JP | 2006-315123 A | 11/2006 | | |
| JP | 2008-155219 A | 7/2008 | | |
| JP | 2012-101258 A | 5/2012 | | |
| JP | 2017-87294 A | 5/2017 | | |
| JP | 2018-75600 A | 5/2018 | | |
| JP | 2020-32437 A | 3/2020 | | |
| WO | WO-2013167232 A1 * | 11/2013 | ............. B21D 28/10 | |
| WO | WO 2016/027288 A1 | 2/2016 | | |
| WO | WO 2017/057466 A1 | 4/2017 | | |

* cited by examiner

FIG. 27
| | lateral (cross-sectional) |
|---|---|
| Comparative Example | 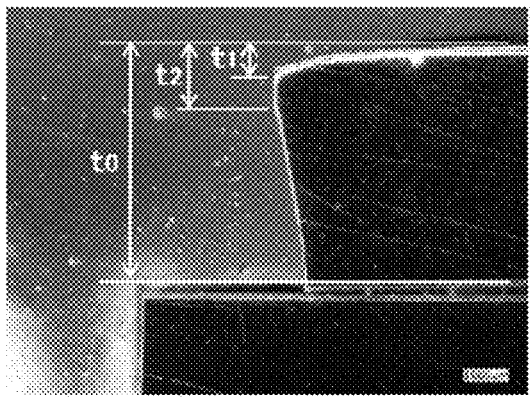 |
| Example A1 ($R_1 = R_2 = 0.05mm$) | 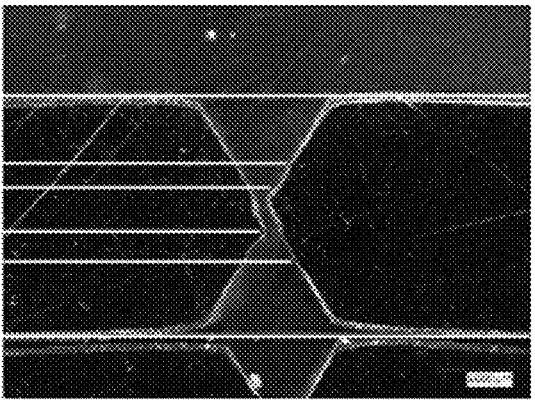 |
| Example A2 ($R_1 = R_2 = 0.5mm$) | 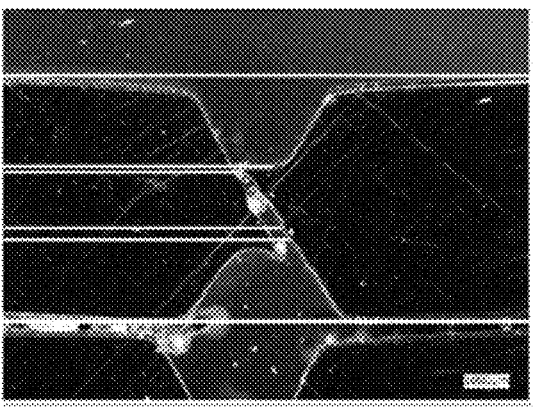 |

FIG. 30
| Case | cutting edge shape | cut end face shape |
|---|---|---|
| Reference Example | left-right symmetry $\begin{pmatrix} \theta_{1a}=\theta_{2a}=30° \\ \theta_{1b}=\theta_{2b}=30° \end{pmatrix}$ | 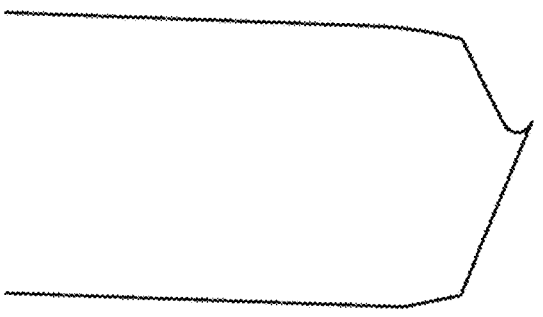 |
| Example G1 | left-right asymmetry $\begin{pmatrix} \theta_{1a}=\theta_{2a}=45° \\ \theta_{1b}=\theta_{2b}=30° \end{pmatrix}$ | 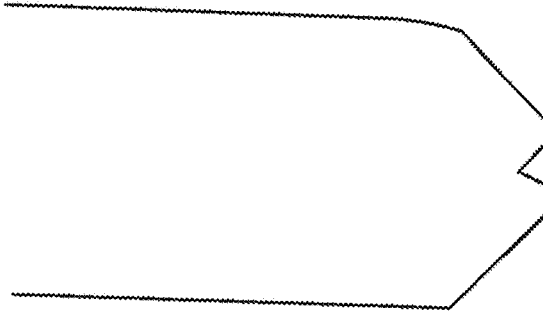 |
| Example G2 | left-right asymmetry $\begin{pmatrix} R_{1a}=R_{2a}=0.5mm \\ R_{1b}=R_{2b}=0.05mm \end{pmatrix}$ | 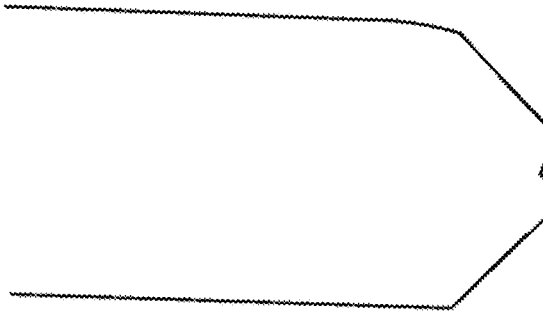 |

FIG. 31
| Case | RW[mm] | cutting edge shape |
|---|---|---|
| Comparative Example H1 | 0.2 | 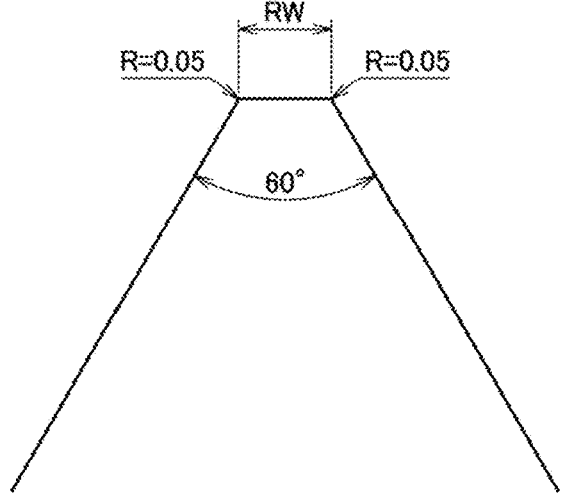 |
| Comparative Example H2 | 0.02 | 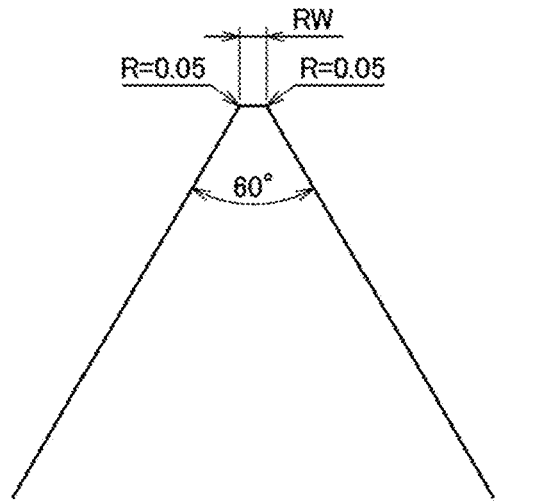 |
| Example | 0 | 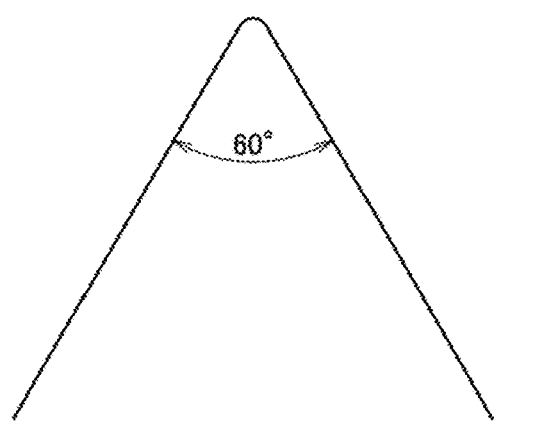 |

FIG. 32
| Case | cutting edge shape | pre-cutting | analysis results | cutting |
|---|---|---|---|---|
| Reference Example | straight line | — | 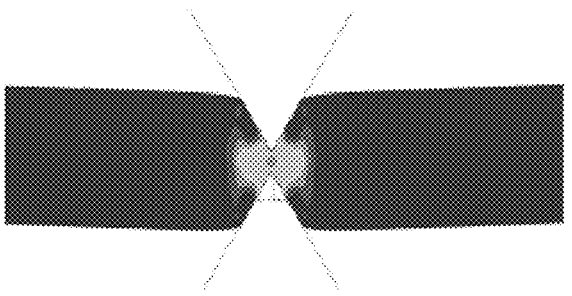 | ○ |
| Comparative Example | circle | No | 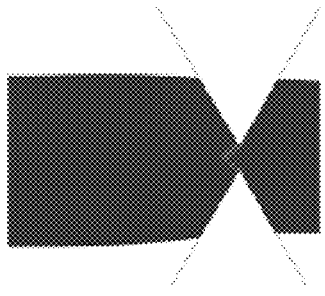 | × |
| Example | circle | Yes | 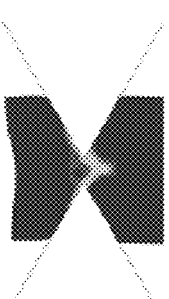 | ○ |

CUTTING METHOD AND CUT ARTICLE

TECHNICAL FIELD

The present invention relates to a cutting method for cutting a workpiece, and a cut article which was cut and formed by the cutting method.

BACKGROUND ART

Various kinds of surface-treated materials are produced according to the applications, such as a plated metal sheet for which the surface of a metallic material has been subjected to a plating treatment, or a painted metal sheet for which the surface of a metallic material has been painted. For example, plated steel sheets which are excellent in corrosion resistance are utilized for building materials, automobiles, and household electrical appliances.

Components which use a surface-treated material that was produced by subjecting a workpiece to a surface treatment are manufactured, for example, by cutting the workpiece that was subjected to the surface treatment, and thereafter processing the cut workpiece. Cutting of a workpiece 5 can be performed, for example, by cutting the workpiece 5 using a shearing tool 10 as illustrated in FIG. 35. The shearing tool 10 is composed of a die 11, a punch 12 and a blank holder 13. For example, in a state in which one end of the workpiece 5 is restrained by the die 11 and the blank holder 13, the punch 12 which has been placed to have a clearance d with respect to the die 11 is moved relatively to the die 11 side to apply a shearing force to the workpiece 5. By this means, the workpiece 5 is cut.

The workpiece 5 which was subjected to a surface treatment that was cut using the shearing tool 10 illustrated in FIG. 35 has a cut end face as illustrated in FIG. 36. The cut end face of the workpiece 5 is composed of a shear drop, a shear surface, and a fracture surface. The shear drop is a deformation caused by a tensile force acting on the top surface of the workpiece 5 when, with respect to the workpiece 5 in which the surface of a metallic material 5a as the base material has been covered with a coating layer 5b, the punch 12 illustrated in FIG. 35 is pushed down from the top surface side toward the bottom surface side of the workpiece 5. The shear surface is a smooth surface formed by movement of the punch 12 which sunk into the workpiece 5, and the fracture surface is a surface at which cracks that arose in the workpiece 5 served as rupture starting points and the workpiece 5 ruptured. As illustrated in FIG. 36, at the cut end face of the workpiece 5, although the coating layer 5b remains at the shear drop portion, almost none of the coating layer 5b remains at the shear surface, and the metallic material 5a is exposed at the fracture surface.

In this regard, at the cut end face of the workpiece 5, the corrosion resistance of the shear surface and the fracture surface at which the metallic material 5a is almost fully exposed is low, and there is a concern that red rust may occur. For example, sacrificial protection by a plated metal layer or chemical treatment are commonly employed as measures for preventing rust at the cut end face of a plated metal sheet in which a plated metal layer is formed on the surface of a metallic material. For example, Patent Document 1 discloses that a cutting process is performed so that, within a range of 0.10 times or more of the sheet thickness in the sheet thickness direction, the size of a shear drop of a cut end face falls within a range of 0.45 times or more of the sheet thickness in the flat surface direction. A tensile force and a shearing force applied to the metallic material are increased by such a cutting process, a plated metal layer coated on the surface of the base metal material is caused to go around to the cut end face, and at least one part of the shear surface of the cut end face is covered with the plated metal layer. The occurrence of red rust at the cut end face is suppressed by a sacrificial protection action of the plated metal layer that went around to the cut end face.

Further, Patent Document 2 discloses a method in which a surface-treated steel sheet is cut with a rotary blade that is shifted upward and downward, and thereafter the end face is subjected to a processing using a forming roll.

In addition, Patent Document 3 discloses a laminated substrate cutting method in which a laminated substrate is transferred to and placed in a press tooling composed of an upper blade mold having an upper blade with a V-shaped front end cross-section, and a lower blade mold having a lower blade that has the same shape structure as the upper blade and that faces the upper blade mold, and is cut by the upper blade and the lower blade when a moving operation is performed by the upper blade mold or the upper blade mold and the lower blade mold.

Further, Patent Document 4 discloses a method for manufacturing an electric contact in which an outer covering composed of a material having favorable weldability is adhered to a wire rod to form a linear contact material, and by shearing the contact material through the outer covering with a cutter that has a cutting edge having a wedge-shaped cross section whose top surface is inclined, the outer covering is plastically deformed and a coating of the material having favorable weldability is formed on the shear surface of the wire rod, and the wire rod is joined to the contact base metal through the shear surface. A recess is provided partway along the slope of the top surface of the cutting edge.

LIST OF PRIOR ART DOCUMENTS

Patent Document

Patent Document 1: JP2017-87294A
Patent Document 2: JP2018-075600A
Patent Document 3: JP2006-315123A
Patent Document 4: JPH1-255117A
Patent Document 5: WO 2016/027288
Patent Document 6: JP2012-101258A
Patent Document 7: JP2008-155219A Non Patent Document Non-Patent Document 1: Osamu KADA, and two others, "Advanced Forming Analysis for Bar and Wire Rod with Finite Element Method", Nippon Steel Technical Report, Nippon Steel Corporation, March 2007, No. 386, p. 59-63

SUMMARY OF INVENTION

Technical Problem

However, in the aforementioned Patent Document 1, the plated metal layer on the surface of the base metal material only covers at least one part of the shear surface of the cut end face, and the base metal material remains exposed at the fracture surface. Consequently, the corrosion resistance of the cut end face of the plated metal sheet is not sufficient. Further, in general, when it is attempted to impart an excessive sacrificial protection property to the cut end face for the purpose of rust prevention, the plating on the surface of the plated metal sheet decreases, and the surface corrosion resistance at the surface of the plated metal sheet (that is, the flat surface corrosion resistance) decreases.

Further, in the aforementioned Patent Document 2, the plating coverage is increased by performing two processes, namely, a process for cutting a surface-treated steel sheet, and a process for forming an end face portion of the surface-treated steel sheet that was cut. However, because it is necessary to perform a plurality of processes, the equipment cost increases. Further, in the technique described in Patent Document 2, after cutting the surface-treated steel sheet with a rotary blade that is shifted upward and downward, the shape of the end face portion is adjusted, and consequently, because stress is imparted in different directions in the respective processes, cracking or peeling is liable to occur in the plating layer. In addition, in the technique described in Patent Document 2, it is necessary to cause a greater amount of the plating layer to flow from the surface side in order to cover the end face of the steel sheet which is the base material. Consequently, there is a possibility that a defect such as cracking of the plating at the outer layer or localized thinning of the plating may occur, or the plating may flow onto the surface of the steel sheet to which an oxide coating or contamination has adhered, resulting in poor adhesion of the plating.

In addition, in the aforementioned Patent Document 3, the front end of the cutting edge has a flat portion as illustrated in FIG. 2(a). Therefore, when a laminated substrate is cut using such a tool, the plating is split when the blade bites into the laminated substrate, and the cut end face is not covered with the plating. Further, because the state at the end of cutting is one in which the material is crushed, it is difficult to cut the laminated substrate in a single process, or to impart sufficient damage to the laminated substrate in a first process and perform cutting to make the cut end face into a desired shape in the next process.

Furthermore, in the aforementioned Patent Document 4, the objective is to cause the plating of the wire rod to cover the end face thereof during cutting. As illustrated in FIG. 1 and FIG. 2 of Patent Document 4, although one side of the blade of the cutter in question is an inclined face, the other side is a substantially vertical face, and thus the shape has remarkably high asymmetry. When the blade bites into the wire rod, the blade and the wire rod come in contact at a point, and consequently almost no force is generated in the direction perpendicular to the direction in which the blade advances. Therefore, when the workpiece is a wire rod, it is possible to cut the workpiece even in the case of the cutting edge shape illustrated in Patent Document 4. On the other hand, in the case of cutting a workpiece that is a tabular material, the blade and the workpiece contact each other in the form of a line. Therefore, in the case of the cutting edge shape shown in Patent Document 4, a large force arises in the direction perpendicular to the direction in which the blade advances, and the load on the blade increases. Although in a case where the workpiece is extremely soft relative to the blade, such as in the case of a resin workpiece, the load that arises at the blade in question does not constitute a problem, in the case of cutting a material that has a certain strength or more, such as a metal material, the durability of the blade is caused to markedly deteriorate.

Therefore, the present invention has been made in view of the problems described above, and an objective of the present invention is to provide a novel and improved cutting method and cutting tool which, with respect to cutting of a workpiece, are capable of suppressing the occurrence of a situation in which the performance which the workpiece has is reduced after the cutting.

Solution to Problem

According to an embodiment of the present invention, there is provided a cutting method for cutting a workpiece using a cutting tool comprising a die and a punch, which includes arranging the workpiece between the die and the punch, and in a state in which a wedge-shaped first cutting part of the die and a wedge-shaped second cutting part of the punch are opposed, pushing the punch relatively to the die side to cut the workpiece; wherein: a front end angle $\theta_1$ of the first cutting part and a front end angle $\theta_2$ of the second cutting part are each 10° or more and 120° or less, and a front end radius $R_1$ of the first cutting part and a front end radius $R_2$ of the second cutting part are each 0.5% or more and 35.0% or less of a sheet thickness.

The workpiece may be a multi-layer material formed by coating a surface of a base material with a coating material.

The front end angle $\theta_1$ of the first cutting part and the front end angle $\theta_2$ of the second cutting part may be each 30° or more and 90° or less.

The front end radius $R_1$ of the first cutting part and the front end radius $R_2$ of the second cutting part may be each 1.5% or more and 10.0% or less of a sheet thickness.

The cutting of the workpiece may be performed by a plurality of cutting processes.

The plurality of cutting processes may include a first cutting process, and a second cutting process that is performed after the first cutting process; and in the second cutting process, at least one of the following may be performed: a front end angle $\theta_1$ of the first cutting part in the second cutting process is made smaller than a front end angle $\theta_1$ of the first cutting part in the first cutting process, and a front end angle $\theta_2$ of the second cutting part in the second cutting process is made smaller than a front end angle $\theta_2$ of the second cutting part in the first cutting process, and thereafter the workpiece may be cut.

Moreover, the plurality of cutting processes may include a first cutting process, and a second cutting process that is performed after the first cutting process; and in the second cutting process, at least one of the following may be performed: a front end radius $R_1$ of the first cutting part in the second cutting process is made smaller than a front end radius $R_1$ of the first cutting part in the first cutting process, and a front end radius $R_2$ of the second cutting part in the second cutting process is made smaller than a front end radius $R_2$ of the second cutting part in the first cutting process; and thereafter the workpiece may be cut.

Moreover, among the plurality of cutting processes, when a front end radius of the first cutting part is defined as $R_1$, a front end radius of the second cutting part is defined as $R_2$, and a sheet thickness of the workpiece is defined as t, a stroke S of the punch in a first cutting process may satisfy expression (A) below:

$$(R_1+R_2) \leq S \leq \{t-(R_1+R_2)\} \tag{A}$$

A trimming width of the workpiece is a distance between one end portion of the workpiece and a cutting position of the workpiece, and when a front end radius of the first cutting part is defined as $R_1$, a front end radius of the second cutting part is defined as $R_2$, and a sheet thickness of the workpiece is defined as t, a trimming width D of the workpiece may satisfy expression (B) below:

$$R \leq D \leq 3t \tag{B}$$

$R = \text{Min}(R_1, R_2)$.

A wedge-shaped first cutting part of the die and a wedge-shaped second cutting part of the punch may have an asymmetrical shape with respect to a normal line at a cutting edge, respectively.

Here, a front end angle $\theta_1$ of the first cutting part is divided into two angles $\theta_{1a}$ and $\theta_{1b}$ by a normal line at a cutting edge of the first cutting part, a front end angle $\theta_2$ of the second cutting part is divided into two angles $\theta_{2a}$ and $\theta_{2b}$ by a normal line at a cutting edge of the second cutting part, and $(\theta_{1a}-\theta_{1b})$ or $(\theta_{1b}-\theta_{1a})$ that is an angular difference between the angle $\theta_{1a}$ and the angle $\theta_{1b}$, and $(\theta_{2a}-\theta_{2b})$ or $(\theta_{2b}-\theta_{2a})$ that is an angular difference between the angle $\theta_{2a}$ and the angle $\theta_{2b}$ may be each 5° or more and 45° or less.

Moreover, when a front end radius $R_1$ of the first cutting part is taken as an average value of respective front end radii $R_{1a}$ and $R_{1b}$ of the first cutting part that are formed when the front end radius $R_1$ is divided in two by a normal line at a cutting edge of the first cutting part, and a front end radius $R_2$ of the second cutting part is taken as an average value of respective front end radii $R_{2a}$ and $R_{2b}$ of the second cutting part that are formed when the front end radius $R_2$ is divided in two by a normal line at a cutting edge of the second cutting part, the front end radii $R_1$ and $R_2$ may be 0.5% or more and 35.0% or less of a sheet thickness, respectively.

A ratio $R_{1a}/R_{1b}$ or $R_{1b}/R_{1a}$ between two front end radii formed when the front end radius $R_1$ of the first cutting part is divided in two, and a ratio $R_{2a}/R_{2b}$ or $R_{2b}/R_{2a}$ between two front end radii formed when the front end radius $R_2$ of the second cutting part is divided in two may be each 1.1 or more and 100 or less.

Moreover, forming may include, from the workpiece, an intermediate material having a final shape region, and a surplus region provided along an edge of the final shape region; and using a cutting tool including a die and a punch in each of which a cutting part is formed in a closed shape in correspondence with the edge of the final shape region, in a state in which a wedge-shaped first cutting part of the die and a wedge-shaped second cutting part of the punch are opposed, pushing the punch relatively to the die side to cut the intermediate material.

According to another embodiment of the present invention, there is provided a cut article formed by cutting a workpiece, which includes a cut end face of the cut article comprises: a first inclined face that inclines from a first surface toward a center in a sheet thickness direction, a second inclined face that inclines from a second surface toward the center in the sheet thickness direction, and a fracture surface that is formed between the first inclined face and the second inclined face; and wherein a thickness of an inclined face when the cut end face is viewed from the front satisfies relational expression (C) below:

$$(T_1+T_2)<T \quad (C)$$

$T_1 = A_1 \cos\theta_1$, $T_2 = A_2 \cos\theta_2$ where, $T_1$ represents a thickness of the first inclined face when the cut end face is viewed from the front, $T_2$ represents a thickness of the second inclined face when the cut end face is viewed from the front, $A_1$ represents a length of the first inclined face when the cut end face is viewed from the side, $A_2$ represents a length of the second inclined face when the cut end face is viewed from the side, $\theta_1$ represents an inclination angle of the first inclined face, $\theta_2$ represents an inclination angle of the second inclined face, and T represents a sheet thickness of the workpiece.

A thickness $T_3$ of the fracture surface when the cut end face is viewed from the front may satisfy relational expression (D) below:

$$0 < T_3 \leq 0.5T \quad (D).$$

The workpiece may be a multi-layer material formed by coating a surface of a base material with a coating material, and at least one part of the first inclined face and the second inclined face may be coated with the coating material that covers the surface of the base material.

At least one part of the first inclined face may be coated with a coating material that covers the first surface of the base material, and at least one part of the second inclined face may be coated with a coating material that covers the second surface of the base material.

A sheet thickness t of the base material may be 0.2 mm or more and 10 mm or less.

Advantageous Effects of Invention

As described above, according to the present invention, when cutting a workpiece, the occurrence of a situation in which the performance which the workpiece has is reduced after cutting can be suppressed. For example, when cutting a workpiece which was subjected to a surface treatment, while maintaining the function of a coating material on a flat surface of the base material, the function of the coating material can also be caused to be realized on a cut end face.

BRIEF DESCRIPTION OF DRAWINGS

FIG. 27 is an explanatory drawing illustrating, with respect to the photographs shown in FIG. 25, a sheet thickness and a plating layer thickness of the plated metallic materials when the sheet thickness ratios in FIG. 26 were calculated.

FIG. 30 is an explanatory drawing schematically illustrating, as Example (G), the cut end faces of workpieces when the shape of the cutting edge of the cutting tool was changed.

FIG. 31 is a schematic diagram which, as Example (H), represents cutting edge shapes relating to the presence or absence of a flat portion at a front end of a cutting edge.

FIG. 32 is a view illustrating analysis results and whether or not a plated metallic material can be cut in Example (I).

DESCRIPTION OF EMBODIMENTS

Figure 1:
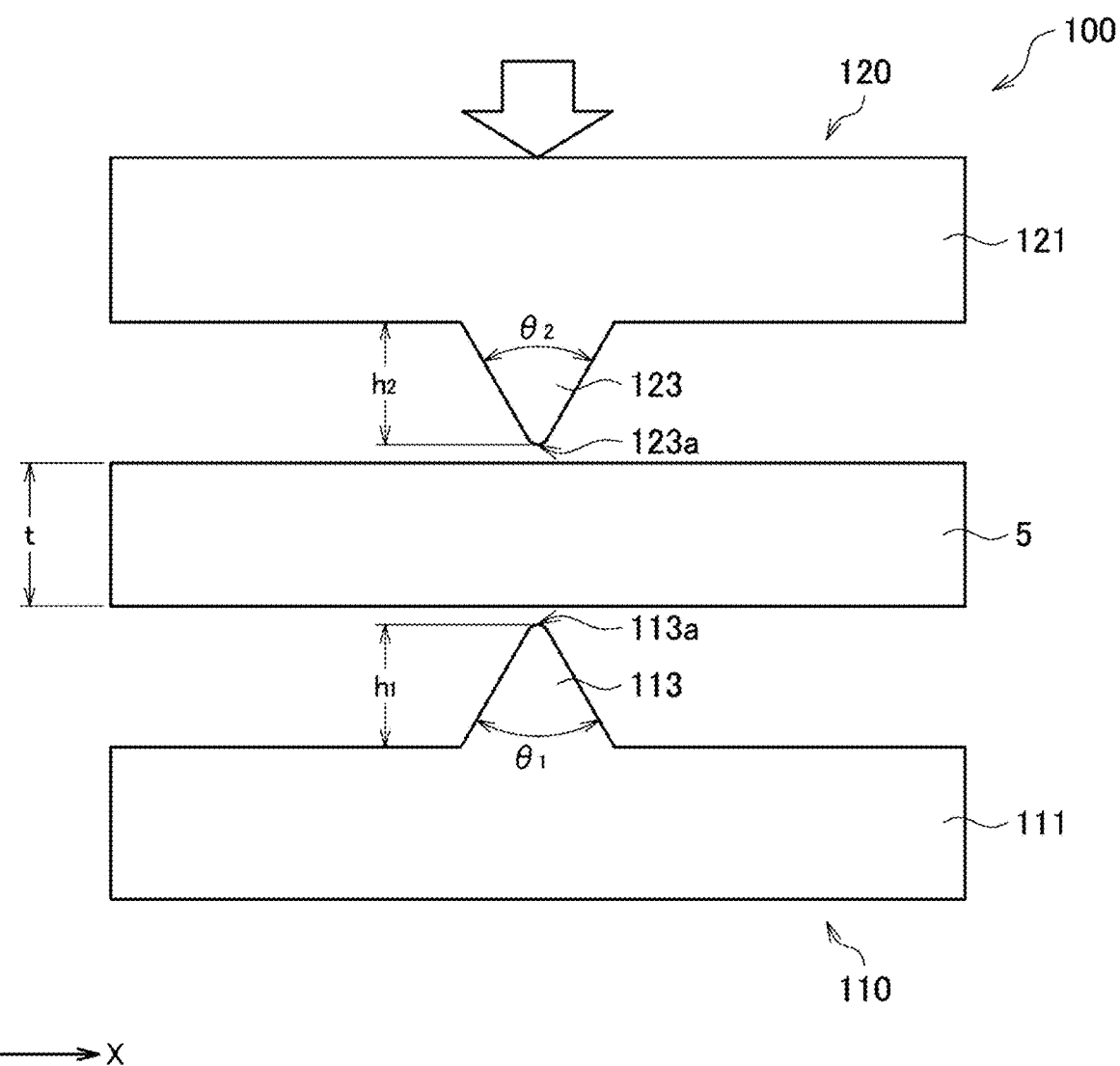
FIG. 1 is an explanatory drawing illustrating a cutting tool according to a first embodiment of the present invention, and illustrates a state before cutting a workpiece.

Hereunder, preferred embodiments of the present invention are described in detail while referring to the accompanying drawings. Note that, in the present specification and the accompanying drawings, constituent elements having substantially the same functional configuration are denoted by the same reference characters and a duplicate description thereof is omitted.

1. First Embodiment

[1-1. Schematic Configuration of Cutting Tool]
(1. Schematic Configuration)

Figure 2:
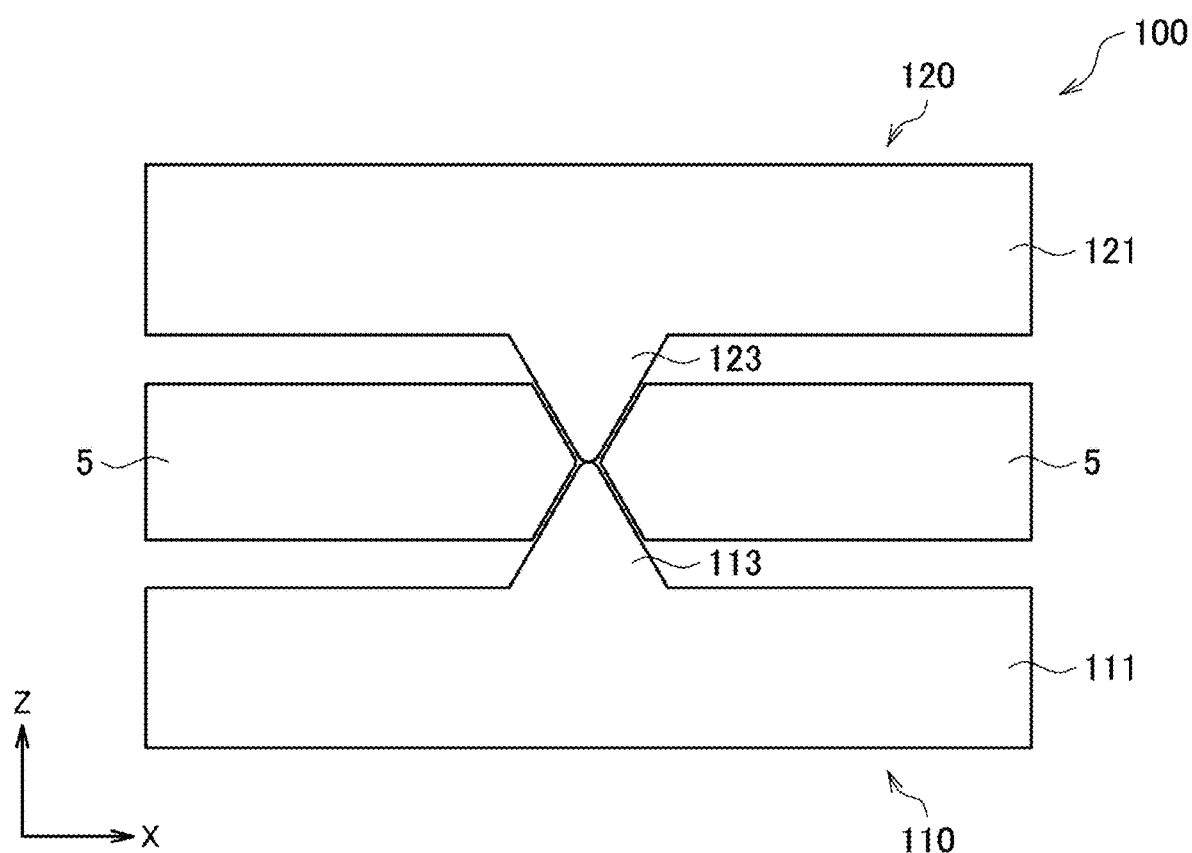
FIG. 2 is an explanatory drawing illustrating a state after cutting the workpiece by means of the cutting tool illustrated in FIG. 1.
Figure 3:
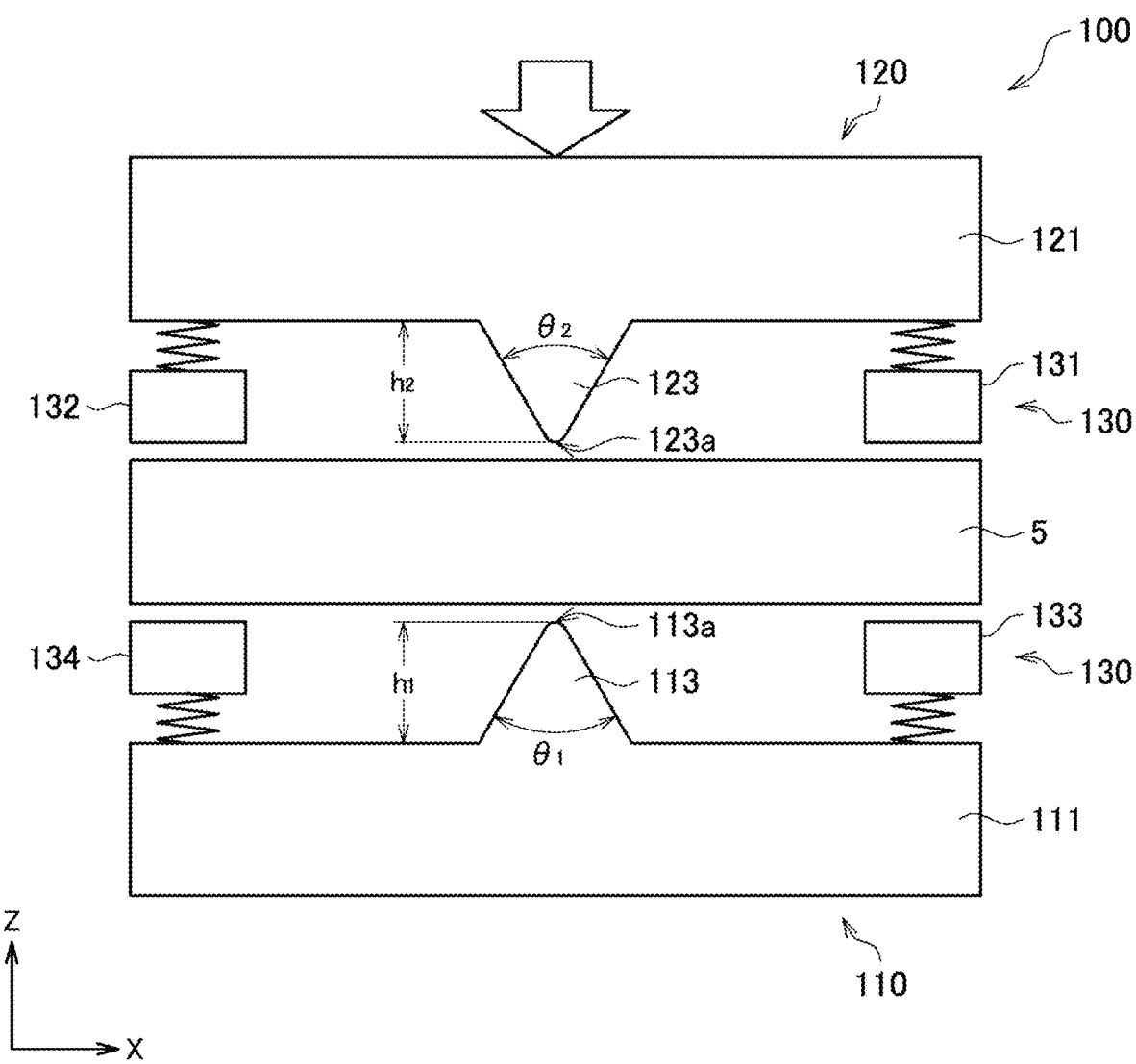
FIG. 3 is an explanatory drawing illustrating another configuration of a cutting tool according to the first embodiment.

First, based on FIG. 1 to FIG. 3, the schematic configuration of a cutting tool 100 according to a first embodiment of the present invention will be described. Note that, FIG. 1 is an explanatory drawing illustrating one example of the cutting tool 100 according to the present embodiment, and illustrates a state before cutting a workpiece 5. FIG. 2 is an explanatory drawing illustrating a state after cutting the workpiece 5 by means of the cutting tool 100 illustrated in FIG. 1. FIG. 3 is an explanatory drawing illustrating another configuration of the cutting tool 100 according to the present embodiment. In FIG. 1 to FIG. 3, an example is illustrated in which, when the sheet length direction of the workpiece 5 is taken as the X direction, the sheet width direction is taken as the Y direction, and the sheet thickness direction is taken as the Z direction, the workpiece 5 is cut along the sheet width direction.

The cutting tool 100 according to the present embodiment is a tool that cuts a workpiece which has been subjected to a surface treatment. In the following description, a surface-treated material having a covering layer (a coating layer 5b in FIG. 4) on the surface of a metallic material (a metallic material 5a in FIG. 4) that is a base material is adopted as an example of a workpiece. Examples of this kind of workpiece include a plated metal sheet obtained by subjecting the surface of a metal sheet to a plating treatment, a painted metal sheet obtained by coating the surface of a metallic material as a base material with paint, and a film-laminated metal sheet obtained by laminating a film on a metal sheet.

As illustrated in FIG. 1, as viewed from the sheet width direction (Y direction), the cutting tool 100 according to the present embodiment is composed of a die 110 having a wedge-shaped first cutting part 113 on a base 111, and a punch 120 having a wedge-shaped second cutting part 123 on a base 121. The wedge-shaped first cutting part 113 and the second cutting part 123 extend in the sheet width direction (Y direction), and the workpiece 5 is cut along the extending direction of the first cutting part 113 and the second cutting part 123.

The workpiece 5 to be cut by the first cutting part 113 of the die 110 and the second cutting part 123 of the punch 120 is arranged between the die 110 and the punch 120. For example, the workpiece 5 is placed on the die 110. At such time, the die 110 and the punch 120 are installed so that the first cutting part 113 and the second cutting part 123 face each other. Then, in a state in which the workpiece 5 has been placed on the die 110, the punch 120 is pushed down relatively with respect to the die 110 so that the workpiece 5 is cut as illustrated in FIG. 2. At such time, it is not necessarily required to use a blank holder which holds the workpiece 5. However, for example, as illustrated in FIG. 3, if a blank holder 130 is used, the workpiece 5 can be held by pads 131, 132, 133, and 134 on both sides of the cutting parts 113 and 123. In this case, inclination of the workpiece 5 is suppressed, and cutting can be stably performed.

Note that, it suffices that the blank holder 130 is provided in at least either one of the die 110 and the punch 120. That is, in the example illustrated in FIG. 3, when the blank holder 130 is provided only in the die 110, only the pads 133 and 134 need be provided, and when the blank holder 130 is provided only in the punch 120, only the pads 131 and 132 need be provided.

The cutting tool 100 according to the present embodiment is configured so that, when the punch 120 is pushed down to the die 110, by means of tensile forces that arise between the first cutting part 113 and second cutting part 123 and the workpiece 5, a coating layer on the respective surfaces of the workpiece 5 is caused to extend onto the cut end face so that the cut end face is covered with the coating layer. That is, the coating layer on the respective surfaces of the workpiece 5 is caused to follow the movements of the first cutting part 113 and the second cutting part 123 with respect to the workpiece 5 when the punch 120 is pushed down to the die 110, and the coating layer is caused to extend onto the cut end face. By this means, the cut end face of the workpiece 5 is coated with the coating layer.

(2. Covering of Cut End Face by Coating Layer)

Figure 4:
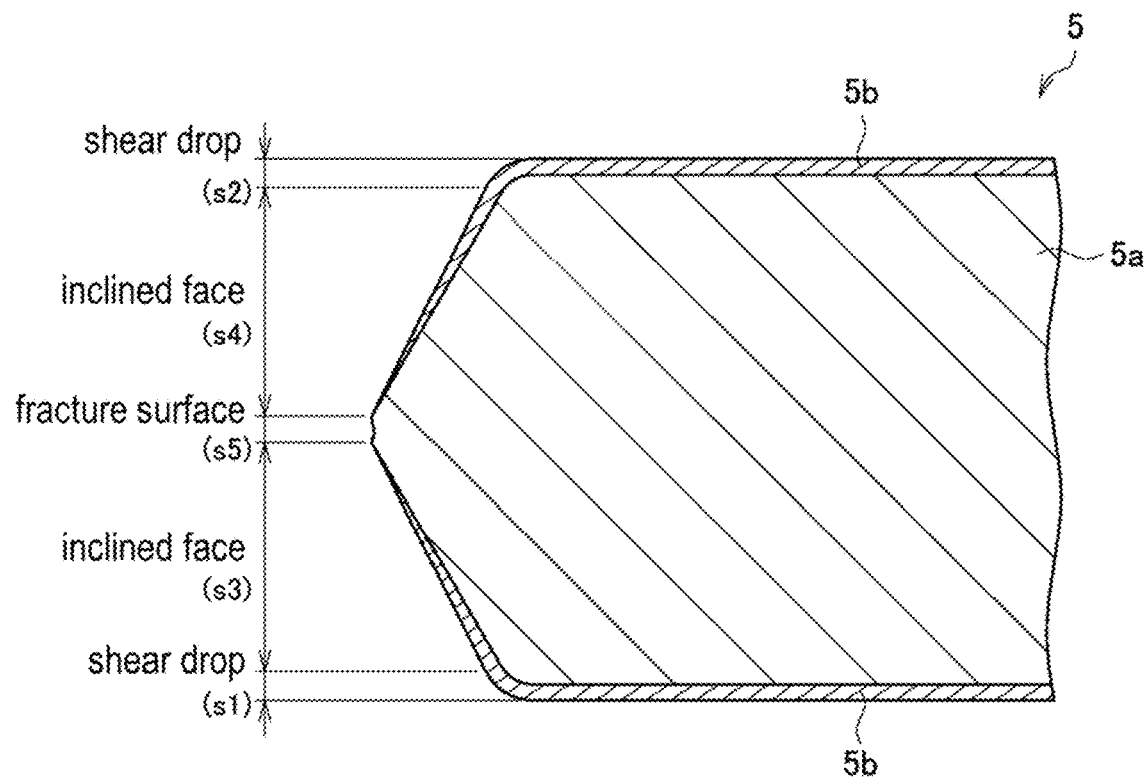
FIG. 4 is an explanatory drawing schematically illustrating a cut end face of a workpiece that was cut by the cutting tool according to the first embodiment.

An example of the cut end face of the workpiece 5 that was cut by the cutting tool 100 is illustrated in FIG. 4. In FIG. 4, a cross section of a side face (that is, a face as viewed from the sheet width direction) of the cut end face of the workpiece 5 is schematically illustrated. As illustrated in FIG. 4, the cut end face of the workpiece 5 is composed of shear drops s1 and s2, inclined faces s3 and s4, and a fracture surface s5. The shear drop s1 and the inclined face s3 are formed by the first cutting part 113 of the die 110. The shear drop s2 and the inclined face s4 are formed by the second cutting part 123 of the punch 120. The fracture surface s5 is formed as a result of the workpiece 5 rupturing in a manner in which cracks generated in the workpiece 5 by the first cutting part 113 and the second cutting part 123 serve as starting points.

Figure 5:
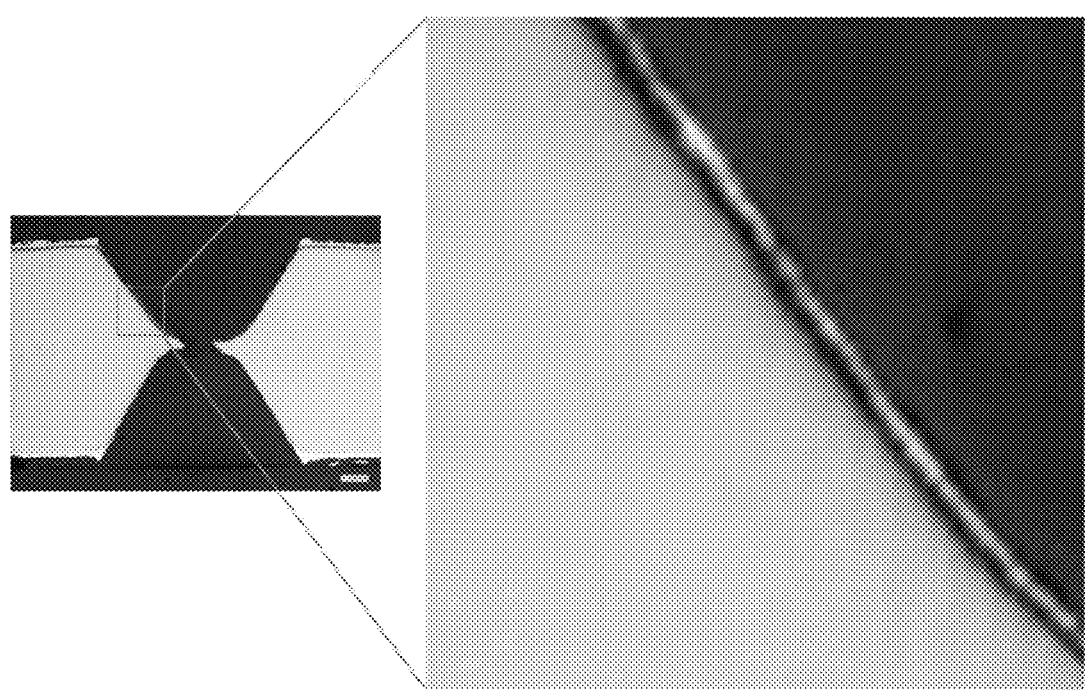
FIG. 5 is an image of a cut end face of a workpiece when the workpiece has been cut by the cutting tool according to the first embodiment.

As illustrated in FIG. 4, the coating layer 5b on the top surface side of the metallic material 5a covers the metallic material 5a continuously from the surface of the metallic material 5a to the shear drop s1 and the inclined face s3. Similarly, the coating layer 5b on the bottom surface side of the metallic material 5a covers the metallic material 5a continuously from the surface of the metallic material 5a to the shear drop s2 and the inclined face s4. Thus, in the workpiece 5 that was cut by the cutting tool 100 according to the present embodiment, the region from each surface of the metallic material 5a to the cut end face is covered with the same continuous coating layer 5b. FIG. 5 shows an image of the cut end face of the workpiece 5 when the workpiece 5 has been cut by the cutting tool 100 according to the present embodiment. As illustrated in FIG. 5, it is found that, at the inclined faces of the workpiece, the surface of the metallic material is coated with the coating layer.

For example, after the workpiece 5 has been cut, it is possible to cover the cut end face by subjecting the cut end face to a surface treatment such as plating or painting. However, it is difficult to cover the cut end face with a material that has the same composition as the coating layer 5b of the workpiece 5, and the corrosion resistance of the cut end face will be low compared to the surface of the metallic material 5a. In contrast, because the workpiece 5 which was cut by the cutting tool 100 according to the present embodiment is covered from each surface to the cut end face of the metallic material 5a with the continuous same coating layer 5b simultaneously with cutting, it is difficult for the cut end face to be oxidized. Therefore, by cutting the workpiece 5 using the cutting tool 100 according to the present embodiment, the workpiece 5 that has high corrosion resistance at the cut end face can be provided.

Figure 36:
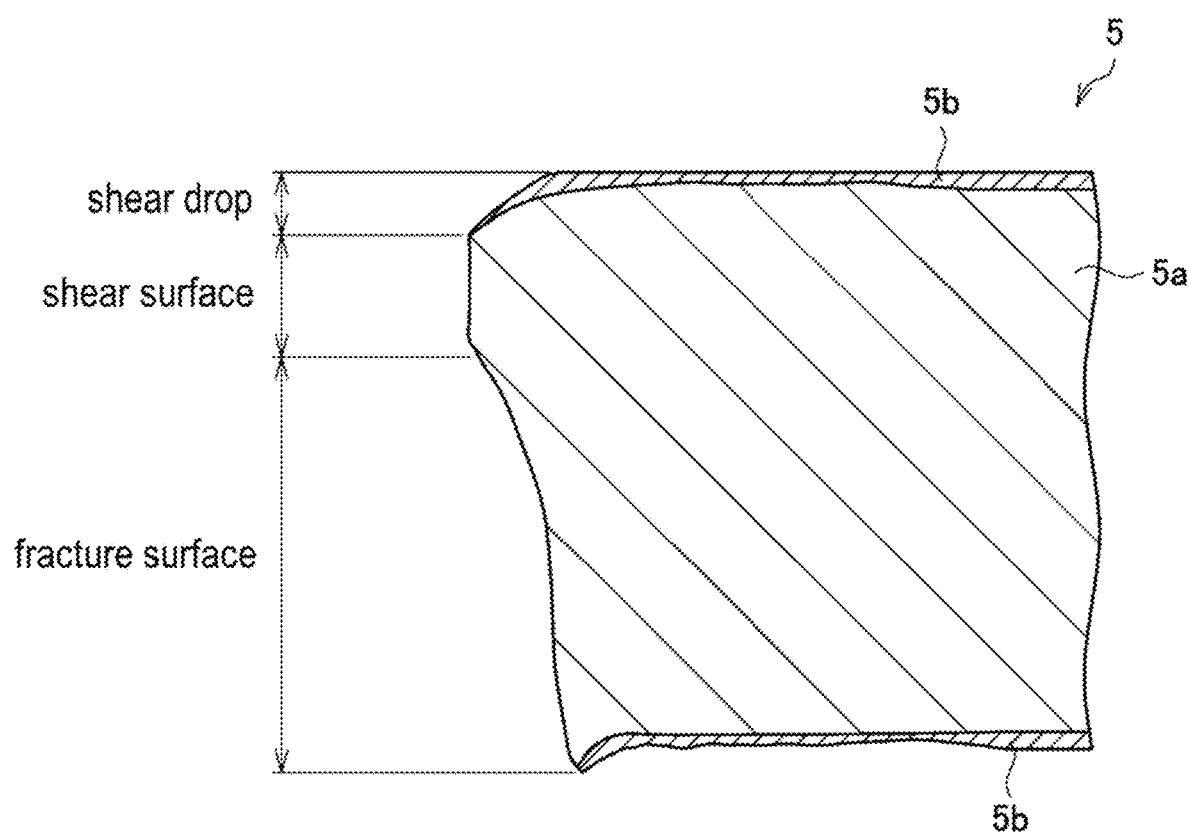
FIG. 36 is an explanatory drawing that schematically illustrates a cut end face of a workpiece which was cut using the shearing tool illustrated in FIG. 35.

Note that, the shape of the cut end face of the workpiece 5 that was cut by the cutting tool 100 according to the present embodiment depends on the shape of the first cutting part 113 and the second cutting part 123. Because the first cutting part 113 and the second cutting part 123 are each in a wedge shape, the shape at the cut end face of the workpiece 5 is a shape having the inclined faces s3 and s4 along the wedge-shaped inclinations as illustrated in FIG. 4, and not a vertical shear surface as illustrated in FIG. 36. Therefore, for example, the cut end face of the workpiece 5 that was cut by the cutting tool 100 illustrated in FIG. 1 has a shape that progressively protrudes in the direction toward the center in the sheet thickness direction.

By making the shape of the first cutting part 113 and the second cutting part 123 a wedge shape, when cutting the workpiece 5 it is easy for the coating layer 5b on the surfaces of the metallic material 5a to follow the movements of the first cutting part 113 and the second cutting part 123 along the inclinations of the wedge shape. As a result, as illustrated in FIG. 4, the coating layer 5b on the surfaces of the metallic material 5a can be caused to follow the movements of the first cutting part 113 and the second cutting part 123 as far as the inclined faces s3 and s4 of the cut end face, and not just the shear drops s1 and s2. Further, because the shear drops s1 and s2 are formed at both the front and rear surfaces of the workpiece 5 by the cutting part 113 and the cutting part 123, a burr-free cut surface is formed.

Further, the coating layer 5b on the surfaces of the metallic material 5a follows the inclinations of the first cutting part 113 and the second cutting part 123 to move to the cut end face. At such time, the amount of the coating layer 5b covering the surfaces of the inclined faces s3 and s4 of the cut end face gradually decreases toward the fracture surface s5, as illustrated in FIG. 4. By causing the coating layer 5b to cover the inclined faces s3 and s4 in this way, even if the area of the cut end face of the metallic material 5a which is coated with the coating layer 5b increases, the amount of the coating layer 5b covering the surface of the metallic material 5a that is moved to the cut end face hardly increases, and hence the flat surface corrosion resistance of the workpiece 5 can be maintained.

Note that, because the fracture surface s5 is a surface that is formed as a result of cracks occurring which cause the workpiece 5 to rupture, it is difficult to cause the coating layer 5b to extend onto as far as the fracture surface s5. However, because the workpiece 5 is cut along the inclined surfaces of the first cutting part 113 and the second cutting part 123 until a state is entered in which a front end 113a of the first cutting part 113 and a front end 123a of the second cutting part 123 substantially come in contact with each other, the proportion of the cut end face which the fracture surface s5 accounts for is very small. Therefore, even if the fracture surface s5 is not covered with the coating layer 5b, the corrosion resistance is not significantly reduced.

In addition, by making the first cutting part 113 of the die 110 and the second cutting part 123 of the punch 120 a wedge shape as in the cutting tool 100 according to the present embodiment, it is possible to also cut, for example, a material having a tensile strength of 200 MPa or more or a thick material. Further, it is possible to cut a material having a tensile strength of 270 MPa or more and, furthermore, a material having a tensile strength of 590 MPa or more.

[1-2. Shape of Cutting Part]
(a. Case where Shape of Cutting Part is Symmetric)

In the cutting tool 100 according to the present embodiment, the first cutting part 113 of the die 110 and the second cutting part 123 of the punch 120 have the same wedge shape as illustrated in FIG. 1. However, it suffices that each of the first cutting part 113 and the second cutting part 123 is at least a wedge shape, and preferably the shape of each of the first cutting part 113 and the second cutting part 123 satisfies the following conditions with regard to the shape.

(Front End Angle)

A front end angle $\theta_1$ of the first cutting part 113 and a front end angle $\theta_2$ of the second cutting part 123 are preferably made 10° or more and 120° or less. When the front end angles $\theta_1$ and $\theta_2$ are 10° or more, the inclination is large, and therefore the ability of the coating layer 5b to follow the movement of the cutting parts improves and the corrosion resistance of the cut end face is further enhanced. Further, stress applied to the cutting part 113 and the cutting part 123 decreases, damage to the cutting edges is suppressed, and the durability of the tool improves. Furthermore, when the front end angles $\theta_1$ and $\theta_2$ are 120° or less, the load required to cut the workpiece 5 does not become too large, and cracks are easily generated in the workpiece 5 when the respective cutting edges are pushed in, and hence cutting of the workpiece 5 is facilitated. Therefore, the front end angle $\theta_1$ of the first cutting part 113 and the front end angle $\theta_2$ of the second cutting part 123 are made 10° or more and 120° or less, and more preferably are made 30° or more and 90° or less.

(Front End Radius)

A front end radius $R_1$ of the first cutting part 113 and a front end radius $R_2$ of the second cutting part 123 are preferably formed to be 0.5% or more and 35.0% or less of the value of a sheet thickness t. When the front end radii $R_1$ and $R_2$ are each 0.5% or more of the value of the sheet thickness t, stress applied to the cutting edges of the cutting part 113 and the cutting part 123 does not become too large, damage to the cutting edges is suppressed, and durability improves. Further, when the front end radii $R_1$ and $R_2$ are each 35.0% or less of the value of the sheet thickness t, the shape of the cut end face is good. Furthermore, since cracks are easily generated in the workpiece 5 when the respective cutting edges are pushed in, cutting of the workpiece 5 is further facilitated. Therefore, the front end radius $R_1$ of the first cutting part 113 and the front end radius $R_2$ of the second cutting part 123 are made 0.5% or more and 35.0% or less of the value of the sheet thickness t, and more preferably are made 3.0% or more and 10.0% or less of the value of the sheet thickness t.

In this case, the first cutting part 113 and the second cutting part 123 may be different shapes to each other. For example, if at least one of the front end radii $R_1$ and $R_2$ and the front end angles $\theta_1$ and $\theta_2$ is different, the first cutting part 113 and the second cutting part 123 will be different shapes to each other. By making the first cutting part 113 and the second cutting part 123 a different shape to each other, the fracture surface ratio can be changed. Note that, the fracture surface ratio is the ratio of the fracture surface s5 to the sheet thickness of the workpiece 5.

At such time, the ratio between the front end radius $R_1$ of the first cutting part 113 and the front end radius $R_2$ of the second cutting part 123 (front end radii ratio $R_1/R_2$ or $R_2/R_1$) is preferably less than 100, and more preferably is less than 10. Most preferable is a case where the front end radii $R_1$ and $R_2$ are equal. Note that, the magnitude relationship between the front end radius $R_1$ of the first cutting part 113 and the front end radius $R_2$ of the second cutting part 123 is not particularly limited. Further, the ratio between the front end angle $\theta_1$ of the first cutting part 113 and the front end angle $\theta_2$ of the second cutting part 123 (front end angles ratio $\theta_1/\theta_2$ or $\theta_2/\theta_1$) is preferably less than 4, and more preferably is less than 2. Most preferable is a case where the front end angles $\theta_1$ and $\theta_2$ are equal. Note that, the magnitude relationship between the front end angle $\theta_1$ of the first cutting part 113 and the front end angle $\theta_2$ of the second cutting part 123 is not particularly limited.

By setting the front end radii ratio $R_1/R_2$ or $R_2/R_1$ and the front end angles ratio $\theta_1/\theta_2$ or $\theta_2/\theta_1$ to be within the aforementioned ranges, the fracture surface ratio can be lowered. When at least one of the front end radii and the front end angles differs significantly between the first cutting part 113 and the second cutting part 123, cutting by one of the cutting parts will proceed first, and therefore deformation of the workpiece 5 will be concentrated. As a result, rupturing of the workpiece 5 will occur earlier and the fracture surface ratio will increase, and consequently the proportion of the cut end face which is coated with the coating layer 5b will decrease. Therefore, by setting the front end radii ratio $R_1/R_2$ or $R_2/R_1$ and the front end angles ratio $\theta_1/\theta_2$ or $\theta_2/\theta_1$ so as to be within the aforementioned ranges, the fracture surface ratio can be lowered.

(Amount of Deviation Between Front End Positions)

The position of the front end 113a of the first cutting part 113 and the position of the front end 123a of the second cutting part 123 may be caused to match in a horizontal direction perpendicular to the direction in which the die 110 and the punch 120 face each other (that is, the sheet thickness direction of the workpiece 5), as illustrated in FIG. 1 and FIG. 2. By causing the position of the front end 113a of the first cutting part 113 and the position of the front end 123a of the second cutting part 123 to match, a force in the X direction that is applied to the cutting part 113 and the cutting part 123 can be reduced, thereby enhancing the durability. Further, cracks can be generated from the cutting edge at an appropriate timing to complete cutting.

Figure 6:
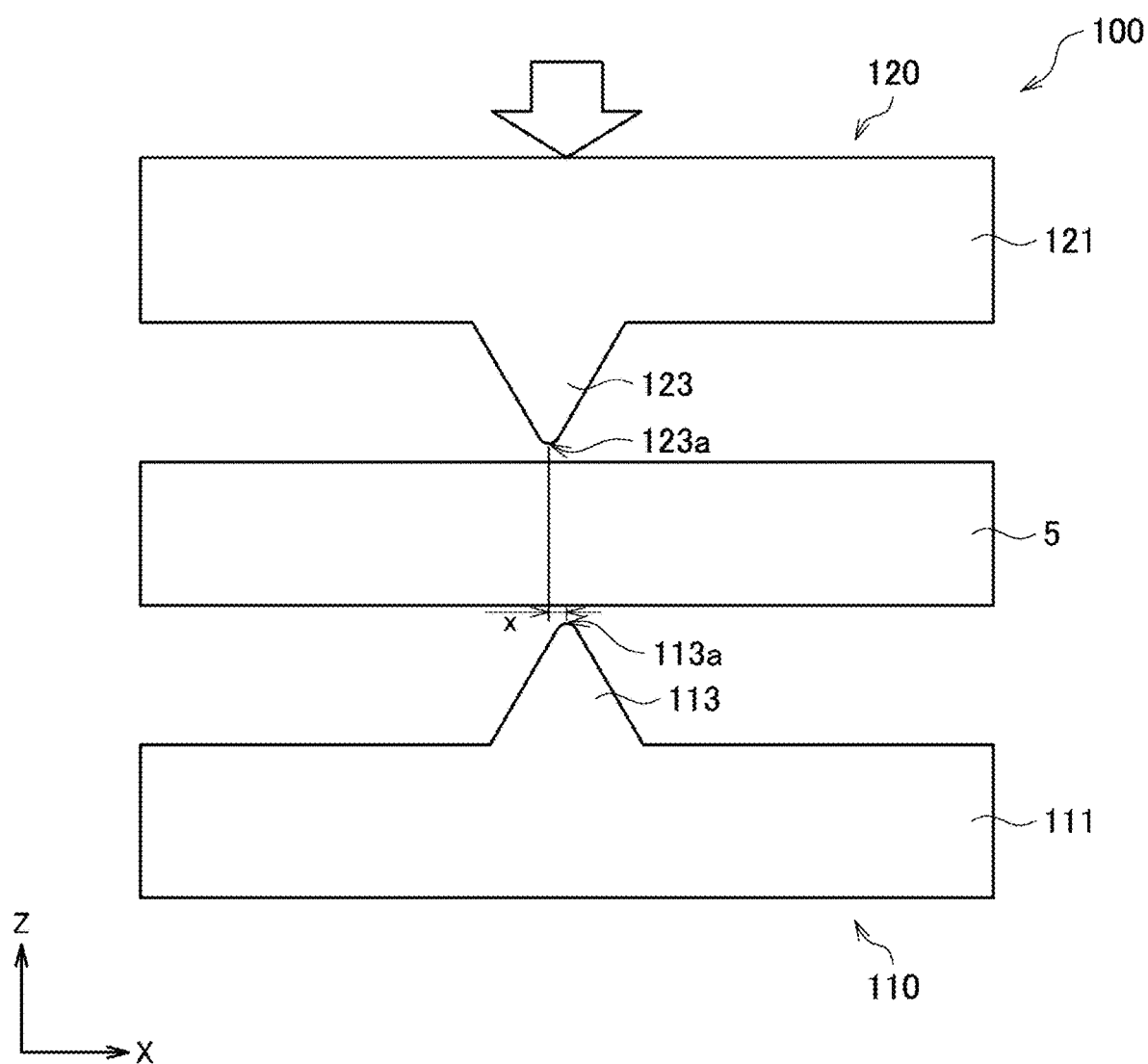
FIG. 6 is an explanatory drawing illustrating the cutting tool according to the first embodiment, and illustrates an amount of deviation between the position of the front end of a first cutting part and the position of the front end of a second cutting part.

Alternatively, as illustrated in FIG. 6, the position of the front end 113a of the first cutting part 113 and the position of the front end 123a of the second cutting part 123 may deviate from each other by an amount of deviation x in the horizontal direction. The phrase "amount of deviation x between the front end positions" means the distance between the front end 113a of the first cutting part 113 and the front end 123a of the second cutting part 123 in a horizontal direction (that is, the X direction) that is perpendicular to the direction in which the first cutting part 113 and the second cutting part 123 face each other. The amount of deviation between the front end positions is preferably 50% or less of the value of the sheet thickness t. If the amount of deviation between the front end positions is 50% or less of the value of the sheet thickness t, the workpiece 5 can be cut in a manner such that desired end face properties are reliably obtained.

(Trimming Width)

Figure 7:
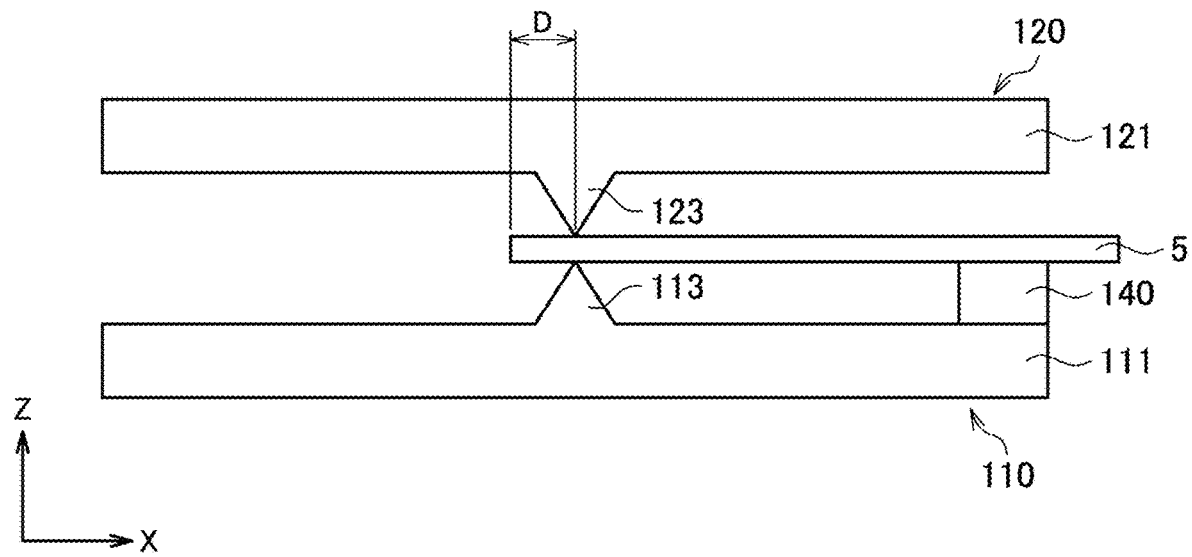
FIG. 7 is a schematic diagram for describing a trimming width of a workpiece.

The phrase "trimming width D of the workpiece 5" refers to the length of the workpiece 5 which should be left from the cutting position in the sheet length direction (X direction) when cutting with the cutting tool 100. For example, as illustrated in FIG. 7, the trimming width D of the workpiece 5 is represented by the length from the cutting position to one of the end portions of the workpiece 5. As illustrated in FIG. 6, in a case where the position of the front end 113a of the first cutting part 113 and the position of the front end 123a of the second cutting part 123 deviate with respect to each other, it suffices to take the trimming width D of the workpiece 5 as, for example, the length from an end portion of the workpiece 5 to the front end position of the cutting part on the side closer to the relevant end portion. Note that, in FIG. 7, a pad 140 is arranged between the die 110 and the workpiece 5 on the side opposite to the side on which the trimming width D of the workpiece 5 is taken. The pad 140 functions similarly to the pads 131, 132, 133 and 134 of the blank holder 130 illustrated in FIG. 3.

The trimming width D of the workpiece 5 is equal to or greater than a front end radius R of the cutting part, and is 5 times or less the sheet thickness t of the workpiece 5 (R≤D≤5t), and in particular is preferably 3 times or less the sheet thickness t of the workpiece 5 (R≤D≤3t). More preferably, the trimming width D of the workpiece 5 is 3 times or more the front end radius R of the cutting part, and is equal to or less than the sheet thickness t of the workpiece 5 (3R≤D≤t). Note that, the phrase "front end radius R of the cutting part" refers to the front end radius $R_1$ of the first cutting part 113 or the front end radius $R_2$ of the second cutting part 123. In a case where the front end radii $R_1$ and $R_2$ are the same, $R=R_1=R_2$. In a case where the front end radii $R_1$ and $R_2$ are different to each other, the smaller radius among the front end radius $R_1$ of the first cutting part 113 and the front end radius $R_2$ of the second cutting part 123 is taken as the front end radius R ($R=\text{Min}(R_1, R_2)$).

Figure 8:
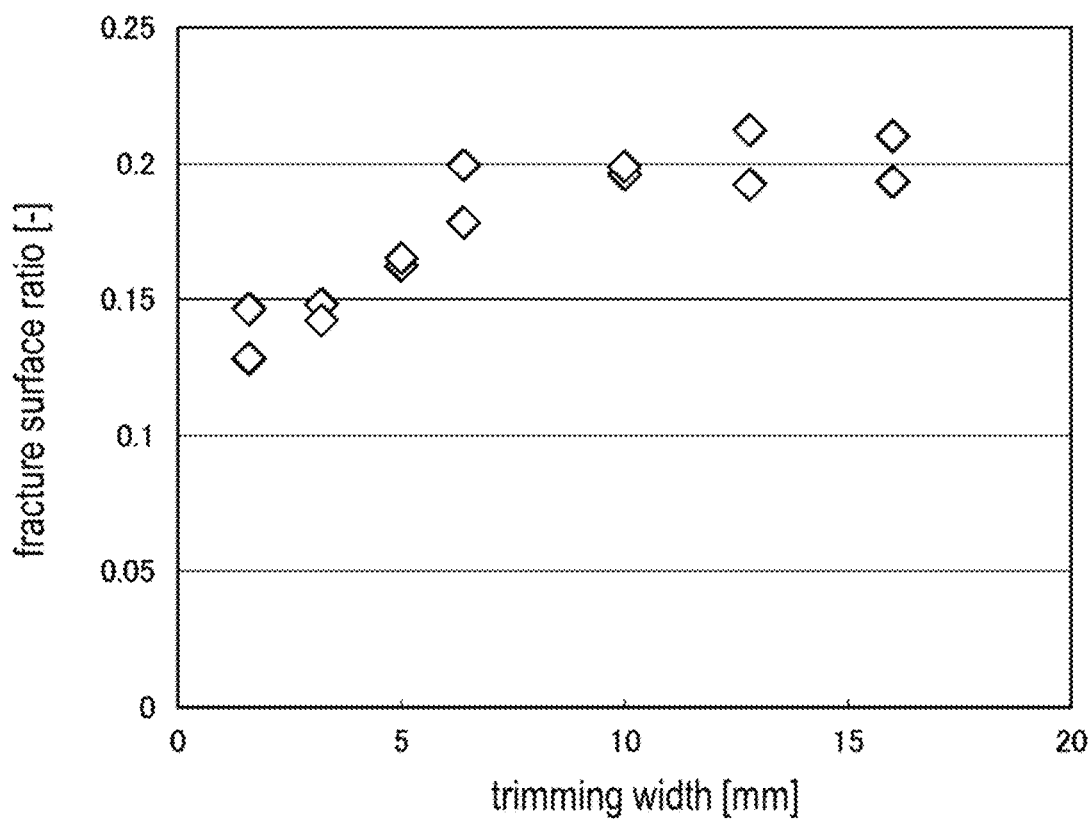
FIG. 8 is a graph illustrating an example of the relation between trimming widths and fracture surface ratios.

By setting the trimming width D to be 5 times or less the sheet thickness t, and more preferably 3 times or less the sheet thickness t, formation of the fracture surface s5 due to cutting can be suppressed, and the fracture surface ratio can be reduced. FIG. 8 shows an example of the relation between the trimming width D and the fracture surface ratio. FIG. 8 shows fracture surface ratios when the workpiece 5 whose sheet thickness t was 3.2 mm was cut by the cutting tool 100 illustrated in FIG. 1 in cases where the trimming width D was set to 1.6 mm (=0.5t), 3.2 mm (=t), 5.0 mm (=1.6t), 6.4 mm (=2.0t), 10.0 mm (=3.1t), 12.8 mm (=4.0t), and 16.0 mm (=5.0t), respectively. In these cases, a galvanized steel sheet having a sheet thickness of 3.2 mm and a tensile strength of 460 MPa was used as the workpiece 5. The front end radius R of the cutting tool 100 was set to 0.05 mm, and the front end angle θ thereof was set to 60°. Two plots at the same trimming width D show the fracture surface ratios measured for the two pieces of the workpiece 5 which was cut by the cutting tool 100.

Figure 9:
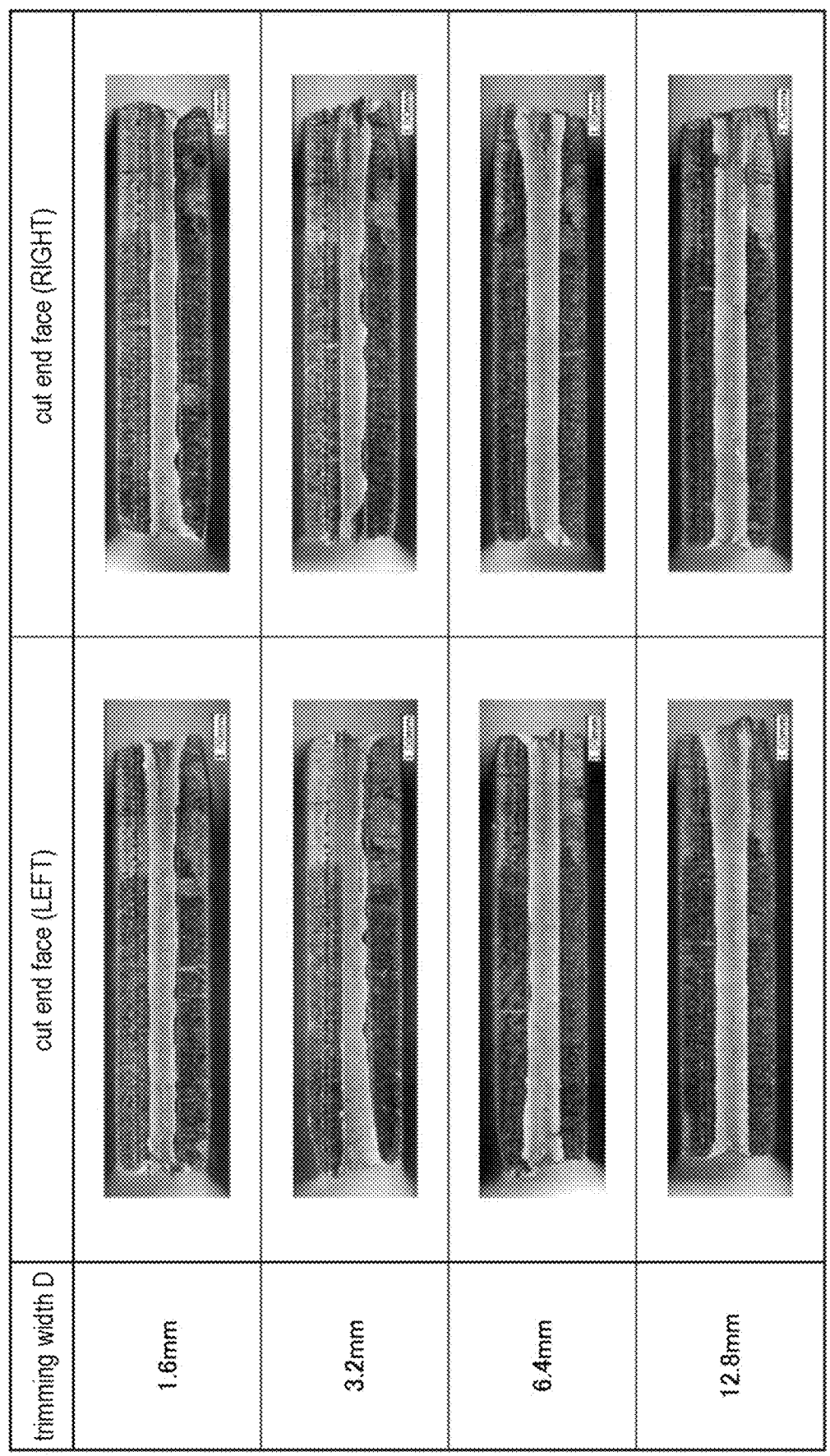
FIG. 9 shows front photographs of cut end faces of respective pieces of workpieces which were cut using the respective trimming widths set in the example illustrated in FIG. 8.

Further, in FIG. 9, cut end faces of the respective pieces of the workpieces 5 that were cut at the trimming widths D of 1.6 mm, 3.2 mm, 6.4 mm and 12.8 mm are shown as examples of cut end faces.

Based on FIG. 8 and FIG. 9, it is found that the smaller the trimming width D is, the more the fracture surface ratio decreases. In addition, it is found that when the trimming width D is equal to or less than the sheet thickness t, the fracture surface ratio further decreases. On the other hand, by setting the trimming width D to be equal to or greater than the front end radius R of the cutting part, and in particular to be 3 times or more the front end radius R, displacement of the cutting edge due to elastic deformation of the tool during cutting can be suppressed, and a good end face shape can be obtained by the cutting.

By changing the shape of the first cutting part 113 of the die 110, the shape of the second cutting part 123 of the punch 120, the amount of deviation between the front end positions of the respective cutting parts 113 and 123, or the trimming width D of the workpiece 5 in this way, the shape of the cut end face of the workpiece 5 cut by the cutting tool 100 changes, and the coverage state of the cut end face by the coating layer 5b changes. Therefore, it suffices to appropriately set the shape of the first cutting part 113 of the die 110 and the shape of the second cutting part 123 of the punch 120, the amount of deviation between the front end positions of the respective cutting parts 113 and 123, and the trimming width D of the workpiece 5 according to the shape of the cut end face or the corrosion resistance that is required for the workpiece 5 after cutting.

(Height of Cutting Parts)

It suffices to set a height $h_1$ of the first cutting part 113 and a height $h_2$ of the second cutting part 123 so that at least the sum of these heights ($h_1+h_2$) is greater than the sheet thickness t of the workpiece 5.

The shape of the cutting tool 100 according to the present embodiment, and a coverage state with respect to coverage by a coating layer of a cut end face of the workpiece 5 which was cut using the cutting tool 100 have been described above. The cutting tool 100 according to the present embodiment is composed of the die 110 and the punch 120 which have the wedge-shaped cutting parts 113 and 123, respectively. By cutting the workpiece 5 with the wedge-shaped cutting parts 113 and 123, the coating layer 5b on each surface of the metallic material 5a can be caused to follow the movement of the cutting parts 113 and 123 and extend onto the cut end face. The inclined faces s3 and s4 of the cut end face are each coated with the coating layer 5b continuously from the respective surfaces of the metallic material 5a in a manner so that the amount of the coating layer covering the cut end face decreases toward the fracture surface s5. Therefore, the corrosion resistance of the cut end face can be enhanced while maintaining the flat surface corrosion resistance of the workpiece 5.

Note that, cutting of the workpiece 5 by the cutting tool 100 may be cutting carried out by performing a single cutting process or cutting carried out by performing a plurality of cutting processes. The phrase "cutting carried out by performing a plurality of cutting processes" refers to executing a cutting process in which the die 110 is pushed down relatively to the punch 120 a plurality of times to thereby cut the workpiece 5 into two pieces. Various kinds of cut end faces can be realized by cutting the workpiece 5 by performing a plurality of cutting processes.

For example, when cutting the workpiece 5 by performing a plurality of cutting processes, the front end angle $θ_1$ of the first cutting part 113 and the front end angle $θ_2$ of the second cutting part 123 may be made smaller in a stepwise manner in the respective cutting processes. As a more specific description, it will be assumed that the plurality of cutting processes include a first cutting process, and a second cutting process which is performed after the first cutting process. At such time, in the second cutting process, at least one operation among an operation that makes the front end angle $\theta_1$ of the first cutting part 113 smaller than the front end angle $\theta_1$ in the first cutting process and an operation that makes the front end angle $\theta_2$ of the second cutting part 123 smaller than the front end angle $\theta_2$ in the first cutting process is performed, and the workpiece 5 is then cut. By this means, the portion of the cut end face which is coated with the coating layer 5b can be increased, and a good end face shape can be obtained.

At this time, it is good to make a stroke S of the punch 120 gradually smaller in each cutting process. By setting the stroke to a large amount in the initial cutting process, the ability of the coating layer 5b to follow the movements of the first cutting part 113 and the second cutting part 123 increases.

For example, among the plurality of cutting processes, the stroke S of the punch 120 in the first cutting process is preferably set so as to satisfy the relational expression of the following expression (1). More preferably, the stroke S of the punch 120 in the first cutting process is set so as to satisfy the following expression (2). Note that, the phrase "the stroke S of the punch 120 in the first cutting process" refers to the stroke amount when a position at which the blade contacts the workpiece 5 is taken as the starting point. By setting the stroke S of the punch 120 in the first cutting process in this way, the portion of the cut end face coated with the coating layer 5b can be increased, and a good end face shape can be obtained.

$$(R_1+R_2) \leq S \leq \{t-(R_1+R_2)\} \tag{1}$$

$$(R_1+R_2) \times 2 \leq S \leq \{t-(R_1+R_2) \times 2\} \tag{2}$$

Further, when cutting the workpiece 5 by performing a plurality of cutting processes, the front end radius $R_1$ of the first cutting part 113 and the front end radius $R_2$ of the second cutting part 123 may be made smaller in a stepwise manner in the respective cutting processes. That is, in the second cutting process, at least one operation among an operation that makes the front end radius $R_1$ of the first cutting part 113 smaller than the front end radius $R_1$ in the first cutting process and an operation that makes the front end radius $R_2$ of the second cutting part 123 smaller than the front end radius $R_2$ in the first cutting process is performed, and the workpiece 5 is then cut. In this case also, similarly to the case of making the front end angle smaller, an advantageous effect is achieved that the portion which the coating layer 5b covers on the cut end face can be increased, and a good end face shape can be obtained.

Note that, when it is desired to reduce the load on the cutting tool 100 while causing the coating layer 5b to cover the cut end face after having suppressed formation of the shear drops during cutting of the workpiece 5, a configuration may be adopted so as to increase the front end angle $\theta_1$ of the first cutting part 113 and the front end angle $\theta2$ of the second cutting part 123 in a stepwise manner in the respective cutting processes.

By changing a front end radius or a front end angle of a cutting part in a stepwise manner in the respective cutting processes in this way, cutting can be controlled to obtain a good end face shape. In addition, it is also possible to gradually adjust the amount of the plating covering the end face. For example, by reducing the front end radius or the front end angle in a stepwise manner, the plating can be spread over a wider region of the end face while reducing burrs at the end portion of the end face. Further, by increasing the front end radius or the front end angle in a stepwise manner, the end face can be thinly coated with the plating while leaving a large amount of plating at a cutting starting point portion of the end face. By leaving a large amount of plating at the cutting starting point portion in this manner, the occurrence of a situation in which red rust flows out from the end face to the surface of the workpiece 5 can be suppressed.

(b. Case where Shape of Cutting Part is Asymmetric)

In the cutting tool 100 according to the present embodiment, the first cutting part 113 of the die 110 and the second cutting part 123 of the punch 120 have an asymmetrical wedge shape with respect to a normal line at the front ends 113a and 123a as illustrated in FIG. 1. However, it suffices that the first cutting part 113 and the second cutting part 123 at least have an asymmetrical wedge shape with respect to the normal line, and preferably the shape of each of the first cutting part 113 and the second cutting part 123 satisfies the following conditions with regard to the shape.

(Front End Angle)

The front end angle $\theta_1$ of the first cutting part 113 and the front end angle $\theta_2$ of the second cutting part 123 are preferably made 10° or more and 120° or less. When the front end angles $\theta_1$ and $\theta_2$ are 10° or more, the inclination is large, and therefore the ability of the coating layer 5b to follow the movement of the cutting parts improves and the corrosion resistance of the cut end face is further enhanced. Further, stress applied to the cutting part 113 and the cutting part 123 decreases, damage to the cutting edges is suppressed, and the durability of the tool improves. Furthermore, when the front end angles $\theta_1$ and $\theta_2$ are 120° or less, the load required to cut the workpiece 5 does not become too large, and cracks are easily generated in the workpiece 5 when the respective cutting edges are pushed in, and hence cutting of the workpiece 5 is facilitated. Therefore, the front end angle $\theta_1$ of the first cutting part 113 and the front end angle $\theta_2$ of the second cutting part 123 are made 10° or more and 120° or less, and more preferably are made 30° or more and 90° or less.

Figure 10:
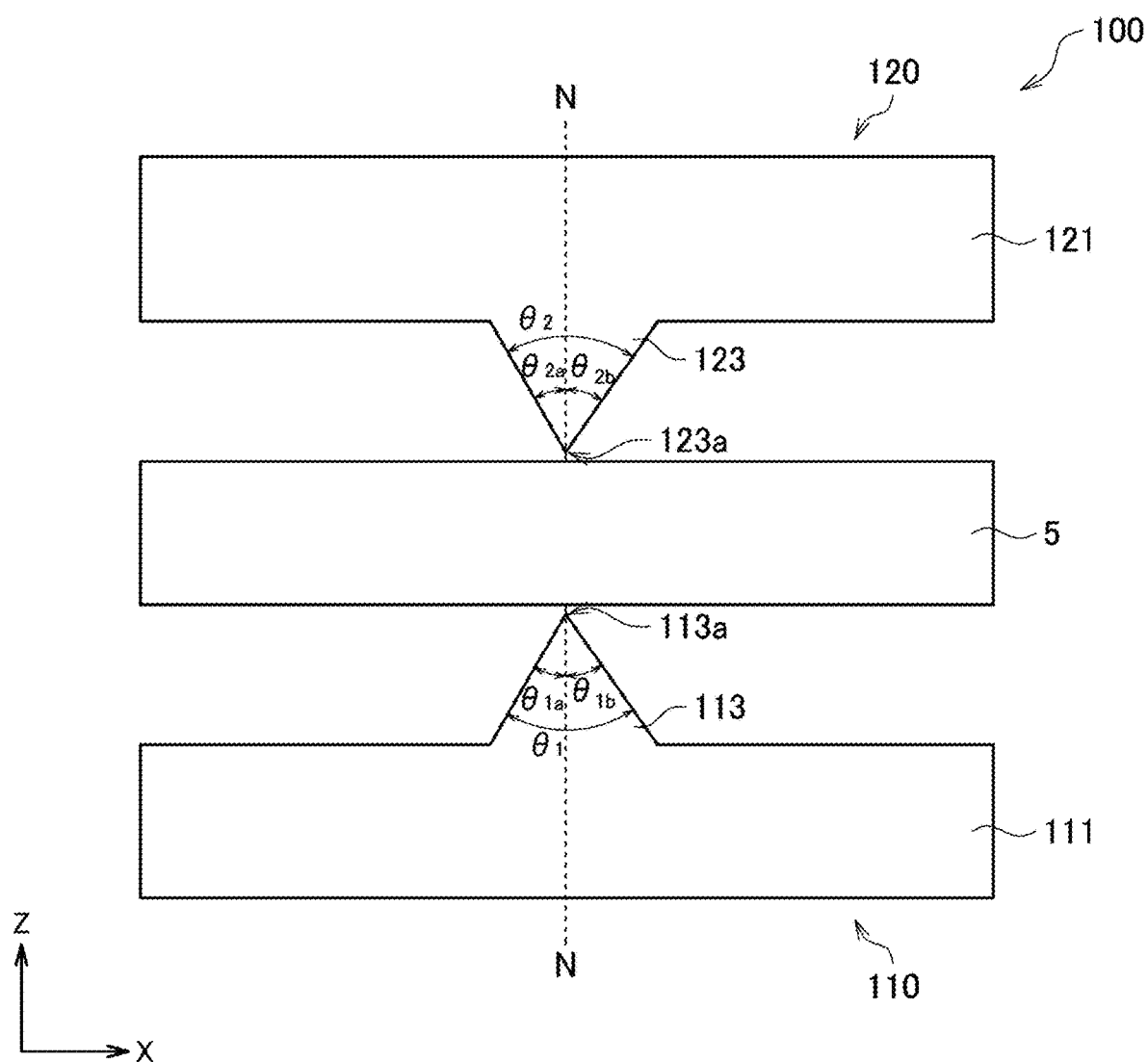
FIG. 10 is a schematic diagram illustrating an example in which, with respect to a cutting part of a punch, left and right angles of the cutting part divided in two by a normal line are made different to each other to make the cutting part an asymmetrical shape.

Further, in the cutting tool 100 according to the present embodiment, the shapes of the first cutting part 113 and the second cutting part 123 are made asymmetric with respect to a normal line. For example, with regard to the front end angle $\theta_1$ of the first cutting part 113, the shape of the first cutting part 113 can be made asymmetric with respect to the normal line by making left and right angles $\theta_{1a}$ and $\theta_{1b}$ ($\theta_1=\theta_{1a}+\theta_{1b}$) formed when the angle $\theta_1$ is divided in two by the normal line different to each other. Similarly, with regard to the front end angle $\theta_2$ of the second cutting part 123, the shape of the second cutting part 123 can be made asymmetric with respect to the normal line by making left and right angles $\theta_{2a}$ and $\theta_{2b}$ ($\theta_2=\theta_{2a}+\theta_{2b}$) formed when the angle $\theta_2$ is divided in two by the normal line different to each other. In FIG. 10, an example is illustrated in which the cutting part 113 of the die 110 and the cutting part 123 of the punch 120 are formed in asymmetrical shapes by making left and right angles $\theta_{1a}$ and $\theta_{1b}$ formed when the angle $\theta_1$ is divided in two by a normal line N different to each other, and making left and right angles $\theta_{2a}$ and $\theta_{2b}$ formed when the angle $\theta_2$ is divided in two by the normal line different to each other.

By making the angles $\theta_{1a}$ and $\theta_{1b}$ or the angles $\theta_{2a}$ and $\theta_{2b}$ different to each other, the propagation direction of cracks that occur when cutting the workpiece 5 can be controlled.

For example, by making an angle on a control side ($\theta_{1a}$ or $\theta_{1b}$ in the case of the die 110, and $\theta_{2a}$ or $\theta_{2b}$ in the case of the punch 120) on which it is desired not to cause burrs on the cut end face of the workpiece 5 that is cut in two larger than the angle on the other side, it is easier for large cracks to propagate on the control side. As a result, the occurrence of burrs can be suppressed.

At such time, it is desirable to make ($\theta_{1a}-\theta_{1b}$) or ($\theta_{1b}-\theta_{1a}$) which is the angular difference between the angle $\theta_{1a}$ and the angle $\theta_{1b}$, and ($\theta_{2a}-\theta_{2b}$) or ($\theta_{2b}-\theta_{2a}$) which is the angular difference between the angle $\theta_{2a}$ and the angle $\theta_{2b}$ a value that is 5° or more and 450 or less. If the angular difference between the left and right angles is 5° or more, the propagation direction of cracks in the workpiece 5 can be stably controlled. Further, by making the angular difference between the left and right angles 450 or less, the load of a vertical component of the load in the direction in which cutting of the workpiece 5 advances that is applied to the cutting part does not become too large, and the durability of the cutting part can be ensured. Accordingly, the angular difference ($\theta_{1a}-\theta_{1b}$) or ($\theta_{1b}-\theta_{1a}$) and angular difference ($\theta_{2a}-\theta_{2b}$) or ($\theta_{2b}-\theta_{2a}$) between the left and right angles is made a value that is 5° or more and 450 or less, and more preferably 10° or more and 30° or less.

(Front End Radius)

Figure 11:
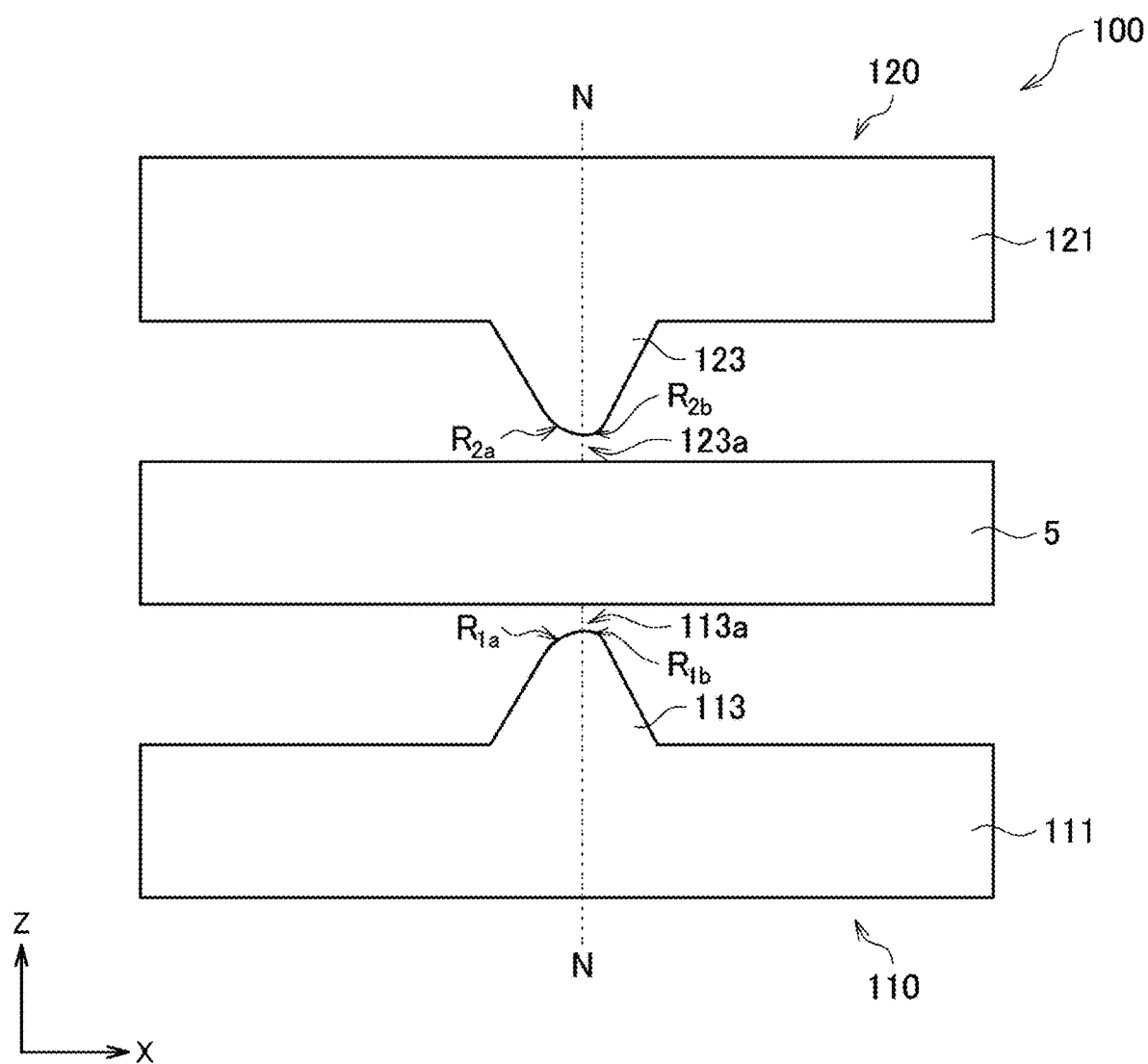
FIG. 11 is a schematic diagram illustrating an example in which, with respect to a cutting part of a punch, front end radii on the right and left of the cutting part divided in two by a normal line are made different to each other to make the cutting part an asymmetrical shape.

In the cutting tool 100 according to the present embodiment, the shape of the first cutting part 113 and the shape of the second cutting part 123 are each made asymmetric with respect to a normal line. As mentioned above, with regard to the front end angle $\theta_1$ of the first cutting part 113 and the front end angle $\theta_2$ of the second cutting part 123, while the left and right angles $\theta_{1a}$ and $\theta_{1b}$ or angles $\theta_{2a}$ and $\theta_{2b}$ formed when the angle $\theta_1$ or $\theta_2$ is divided in two by the normal line may be made to be different to each other, the shape of the first cutting part 113 and the shape of the second cutting part 123 can also each be made asymmetric with respect to the normal line by making right and left front end radii $R_{1a}$ and $R_{1b}$ or front end radii $R_{2a}$ and $R_{2b}$ which are formed when the front end radius is divided in two by the normal line different to each other. In FIG. 11, an example is illustrated in which the cutting part 113 of the die 110 and the cutting part 123 of the punch 120 are formed in an asymmetrical shape by making the right and left front end radii $R_{1a}$ and $R_{1b}$ and front end radii $R_{2a}$ and $R_{2b}$ which are formed when the front end radius is divided in two by a normal line N different to each other.

By making the front end radii $R_{1a}$ and $R_{1b}$ or the front end radii $R_{2a}$ and $R_{2b}$ different to each other, the propagation direction of cracks when cutting the workpiece 5 can be controlled. For example, by making a front end radius on a control side ($R_{1a}$ or $R_{1b}$ in the case of the die 110, and $R_{2a}$ or $R_{2b}$ in the case of the punch 120) on which it is desired not to cause burrs on the cut end face of the workpiece 5 that is cut in two smaller than the front end radius on the other side, it is easier for large cracks to propagate on the control side. As a result, the occurrence of burrs can be suppressed.

Here, the front end radius $R_1$ of the die 110 is taken as the average value of the respective front end radii $R_{1a}$ and $R_{1b}$ formed when the front end radius is divided in two by the normal line at the cutting edge of the relevant cutting part ($R_1=\{(R_{1a}+R_{1b})/2\}$). Similarly, the front end radius $R_2$ of the punch 120 is taken as the average value of the respective front end radii $R_{2a}$ and $R_{2b}$ formed when the front end radius is divided in two by the normal line at the cutting edge of the relevant cutting part ($R_2=\{(R_{2a}+R_{2b})/2\}$). At this time, preferably the front end radii $R_1$ and $R_2$ are each made 0.5% or more and 35.0% or less of the value of the sheet thickness t. When the front end radii $R_1$ and $R_2$ are each 0.5% or more of the value of the sheet thickness t, stress applied to the cutting edges of the cutting part 113 and the cutting part 123 does not become too large, damage to each cutting edge is suppressed, and the durability is enhanced. Further, when the front end radii $R_1$ and $R_2$ are each 35.0% or less of the value of the sheet thickness t, the shape of the cut end face will be good. Further, since it is easy for cracking to occur in the workpiece 5 when the cutting edges are pressed in, cutting of the workpiece 5 is facilitated. Therefore, the front end radius $R_1$ of the first cutting part 113 and the front end radius $R_2$ of the second cutting part 123 are each made 0.5% or more and 35.0% or less of the value of the sheet thickness t, and more preferably 3.0% or more and 10.0% or less of the value of the sheet thickness t.

At such time, it is desirable to make a ratio $R_{1a}/R_{1b}$ or $R_{1b}/R_{1a}$ between the front end radii on the left and right of the first cutting part 113 and a ratio $R_{2a}/R_{2b}$ or $R_{2b}/R_{2a}$ between the front end radii on the left and right of the second cutting part 123 a value that is 1.1 or more and 100 or less. If the ratio between the front end radii Ra and Rb on the left and right is 1.1 or more, the propagation direction of cracks in the workpiece 5 can be stably controlled. Further, by making the ratio between the front end radii Ra and Rb on the left and right 100 or less, the load of a vertical component of the load in the direction in which cutting of the workpiece 5 advances that is applied to the cutting part does not become too large, and the durability of the cutting part can be ensured. Accordingly, the ratios between the front end radii on the left and right ($R_{1a}/R_{1b}$ or $R_{1b}/R_{1a}$, and $R_{2a}/R_{2b}$ or $R_{2b}/R_{2a}$) are made 1.1 or more and 100 or less, and more preferably 5 or more and 20 or less.

In this case, while the first cutting part 113 and the second cutting part 123 may have shapes that are symmetrical with respect to the workpiece 5 as illustrated in FIG. 1 and the like, they may also have different shapes to each other. For example, in the first cutting part 113 and the second cutting part 123, if at least any one of the front end angles $\theta_{1a}$ and $\theta_{1b}$ or $\theta_{2a}$ and $\theta_{2b}$ on the left and right and the front end radii $R_{1a}$ and $R_{1b}$ or $R_{2a}$ and $R_{2b}$ on the left and right is different from the other angles or radii, the first cutting part 113 and the second cutting part 123 will be different shapes to each other. By making the first cutting part 113 and the second cutting part 123 a different shape to each other, the fracture surface ratio can be changed. Note that, the fracture surface ratio is the ratio of the fracture surface s5 to the sheet thickness of the workpiece 5.

(Amount of Deviation Between Front End Positions)

The position of the front end 113a of the first cutting part 113 and the position of the front end 123a of the second cutting part 123 may be caused to match in a horizontal direction perpendicular to the direction in which the die 110 and the punch 120 face each other (that is, the sheet thickness direction of the workpiece 5), as illustrated in FIG. 1 and FIG. 2. By causing the position of the front end 113a of the first cutting part 113 and the position of the front end 123a of the second cutting part 123 to match, a force in the X direction that is applied to the cutting part 113 and the cutting part 123 can be reduced, thereby enhancing the durability. Further, cracks can be generated from the cutting edge at an appropriate timing to complete cutting.

Figure 12:
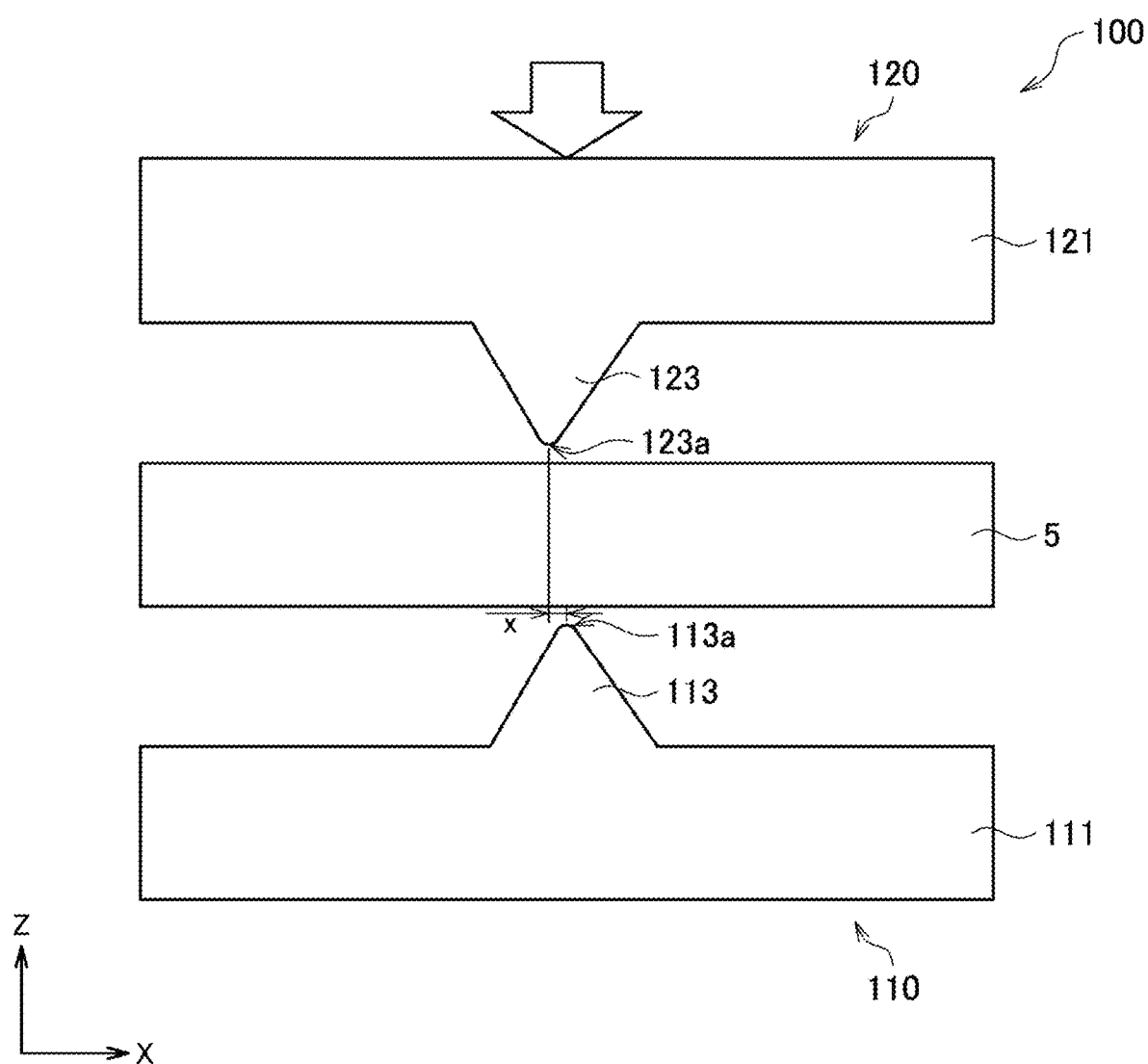
FIG. 12 is an explanatory drawing illustrating the cutting tool according to the first embodiment, and illustrates an amount of deviation between the position of the front end of the first cutting part and the position of the front end of the second cutting part.

Alternatively, as illustrated in FIG. 12, the position of the front end 113a of the first cutting part 113 and the position of the front end 123a of the second cutting part 123 may deviate from each other by an amount of deviation x in the horizontal direction. The phrase "amount of deviation x between the front end positions" means the distance between the front end 113a of the first cutting part 113 and the front end 123a of the second cutting part 123 in a horizontal direction (that is, the X direction) that is perpendicular to the direction in which the first cutting part 113 and the second cutting part 123 face each other. The amount of deviation between the front end positions is preferably 50% or less of the value of the sheet thickness t. If the amount of deviation between the front end positions is 50% or less of the value of the sheet thickness t, the workpiece 5 can be cut in a manner such that desired end face properties are reliably obtained.

(Trimming Width)

The phrase "trimming width D of the workpiece 5" refers to a length of the workpiece 5 which should be left from the cutting position in the sheet length direction (X direction) when cutting with the cutting tool 100. For example, as illustrated in FIG. 7, the trimming width D of the workpiece 5 is represented by the length from the cutting position to one of the end portions of the workpiece 5. As illustrated in FIG. 12, in a case where the position of the front end 113a of the first cutting part 113 and the position of the front end 123a of the second cutting part 123 deviate with respect to each other, it suffices to take the trimming width D of the workpiece 5 as, for example, the length from an end portion of the workpiece 5 to the front end position of the cutting part on the side closer to the relevant end portion. Note that, in FIG. 7, a pad 140 is arranged between the die 110 and the workpiece 5 on the side opposite to the side on which the trimming width D of the workpiece 5 is taken. The pad 140 functions similarly to the pads 131, 132, 133 and 134 of the blank holder 130 illustrated in FIG. 3.

The trimming width D of the workpiece 5 is equal to or greater than a front end radius R of the cutting part, and is 5 times or less the sheet thickness t of the workpiece 5 ($R \leq D \leq 5t$), and in particular is preferably 3 times or less the sheet thickness t of the workpiece 5 ($R \leq D \leq 3t$). More preferably, the trimming width D of the workpiece 5 is 3 times or more the front end radius R of the cutting part, and is equal to or less than the sheet thickness t of the workpiece 5 ($3R \leq D \leq t$). Note that, the front end radius R of the cutting part is taken as the smallest radius among the front end radii $R_{1a}$ and $R_{1b}$ on the left and right of the first cutting part 113 and the front end radii $R_{2a}$ and $R_{2b}$ on the left and right of the second cutting part 123 ($R=\text{Min}(R_{1a}, R_{1b}, R_{2a}, R_{2b})$).

By setting the trimming width D to be 5 times or less the sheet thickness t, and more preferably 3 times or less the sheet thickness t, formation of the fracture surface s5 due to cutting can be suppressed, and the fracture surface ratio can be reduced. On the other hand, by setting the trimming width D to be equal to or greater than the front end radius R of the cutting part, and in particular to be 3 times or more the front end radius R, displacement of the cutting edge due to elastic deformation of the tool during cutting can be suppressed, and a good end face shape can be obtained by the cutting. The reason for this is as described above based on FIG. 8 and FIG. 9.

By changing the shape of the first cutting part 113 of the die 110, the shape of the second cutting part 123 of the punch 120, the amount of deviation between the front end positions of the respective cutting parts 113 and 123, or the trimming width D of the workpiece 5 in this way, the shape of the cut end face of the workpiece 5 cut by the cutting tool 100 changes, and the coverage state of the cut end face by the coating layer 5b changes. Therefore, it suffices to appropriately set the shape of the first cutting part 113 of the die 110 and the shape of the second cutting part 123 of the punch 120, the amount of deviation between the front end positions of the respective cutting parts 113 and 123, and the trimming width D of the workpiece 5 according to the shape of the cut end face or the corrosion resistance that is required for the workpiece 5 after cutting.

For example, the corrosion resistance of the cut end face can be increased by making the first cutting part 113 of the die 110 and the second cutting part 123 of the punch 120 the same left-right asymmetric shape, and causing the position of the front end 113a of the first cutting part 113 and the position of the front end 123a of the second cutting part 123 to match so that the first cutting part 113 and the second cutting part 123 are arranged symmetrically with respect to the workpiece 5. This is because the cut end face will be symmetric with respect to the center position of the sheet thickness, and the extent to which the coating layer 5b on the bottom surface side of the workpiece 5 extends onto the inclined face s3, and the extent to which the coating layer 5b on the top surface side of the workpiece 5 extends onto the inclined face s4 will be approximately equal.

Further, for example, in the case of welding the cut end face, it is desirable that the cut end face is flat from the viewpoint of facilitating the welding work. In this case, the first cutting part 113 of the die 110 and the second cutting part 123 of the punch 120 may have different wedge shapes to improve the flatness of the cut end face.

(Height of Cutting Parts)

It suffices to set a height $h_1$ of the first cutting part 113 and a height $h_2$ of the second cutting part 123 so that, similarly to the case where the shapes of the cutting parts are symmetrical, at least the sum of these heights ($h_1+h_2$) is greater than the sheet thickness t of the workpiece 5.

Thus, the cutting tool 100 may be composed of the die 110 and the punch 120 having the wedge-shaped cutting parts 113 and 123 with a left-right asymmetric shape, respectively. By cutting the workpiece 5 by means of the wedge-shaped cutting parts 113 and 123, the coating layer 5b on the respective surfaces of the metallic material 5a can be caused to follow the movement of the cutting parts 113 and 123 and extend onto the cut end face. The inclined faces s3 and s4 of the cut end face are each coated with the coating layer 5b continuously from the respective surfaces of the metallic material 5a in a manner so that the amount of the coating layer covering the cut end face decreases toward the fracture surface s5. Therefore, the corrosion resistance of the cut end face can be enhanced while maintaining the flat surface corrosion resistance of the workpiece 5. Further, in the cutting tool 100 according to the present embodiment, because the cutting parts 113 and 123 of the die 110 and the punch 120 have shapes that are asymmetric with respect to the normal line at the front ends 113a and 123a, the propagation direction of cracks when cutting the workpiece 5 can be controlled.

Note that, cutting of the workpiece 5 by the cutting tool 100 may be cutting carried out by performing a single cutting process or may be cutting carried out by performing a plurality of cutting processes. The phrase "cutting carried out by performing a plurality of cutting processes" refers to executing a cutting process in which the die 110 is pushed down relatively to the punch 120 a plurality of times to thereby cut the workpiece 5 into two pieces. Various kinds of cut end faces can be realized by cutting the workpiece 5 by performing a plurality of cutting processes.

2. Second Embodiment

Next, a method for cutting a workpiece according to a second embodiment of the present invention will be described. The method for cutting a workpiece according to the present embodiment relates to a cutting process that cuts, from the workpiece 5, a closed-shaped region (hereinafter, also referred to as "closed region") whose edge is defined by a curved line when the workpiece 5 is seen in plan view, as in the case of performing, for example, piercing or punching. Similar studies as those in the case of linearly cutting a workpiece as described in Patent Document 1 have been carried out with respect to such a cutting process also.

For example, Patent Document 5 discloses a punching method in which, prior to performing punching of a Zn-based plated steel sheet, quick-drying oil is applied to a planned punching place on the surface of the Zn-based plated steel sheet, and thereafter punching of the relevant place is performed so that the quick-drying oil moves around to the punched-out end face. According to the method disclosed in Patent Document 5, because quick-drying oil is applied to the planned punching place on the Zn-based plated steel sheet surface prior to punching, the quick-drying oil moves around to the punched-out end face during punching, and hence a decrease in the corrosion resistance of the end face is suppressed.

Further, Patent Document 6 discloses a method of shearing a coated steel sheet in which, when performing shearing of a coated steel sheet, a punch is used in which a corner portion composed of an elliptical arc surface having a major axis along the radial direction of the punch and a minor axis along the axial direction of the punch is provided at the punch cutting edge, and a portion where the coating film has peeled off is caused to be included on a swarf side by making the major axis larger than the amount of expansion towards the outer diameter side of the punch of the portion where the coating film has peeled off. According to the method disclosed in Patent Document 6, the occurrence of a situation in which a portion where the coating film has peeled off remains on the coated steel sheet after shearing can be avoided, and generation of enamel hairs caused by a portion where the coating film has peeled off can be suppressed.

However, in the method disclosed in the aforementioned Patent Document 1, the plated metal layer on the surface of the base metal material covers just at least a part of the shear surface of the cut end face only, and the base metal material remains exposed at the fracture surface. Consequently, the corrosion resistance of the cut end face of the plated metal sheet is not sufficient. Further, in general, when it is attempted to impart an excessive sacrificial protection property to the cut end face for the purpose of rust prevention, the plating on the surface of the plated metal sheet is reduced, and the surface corrosion resistance (that is, the flat surface corrosion resistance) of the surface of the plated metal sheet decreases.

Furthermore, in the method disclosed in the aforementioned Patent Document 5, it is necessary to apply quick-drying oil to a planned punching place on the surface of the Zn-based plated steel sheet. Further, when the sheet thickness of the Zn-based plated steel sheet is thick, it is difficult for the quick-drying oil to move round to the entire area of the punched-out end face, and therefore after punching it is necessary to apply quick-drying oil to the punched-out end face also.

The method disclosed in the aforementioned Patent Document 6 is a method for ensuring that a coating film does not peel off from a shear drop in a coated steel sheet after shearing, and is not a technique which covers a shear surface with a coating film. Therefore, a coating film is not adhered to the shear surface of the coated steel sheet, and a function that is realized by a coating film adhering to the shear surface is not exhibited.

Therefore, in the method for cutting a workpiece according to the present embodiment, with respect to a cutting process for cutting a closed region from the workpiece 5 also, when cutting a workpiece that was subjected to a surface treatment, while maintaining the function of the coating material on a flat surface of the base material, it is possible to also cause the function of the coating material to be realized on the cut end face. Hereinafter, the method for cutting a workpiece according to the present embodiment will be described in detail.

[2-1. Case where portion where closed region was removed from workpiece is to be used as a product (piercing)]

(1. Cutting method)

Figure 13:
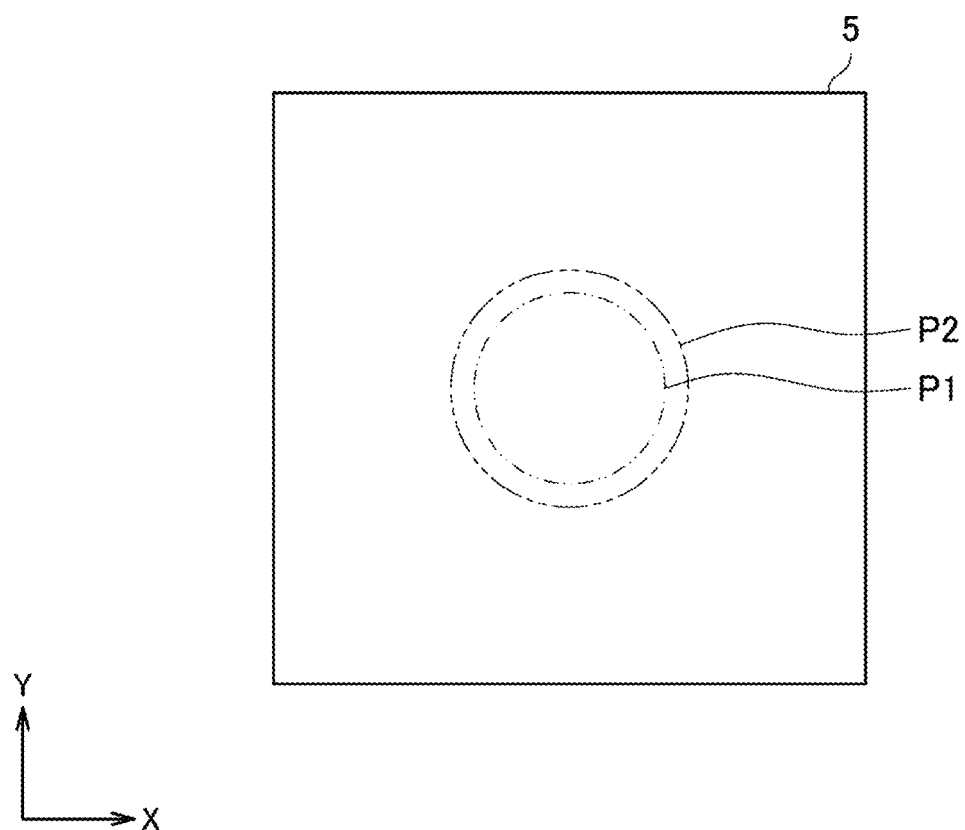
FIG. 13 is a plan view illustrating cutting positions of a workpiece according to a second embodiment of the present invention.
Figure 14:
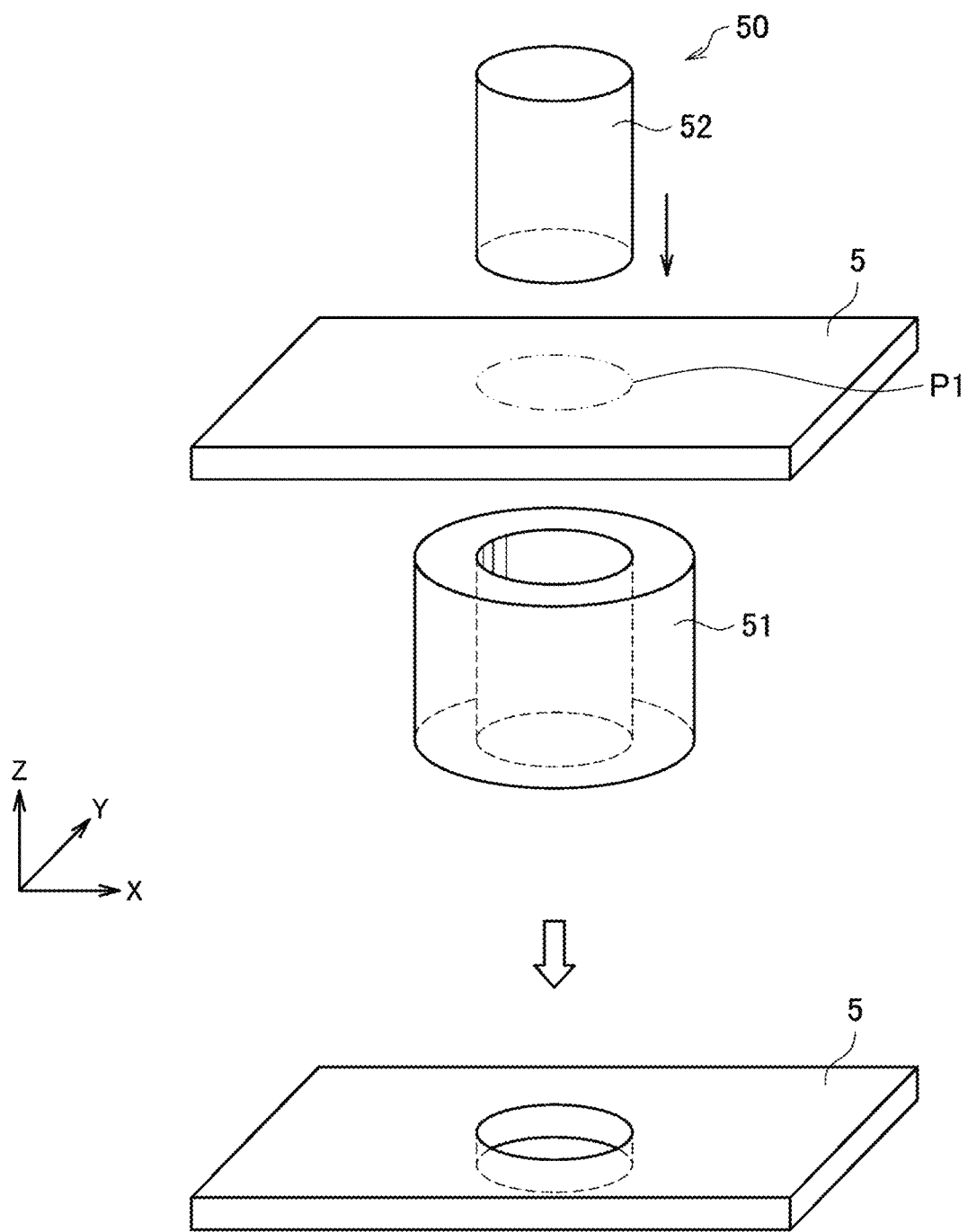
FIG. 14 is an explanatory drawing illustrating a process for forming an intermediate material in a cutting method according to the second embodiment.
Figure 15:
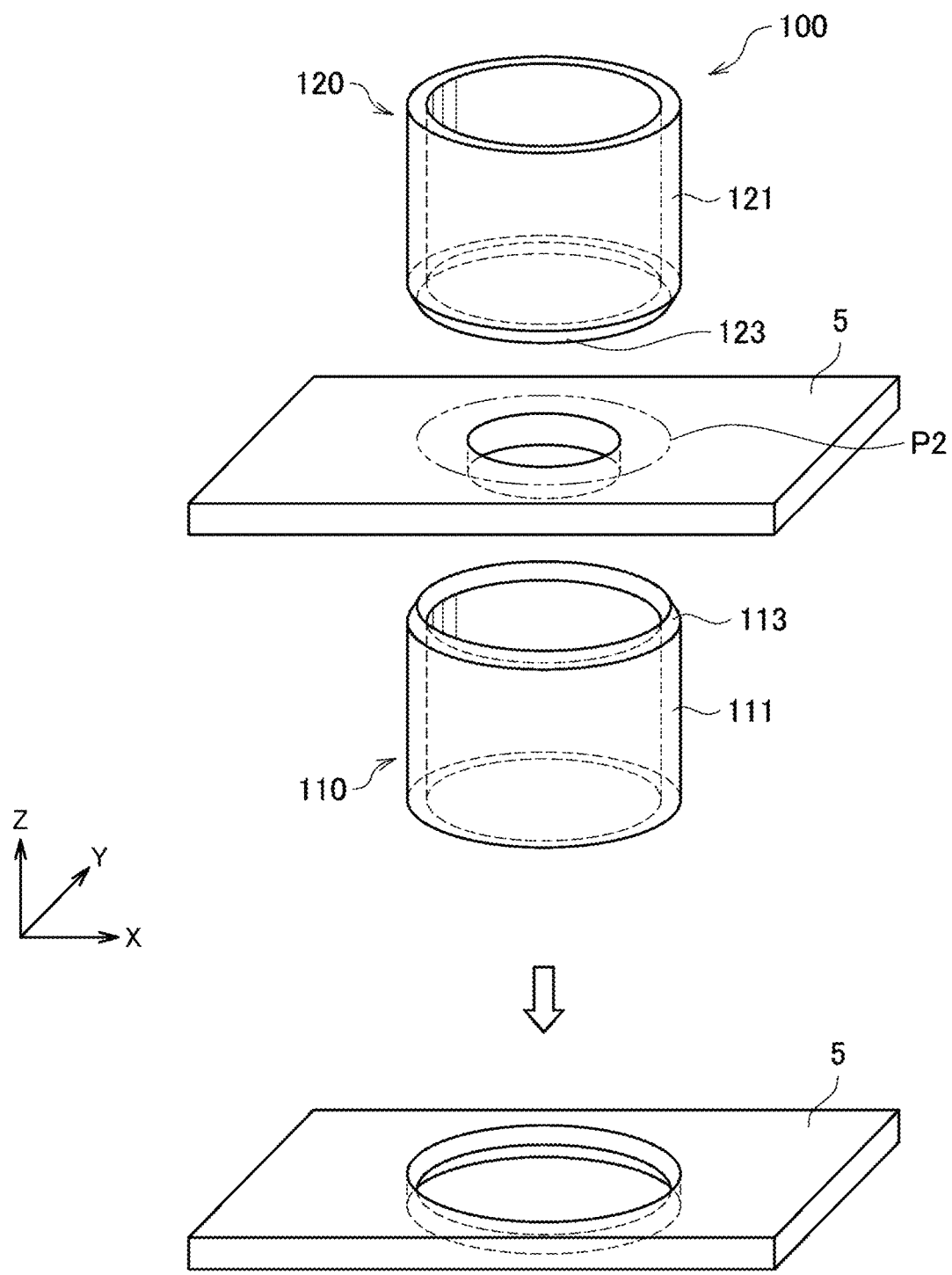
FIG. 15 is an explanatory drawing illustrating a cutting process in the cutting method according to the second embodiment.
Figure 16:
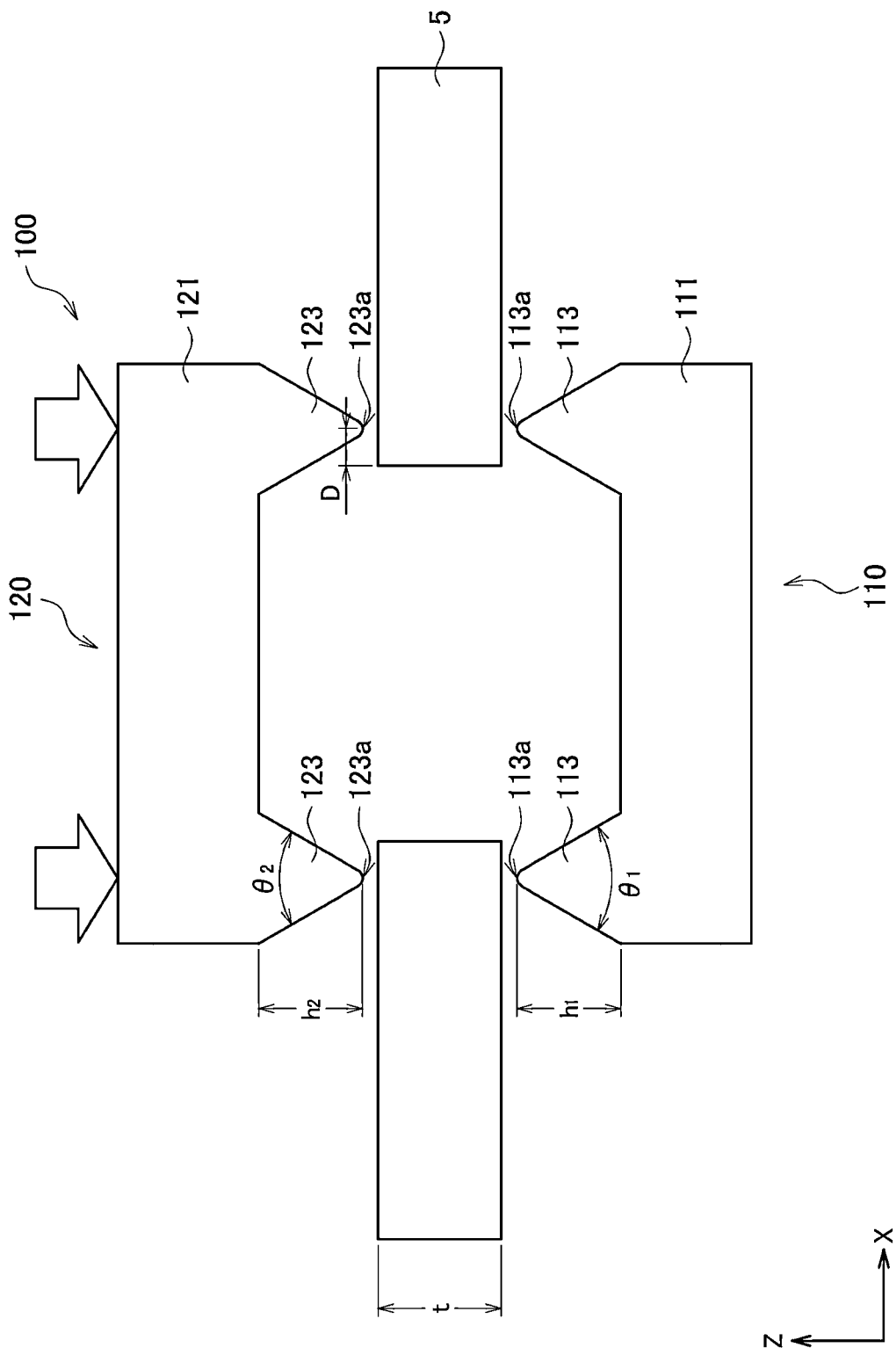
FIG. 16 is an explanatory drawing illustrating a cutting tool used in the cutting process according to the second embodiment, and illustrates a state before cutting a workpiece.
Figure 17:
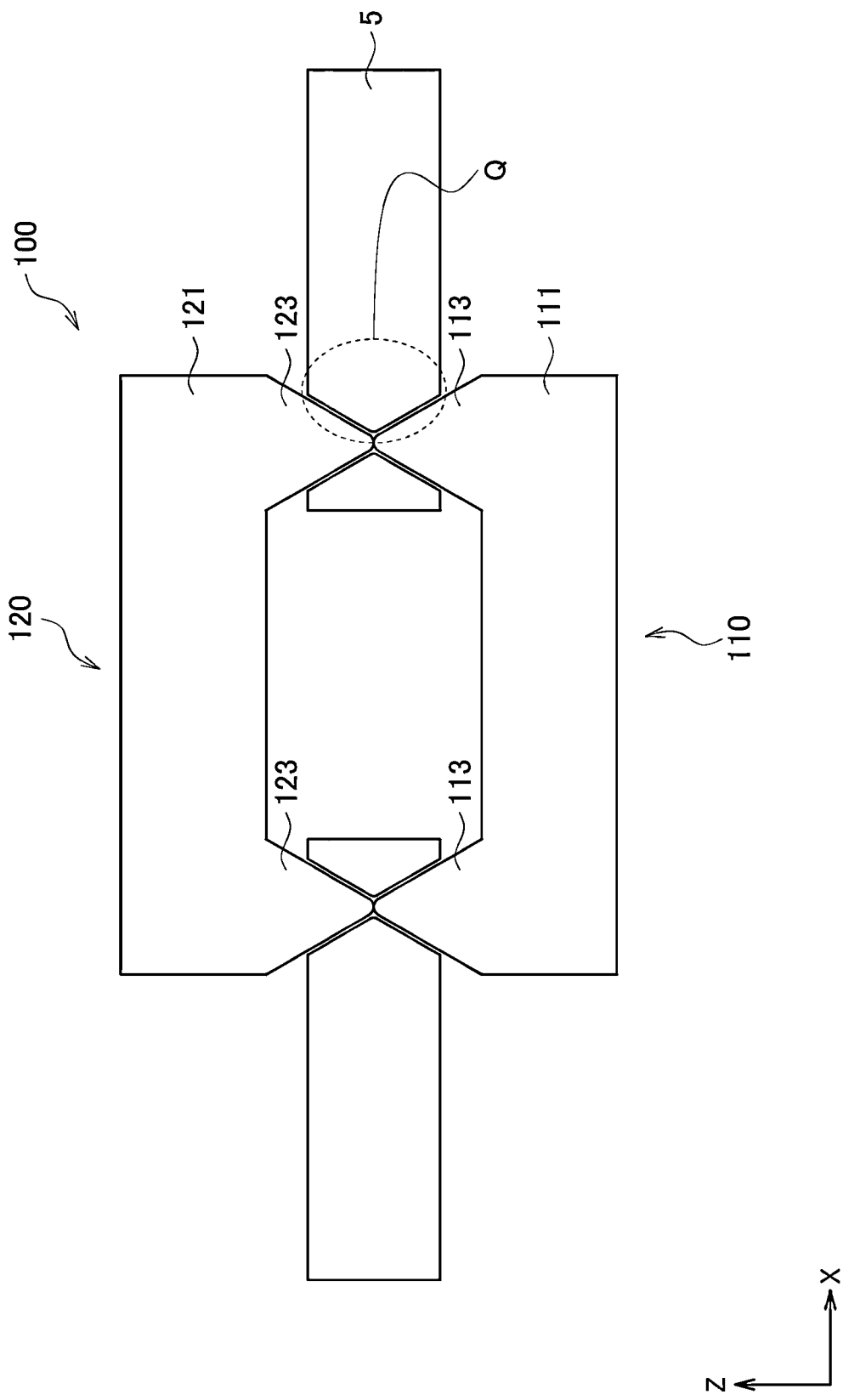
FIG. 17 is an explanatory drawing illustrating a state after cutting the workpiece by means of the cutting tool illustrated in FIG. 16.

First, a method for cutting a workpiece according to the second embodiment of the present invention will be described based on FIG. 13 to FIG. 17. FIG. 13 is a plan view illustrating cutting positions on a workpiece 5 according to the present embodiment. FIG. 14 is an explanatory drawing illustrating a process for forming an intermediate material in the cutting method according to the present embodiment. FIG. 15 is an explanatory drawing illustrating a cutting process in the cutting method according to the present embodiment. FIG. 16 is an explanatory drawing illustrating one example of a cutting tool 100 used in the cutting process according to the present embodiment, and illustrates a state before cutting the workpiece 5. FIG. 17 is an explanatory drawing illustrating a state after cutting workpiece 5 using the cutting tool 100 illustrated in FIG. 16. FIG. 16 and FIG. 17 schematically illustrate the cutting tool 100 and the workpiece 5 illustrated in FIG. 15.

Note that, in the cutting method according to the present embodiment, the workpiece 5 that has been subjected to surface treatment is cut. In the following description, a surface-treated material having a covering layer (the coating layer 5b illustrated in FIG. 4) on the surface of a metallic material (the metallic material 5a in FIG. 4) that is a base material is adopted as an example of the workpiece 5. Examples of this kind of workpiece include a plated metal sheet obtained by subjecting the surface of a metal sheet to a plating treatment, a painted metal sheet obtained by coating the surface of a metallic material as a base material with paint, and a film-laminated metal sheet obtained by laminating a film on a metal sheet.

The cutting method according to the present embodiment is a method for cutting a closed region of the workpiece 5 from the workpiece 5. As one example of this kind of cutting method, in the present embodiment a cutting method employed when a portion at which a closed region has been removed from the workpiece 5 and a through-hole is formed is to be utilized as a product, as in the case of performing piercing, will be described. It suffices that the closed region is a shape represented by a curved line (and may include a straight line), and for example the closed region may have a shape such as a circle or an ellipse.

The cutting method according to the present embodiment includes a process of forming an intermediate material from the workpiece 5, and a process of cutting the intermediate material to acquire a portion to be utilized as a product. For example, in the case of cutting a circular closed region from the workpiece 5 illustrated in FIG. 13, first, in the process of forming the intermediate material from the workpiece 5, the workpiece 5 is cut at a cutting position P1, to thereby form an intermediate material in which the portion on the inner side from the cutting position P1 has been removed. The cutting position P1 is set further on the inner side than a cutting position P2 at which the intermediate material is to be finally cut. Next, in the process for cutting the intermediate material, the intermediate material is cut at the cutting position P2 at which it is desired to finally cut the intermediate material. The intermediate material is cut using a cutting tool in which a wedge-shaped cutting part is provided in a die and a punch.

Thus, in the cutting method according to the present embodiment, by cutting an intermediate material using wedge-shaped cutting parts to form the final product shape, as illustrated in FIG. 4, the cut end face of the workpiece 5 after cutting can be covered with the coating layer 5b. Therefore, the corrosion resistance of the cut end face can be enhanced while maintaining the flat surface corrosion resistance of the workpiece 5. Further, before cutting the workpiece 5 at the cutting position P2 at which it is desired to perform the final cutting, the closed region is cut to thereby leave a surplus region. By this means, when cutting the closed region at the cutting position P2, because a space for the material to move in can be secured, the workpiece 5 can be reliably cut.

(Intermediate Material Forming Process)

An example of the process for forming the intermediate material from the workpiece 5 is illustrated in FIG. 14. In FIG. 14, the workpiece 5 is cut at the cutting position P1 using a cutting tool 50 having a die 51 and a punch 52. The die 51 is a tubular member having a through-hole with a shape which corresponds to the closed region to be cut at the cutting position P1. The punch 52 is a member that is to be inserted through the through-hole of the die 51, and has a shape which corresponds to the internal space of the through-hole of the die 51. By pushing down the punch 52 in a state in which the workpiece 5 has been placed on the die 51, the closed region at the cutting position P1 is cut from the workpiece 5. As a result, as illustrated on the lower side of FIG. 14, the workpiece 5 in which a through-hole has been formed is obtained. The obtained workpiece 5 is used as an intermediate material.

The through-hole in the intermediate material is formed on the inner side of the cutting position P2 at which it is desired to perform the final cutting. When it is assumed that the region of the workpiece 5 to be obtained by cutting the intermediate material at the cutting position P2 in the next process is the final shape region, the cutting position P1 is set on the opposite side to the final shape region, along the edge of the final shape region (that is, the cutting position P2). In other words, in addition to the final shape region, the intermediate material also has, as a surplus region, a portion between the cutting position P2 and the cutting position P1. The surplus region is cut in the next process. By forming the intermediate material in this manner, when the intermediate material is cut at the cutting position P2 in the next process, it is possible for the material to move to the through-hole side.

Note that, the method for forming the intermediate material from the workpiece 5 is not limited to the method that uses the cutting tool 50 illustrated in FIG. 14, and may be performed using laser cutting or another cutting method.

(Cutting Process)

An example of the process for cutting the intermediate material is illustrated in FIG. 15. The cutting tool 100 for cutting the intermediate material has, as illustrated in FIG. 15, a die 110 having a wedge-shaped first cutting part 113 on a base 111, and a punch 120 having a wedge-shaped second cutting part 123 on a base 121. The wedge-shaped first cutting part 113 and second cutting part 123 are formed in a closed shape corresponding to the cutting position P2. For example, in a case where the cutting position P2 is circular as illustrated in FIG. 15, the wedge-shaped first cutting part 113 and second cutting part 123 are formed in a circular shape.

As illustrated in FIG. 16, the workpiece 5 that is to be cut by the first cutting part 113 of the die 110 and the second cutting part 123 of the punch 120 is arranged between the die 110 and the punch 120. For example, the workpiece 5 is placed on the die 110. At such time, the die 110 and the punch 120 are installed so that the first cutting part 113 and the second cutting part 123 face each other. Then, in a state in which the workpiece 5 has been placed on the die 110, the punch 120 is pushed down relatively with respect to the die 110 so that the workpiece 5 is cut at the cutting position P2 as illustrated in FIG. 17. As illustrated on the lower side in FIG. 15, in the workpiece 5 which was cut by the cutting tool 100, the surplus region has been removed and only the final shape region remains.

The cutting tool 100 according to the present embodiment is configured so that, when the punch 120 is pushed down to the die 110, by means of tensile forces that arise between the first cutting part 113 and second cutting part 123 and the workpiece 5, a coating layer on the respective surfaces of the workpiece 5 is caused to extend onto the cut end face so that the cut end face is covered with the coating layer. That is, the coating layer on the respective surfaces of the workpiece 5 is caused to follow the movements of the first cutting part 113 and the second cutting part 123 with respect to the workpiece 5 when the punch 120 is pushed down to the die 110, and the coating layer is caused to extend onto the cut end face. By this means, the cut end face of the workpiece 5 can be coated with the coating layer.

(2. Covering of Cut End Face by Coating Layer)

The cut end face of the workpiece 5 that was cut by the cutting tool 100 is as illustrated in FIG. 4, similarly to the first embodiment. As illustrated in FIG. 4, the cut end face of the workpiece 5 is composed of shear drops s1 and s2, inclined faces s3 and s4, and a fracture surface s5. The shear drop s1 and the inclined face s3 are formed by the first cutting part 113 of the die 110, and the shear drop s2 and the inclined face s4 are formed by the second cutting part 123 of the punch 120. The fracture surface s5 is formed as a result of the workpiece 5 rupturing in a manner in which cracks generated in the workpiece 5 by the first cutting part 113 and the second cutting part 123 serve as starting points.

As illustrated in FIG. 4, the coating layer 5b on the top surface side of the metallic material 5a covers the metallic material 5a continuously from the surface of the metallic material 5a to the shear drop s1 and the inclined face s3. Similarly, the coating layer 5b on the bottom surface side of the metallic material 5a covers the metallic material 5a continuously from the surface of the metallic material 5a to the shear drop s2 and the inclined face s4. Thus, in the workpiece 5 that was cut by the cutting tool 100 according to the present embodiment, the region from each surface of the metallic material 5a to the cut end face is covered with the same continuous coating layer 5b. For example, after cutting the workpiece 5 it is possible to cover the cut end face by subjecting the cut end face to a surface treatment such as plating or painting. However, it is difficult to cover the cut end face with a material that has the same composition as the coating layer 5b of the workpiece 5, and the corrosion resistance of the cut end face will be low compared to the surface of the metallic material 5a.

In contrast, because the workpiece 5 which was cut by the cutting tool 100 according to the present embodiment is covered from each surface to the cut end face of the metallic material 5a with the continuous same coating layer 5b simultaneously with cutting, it is difficult for the cut end face to be oxidized. Therefore, by cutting the workpiece 5 using the cutting tool 100 according to the present embodiment, the workpiece 5 that has high corrosion resistance at the cut end face can be provided.

Note that, the shape of the cut end face of the workpiece 5 that was cut by the cutting tool 100 according to the present embodiment depends on the shape of the first cutting part 113 and the second cutting part 123. Because the first cutting part 113 and the second cutting part 123 are each a wedge shape, the shape at the cut end face of the workpiece 5 is a shape having the inclined faces s3 and s4 along the wedge-shaped inclinations as illustrated in FIG. 4, and not a vertical shear surface as illustrated in FIG. 36. Therefore, for example, the cut end face of the workpiece 5 that was cut by the cutting tool 100 illustrated in FIG. 15 has a shape that progressively protrudes in the direction toward the center in the radial direction.

By making the shape of the first cutting part 113 and the second cutting part 123 a wedge shape, when cutting the workpiece 5 it is easy for the coating layer 5b on the surfaces of the metallic material 5a to follow the movements of the first cutting part 113 and the second cutting part 123 along the inclinations of the wedge shape. As a result, as illustrated in FIG. 4, the coating layer 5b on the surfaces of the metallic material 5a can be caused to follow the movements of the first cutting part 113 and the second cutting part 123 as far as the inclined faces s3 and s4 of the cut end face, and not just the shear drops s1 and s2. Further, because the shear drops s1 and s2 are formed at both the front and rear surfaces of the workpiece 5 by the cutting part 113 and the cutting part 123, a burr-free cut surface is formed.

Further, the coating layer 5b on the surface of the metallic material 5a follows the inclinations of the first cutting part 113 and the second cutting part 123 to move to the cut end face. At such time, the amount of the coating layer 5b covering the surfaces of the inclined faces s3 and s4 of the cut end face gradually decreases toward the fracture surface s5, as illustrated in FIG. 4. By causing the coating layer 5b to cover the inclined faces s3 and s4 in this way, even if the area of the cut end face of the metallic material 5a which is coated with the coating layer 5b increases, the amount of the coating layer 5b covering the surface of the metallic material 5a that is moved to the cut end face hardly increases, and hence the flat surface corrosion resistance of the workpiece 5 can be maintained.

Note that, because the fracture surface s5 is a surface that is formed as a result of cracks occurring which cause the workpiece 5 to rupture, it is difficult to cause the coating layer 5b to extend onto as far as the fracture surface s5. However, because the workpiece 5 is cut along the inclined surfaces of the first cutting part 113 and the second cutting part 123 until a state is entered in which a front end 113a of the first cutting part 113 and a front end 123a of the second cutting part 123 substantially come in contact with each other, the proportion of the cut end face which the fracture surface s5 accounts for is very small. Therefore, even if the fracture surface s5 is not covered with the coating layer 5b, the corrosion resistance is not significantly reduced.

In addition, by making the first cutting part 113 of the die 110 and the second cutting part 123 of the punch 120 a wedge shape as in the cutting tool 100 according to the present embodiment, it is possible to also cut, for example, a material having a tensile strength of 200 MPa or more or a thick material. Further, it is possible to cut a material having a tensile strength of 270 MPa or more and, furthermore, a material having a tensile strength of 590 MPa or more.

(3. Shape of Cutting Parts of Cutting Tool)

In the cutting tool 100 for cutting an intermediate material used in the cutting method according to the present embodiment, the first cutting part 113 of the die 110 and the second cutting part 123 of the punch 120 have the same wedge shape, as illustrated in FIG. 16. However, it suffices that each of the first cutting part 113 and the second cutting part 123 is at least a wedge shape, and preferably the shape of each of the first cutting part 113 and the second cutting part 123 satisfies the following conditions with regard to the shape.

(Front End Angle)

A front end angle $\theta_1$ of the first cutting part 113 and a front end angle $\theta_2$ of the second cutting part 123 are preferably made 10° or more and 120° or less. When the front end angles $\theta_1$ and $\theta_2$ are 10° or more, the inclination is large, and therefore the ability of the coating layer 5b to follow the movement of the cutting parts improves and the corrosion resistance of the cut end face is further enhanced. Further, stress applied to the cutting part 113 and the cutting part 123 decreases, damage to the cutting edges is suppressed, and the durability of the tool improves. Furthermore, when the front end angles $\theta_1$ and $\theta_2$ are 120° or less, the load required to cut the workpiece 5 does not become too large, and cracks are easily generated in the workpiece 5 when the respective cutting edges are pushed in, and hence cutting of the workpiece 5 is facilitated. Therefore, the front end angle $\theta_1$ of the first cutting part 113 and the front end angle $\theta_2$ of the second cutting part 123 are made 10° or more and 120° or less, and more preferably are made 30° or more and 90° or less.

(Front End Radius)

A front end radius $R_1$ of the first cutting part 113 and a front end radius $R_2$ of the second cutting part 123 are preferably formed to be 0.5% or more and 35.0% or less of the value of a sheet thickness t. When the front end radii $R_1$ and $R_2$ are each 0.5% or more of the value of the sheet thickness t, stress applied to the cutting edges of the cutting part 113 and the cutting part 123 does not become too large, damage to the cutting edges is suppressed, and durability improves. Further, when the front end radii $R_1$ and $R_2$ are each 35.0% or less of the value of the sheet thickness t, the shape of the cut end face will be good. Furthermore, since cracks will be easily generated in the workpiece 5 when the respective cutting edges are pushed in, cutting of the workpiece 5 will be further facilitated. Therefore, the front end radius $R_1$ of the first cutting part 113 and the front end radius $R_2$ of the second cutting part 123 are made 0.5% or more and 35.0% or less of the value of the sheet thickness t, and more preferably are made 3.0% or more and 10.0% or less of the value of the sheet thickness t.

In this case, the first cutting part 113 and the second cutting part 123 may be different shapes to each other. For example, if at least one of the front end radii $R_1$ and $R_2$ or the front end angles $\theta_1$ and $\theta_2$ is different, the first cutting part 113 and the second cutting part 123 will be different shapes to each other. By making the first cutting part 113 and the second cutting part 123 a different shape to each other, the fracture surface ratio can be changed. Note that, the fracture surface ratio is the ratio of the fracture surface s5 to the sheet thickness of the workpiece 5.

At such time, the ratio between the front end radius $R_1$ of the first cutting part 113 and the front end radius $R_2$ of the second cutting part 123 (front end radii ratio $R_1/R_2$ or $R_2/R_1$) is preferably less than 100, and more preferably is less than 10. Most preferable is a case where the front end radii $R_1$ and $R_2$ are equal. Note that, the magnitude relationship between the front end radius $R_1$ of the first cutting part 113 and the front end radius $R_2$ of the second cutting part 123 is not particularly limited. Further, the ratio between the front end angle $\theta_1$ of the first cutting part 113 and the front end angle $\theta_2$ of the second cutting part 123 (front end angles ratio $\theta_1/\theta_2$ or $\theta_2/\theta_1$) is preferably less than 4, and more preferably is less than 2. Most preferable is a case where the front end angles $\theta_1$ and $\theta_2$ are equal. Note that, the magnitude relationship between the front end angle $\theta_1$ of the first cutting part 113 and the front end angle $\theta_2$ of the second cutting part 123 is not particularly limited.

By setting the front end radii ratio $R_1/R_2$ or $R_2/R_1$ and the front end angles ratio $\theta_1/\theta_2$ or $\theta_2/\theta_1$ to be within the aforementioned ranges, the fracture surface ratio can be lowered. When at least one of the front end radii and the front end angles differs significantly between the first cutting part 113 and the second cutting part 123, cutting by one of the cutting parts will proceed first, and therefore deformation of the workpiece 5 will be concentrated. As a result, rupturing of the workpiece 5 will occur earlier and the fracture surface ratio will increase, and consequently the proportion of the cut end face which is coated with the coating layer 5b will decrease. Therefore, by setting the front end radii ratio $R_1/R_2$ or $R_2/R_1$ and the front end angles ratio $\theta_1/\theta_2$ or $\theta_2/\theta_1$ so as to be within the aforementioned ranges, the fracture surface ratio can be lowered.

(Amount of Deviation Between Front End Positions)

The position of the front end 113a of the first cutting part 113 and the position of the front end 123a of the second cutting part 123 may be caused to match in a horizontal direction perpendicular to the direction in which the die 110 and the punch 120 face each other (that is, the sheet thickness direction of the workpiece 5), as illustrated in FIG. 16 and FIG. 17. By causing the position of the front end 113a of the first cutting part 113 and the position of the front end 123a of the second cutting part 123 to match, a force in the X direction that is applied to the cutting part 113 and the cutting part 123 can be reduced, thereby enhancing the durability. Further, cracks can be generated from the cutting edge at an appropriate timing to complete cutting.

Figure 18:
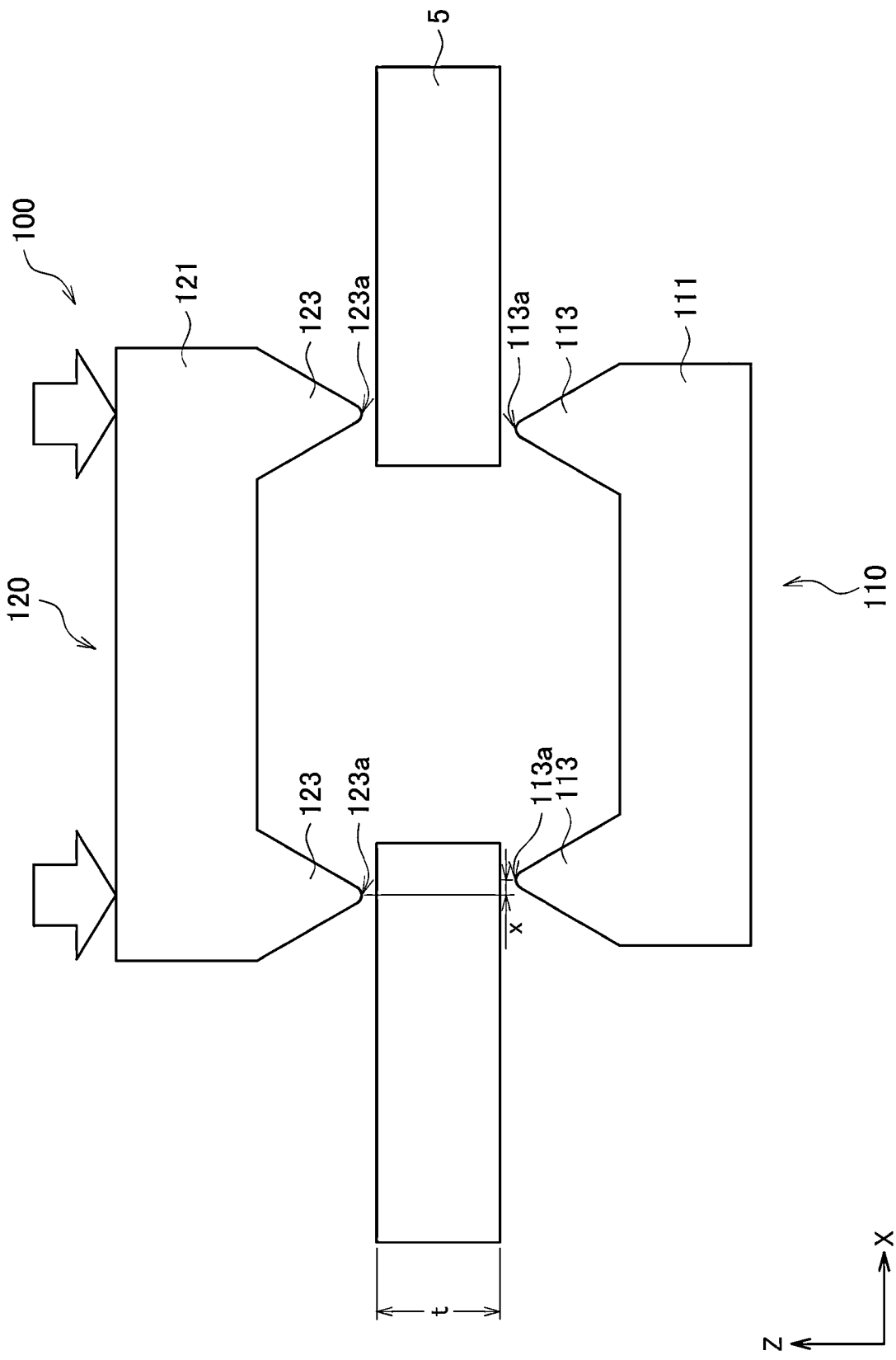
FIG. 18 is an explanatory drawing illustrating the cutting tool according to the second embodiment, and illustrates an amount of deviation between the position of the front end of a first cutting part and the position of the front end of a second cutting part.

Alternatively, as illustrated in FIG. 18, the position of the front end 113a of the first cutting part 113 and the position of the front end 123a of the second cutting part 123 may deviate radially from each other by an amount of deviation x. The phrase "amount of deviation x between the front end positions" means the distance between the front end 113a of the first cutting part 113 and the front end 123a of the second cutting part 123 in a horizontal direction (that is, the X direction) that is perpendicular to the direction in which the first cutting part 113 and the second cutting part 123 face each other. The amount of deviation between the front end positions is preferably 50% or less of the value of the sheet thickness t. If the amount of deviation between the front end positions is 50% or less of the value of the sheet thickness t, the workpiece 5 can be cut in a manner such that desired end face properties are reliably obtained.

(Trimming Width)

The phrase "trimming width D of the workpiece 5" refers to the length of the workpiece 5 which should be left from the cutting position P2 in the opposite direction to final shape region when cutting with the cutting tool 100. That is, the trimming width D of the workpiece 5 is the length of the surplus region (distance between the cutting position P1 and the cutting position P2) of the intermediate material, and as illustrated in FIG. 16, is represented by the length from the cutting position to one of the end portions of the workpiece 5. As illustrated in FIG. 18, in a case where the position of the front end 113a of the first cutting part 113 and the position of the front end 123a of the second cutting part 123 deviate with respect to each other, it suffices to take the trimming width D of the workpiece 5 as, for example, the length from an end portion of the workpiece 5 to the front end position of the cutting part on the side closer to the relevant end portion.

The trimming width D of the workpiece 5 is equal to or greater than a front end radius R of the cutting part, and is 5 times or less the sheet thickness t of the workpiece 5 (R≤D≤5t), and in particular is preferably 3 times or less the sheet thickness t of the workpiece 5 (R≤D≤3t). More preferably, the trimming width D of the workpiece 5 is 3 times or more the front end radius R of the cutting part, and is equal to or less than the sheet thickness t of the workpiece 5 (3R≤D≤t). Note that, the phrase "front end radius R of the cutting part" refers to the front end radius $R_1$ of the first cutting part 113 or the front end radius $R_2$ of the second cutting part 123. In a case where the front end radii $R_1$ and $R_2$ are the same, $R=R_1=R_2$. In a case where the front end radii $R_1$ and $R_2$ are different to each other, the smaller radius among the front end radius $R_1$ of the first cutting part 113 and the front end radius $R_2$ of the second cutting part 123 is taken as the front end radius R ($R=\text{Min}(R_1, R_2)$).

By setting the trimming width D to be 5 times or less the sheet thickness t, and more preferably 3 times or less the sheet thickness t, formation of the fracture surface s5 due to cutting can be suppressed, and the fracture surface ratio can be reduced. On the other hand, by setting the trimming width D to be equal to or greater than the front end radius R of the cutting part, and in particular to be 3 times or more the front end radius R, displacement of the cutting edge due to elastic deformation of the tool during cutting can be suppressed, and a good end face shape can be obtained by the cutting. The reason for this is as described above based on FIG. 8 and FIG. 9.

By changing the shape of the first cutting part 113 of the die 110, the shape of the second cutting part 123 of the punch 120, the amount of deviation between the front end positions of the respective cutting parts 113 and 123, or the trimming width D of the workpiece 5 in this way, the shape of the cut end face of the workpiece 5 cut by the cutting tool 100 changes, and the coverage state of the cut end face by the coating layer 5b changes. Therefore, it suffices to appropriately set the shape of the first cutting part 113 of the die 110 and the shape of the second cutting part 123 of the punch 120, the amount of deviation between the front end positions of the respective cutting parts 113 and 123, and the trimming width D of the workpiece 5 according to the shape of the cut end face or the corrosion resistance that is required for the workpiece 5 after cutting.

For example, the corrosion resistance of the cut end face can be increased by making the first cutting part 113 of the die 110 and the second cutting part 123 of the punch 120 the same shape, and causing the position of the front end 113a of the first cutting part 113 and the position of the front end 123a of the second cutting part 123 to match so that the first cutting part 113 and the second cutting part 123 are arranged symmetrically with respect to the workpiece 5. This is because the cut end face will be symmetric with respect to the center position of the sheet thickness, and the extent to which the coating layer 5b on the bottom surface side of the workpiece 5 extends onto the inclined face s3, and the extent to which the coating layer 5*b* on the top surface side of the workpiece 5 extends onto the inclined face s4 will be approximately equal.

Further, for example, in the case of making the cut end face flat, a configuration may be adopted in which the first cutting part 113 of the die 110 and the second cutting part 123 of the punch 120 are made different wedge shapes to each other to improve the flatness of the cut end face.

(Height of Cutting Parts)

Similarly to the first embodiment, it suffices to set a height $h_1$ of the first cutting part 113 and a height $h_2$ of the second cutting part 123 so that at least the sum of these heights ($h_1$+$h_2$) is greater than the sheet thickness t of the workpiece 5.

The cutting method according to the present embodiment has been described above. According to the present embodiment, first, in a process for forming the intermediate material from the workpiece 5, the intermediate material is formed by removing the portion on the inner side of the cutting position P1 that is set further on the inner side than the cutting position P2 at which it is desired to perform the final cutting. By this means, when cutting the closed region at the cutting position P2, because a space for the material to move in can be secured, the workpiece 5 can be reliably cut. Next, in the process for cutting the intermediate material, the intermediate material is cut at the cutting position P2 at which it is desired to perform the final cutting. In the process of cutting the intermediate material, as illustrated in FIG. 15, the cutting tool 100 having the die 110 and the punch 120 which have the wedge-shaped cutting parts 113 and 123 is used. By cutting the workpiece 5 by means of the wedge-shaped cutting parts 113 and 123, the coating layer 5*b* on the respective surfaces of the metallic material 5*a* can be caused to follow the movements of the cutting parts 113 and 123 and extend onto the cut end face. The inclined faces s3 and s4 of the cut end face are each coated with the coating layer 5*b* continuously from the respective surfaces of the metallic material 5*a* in a manner so that the amount of the coating layer covering the cut end face decreases toward the fracture surface s5. Therefore, the corrosion resistance of the cut end face can be enhanced while maintaining the flat surface corrosion resistance of the workpiece 5.

(4. Supplement)

(Cutting of Intermediate Material by Plurality of Cutting Processes)

Cutting of the workpiece 5 by the cutting tool 100 used in the process of cutting the intermediate material that is described above may be carried out by performing a single cutting process or by performing a plurality of cutting processes. The phrase "cutting by performing a plurality of cutting processes" refers to executing a cutting process in which the die 110 is pushed down relatively to the punch 120 a plurality of times to thereby cut the workpiece 5 into two pieces. Various kinds of cut end faces can be realized by cutting the workpiece 5 by performing a plurality of cutting processes.

For example, when cutting the workpiece 5 by performing a plurality of cutting processes, the front end angle $\theta_1$ of the first cutting part 113 and the front end angle $\theta_2$ of the second cutting part 123 may be made gradually smaller in the respective cutting processes. As a more specific description, it will be assumed that the plurality of cutting processes include a first cutting process, and a second cutting process which is performed after the first cutting process. At such time, in the second cutting process, at least one operation among an operation that makes the front end angle $\theta_1$ of the first cutting part 113 smaller than the front end angle $\theta_1$ in the first cutting process and an operation that makes the front end angle $\theta_2$ of the second cutting part 123 smaller than the front end angle $\theta_2$ in the first cutting process is performed, and the workpiece 5 is then cut. By this means, the portion of the cut end face which is coated with the coating layer 5*b* can be increased, and a good end face shape can be obtained.

At this time, it is good to make the stroke S of the punch 120 gradually smaller in each cutting process. By setting the stroke to a large amount in the initial cutting process, the ability of the coating layer 5*b* to follow the movements of the first cutting part 113 and the second cutting part 123 increases.

For example, among the plurality of cutting processes, the stroke S of the punch 120 in the first cutting process is preferably set so as to satisfy the relational expression of the aforementioned expression (1). More preferably, the stroke S of the punch 120 in the first cutting process is set so as to satisfy the aforementioned expression (2). Note that, the phrase "the stroke S of the punch 120 in the first cutting process" refers to the stroke amount when a position at which the blade contacts the workpiece 5 is taken as the starting point. By setting the stroke S of the punch 120 in the first cutting process in this way, the portion of the cut end face coated with the coating layer 5*b* can be increased, and a good end face shape can be obtained.

Further, when cutting the workpiece 5 by performing a plurality of cutting processes, the front end radius $R_1$ of the first cutting part 113 and the front end radius $R_2$ of the second cutting part 123 may be gradually made smaller in the respective cutting processes. That is, in the second cutting process, at least one operation among an operation that makes the front end radius $R_1$ of the first cutting part 113 smaller than the front end radius $R_1$ in the first cutting process and an operation that makes the front end radius $R_2$ of the second cutting part 123 smaller than the front end radius $R_2$ in the first cutting process is performed, and the workpiece 5 is then cut. In this case also, similarly to the case of making the front end angle smaller, an advantageous effect is achieved that the portion which the coating layer 5*b* covers on the cut end face can be increased, and a good end face shape can be obtained.

Note that, when it is desired to reduce the load on the cutting tool 100 while causing the coating layer 5*b* to cover the cut end face after having suppressed formation of the shear drops during cutting of the workpiece 5, a configuration may be adopted so as to gradually increase the front end angle $\theta_1$ of the first cutting part 113 and the front end angle $\theta_2$ of the second cutting part 123 in the respective cutting processes.

[2-2. Case where Closed Region Removed from Workpiece is to be Utilized as a Product (Punching)]

Figure 19:
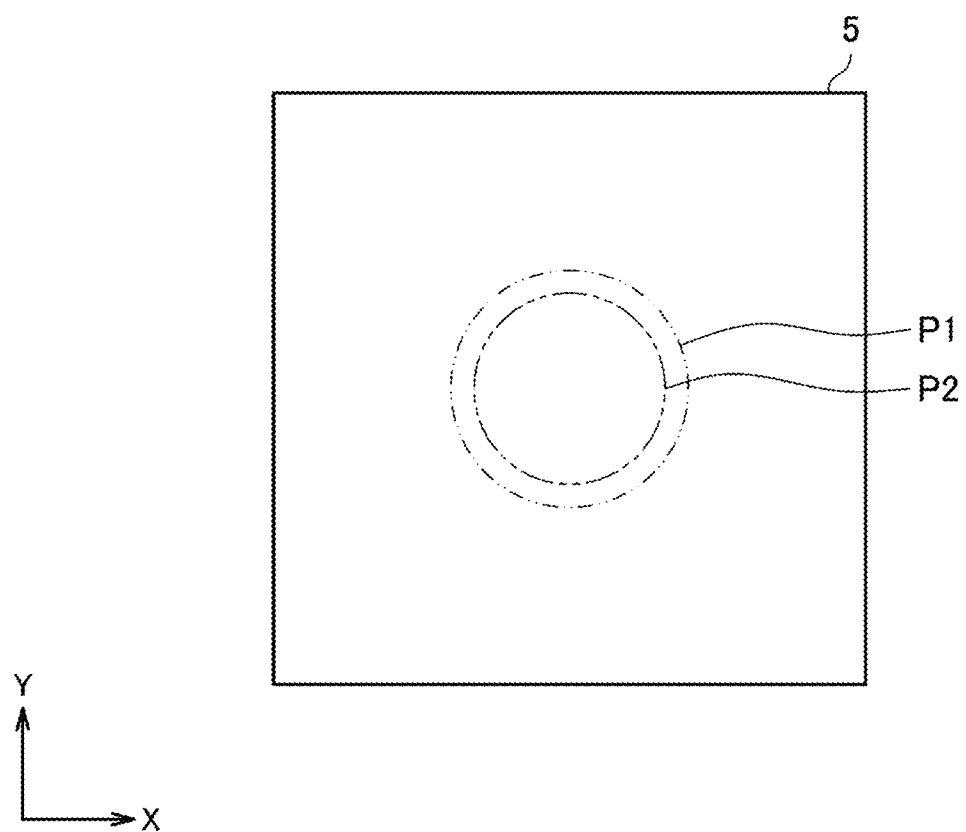
FIG. 19 is a plan view illustrating cutting positions of a workpiece in another cutting method according to the second embodiment.
Figure 20:
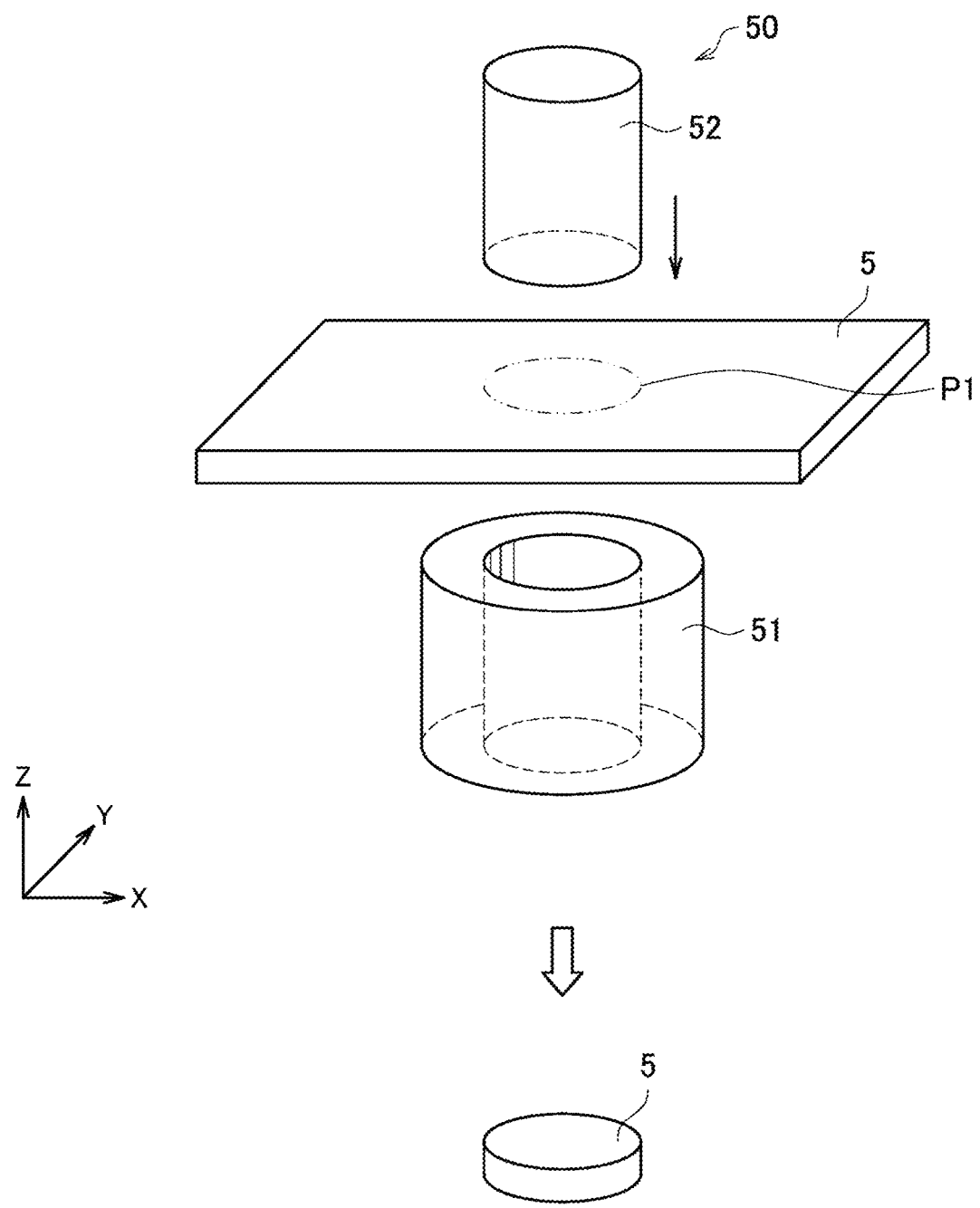
FIG. 20 is an explanatory drawing illustrating a process for forming an intermediate material in the other cutting method according to the second embodiment.
Figure 21:
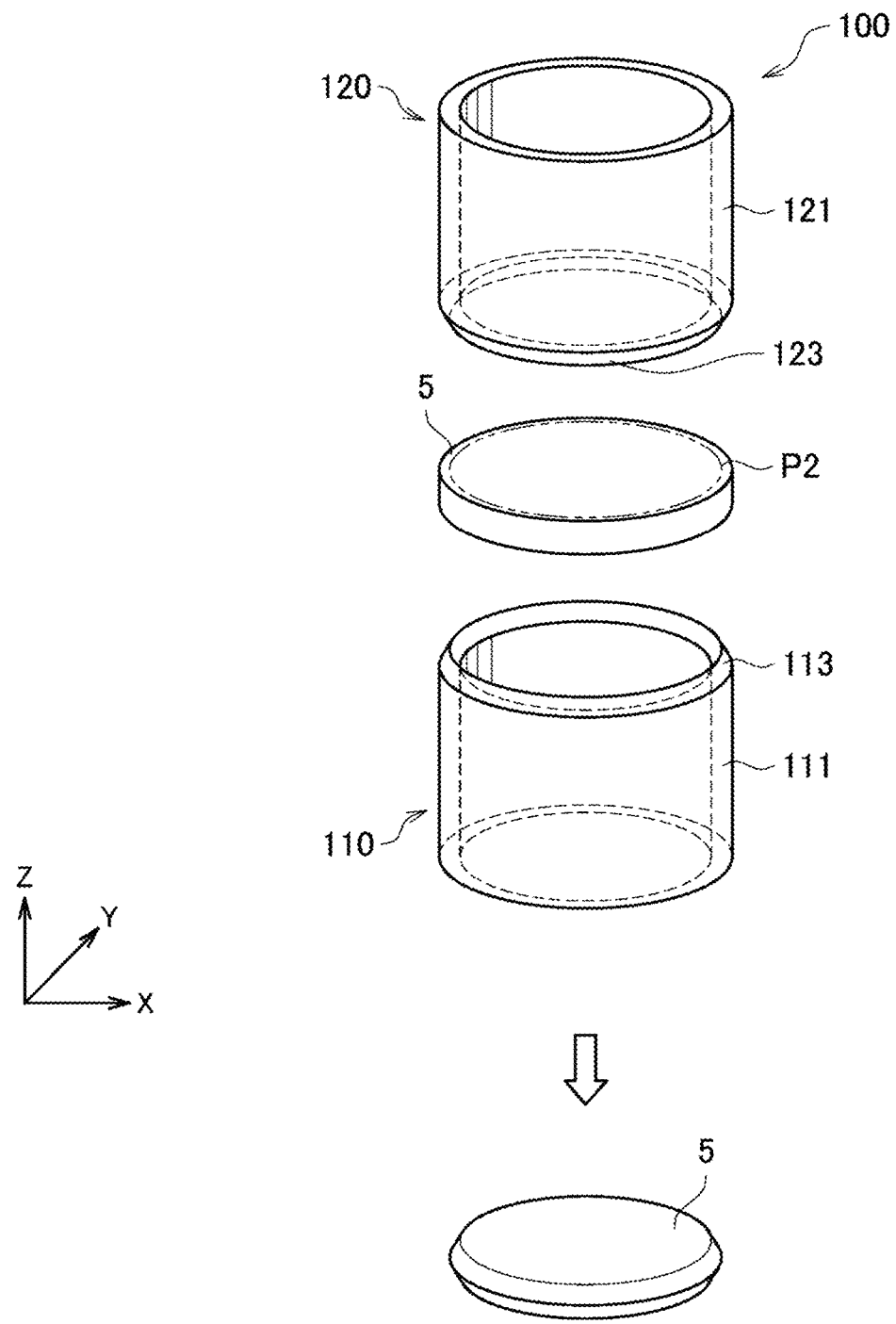
FIG. 21 is an explanatory drawing illustrating a cutting process in the other cutting method according to the second embodiment.

Next, based on FIG. 19 to FIG. 21, a method for cutting a workpiece according to the second embodiment of the present invention will be described. FIG. 19 is a plan view illustrating cutting positions on the workpiece 5 in another cutting method according to the present embodiment. FIG. 20 is an explanatory drawing illustrating a process for forming an intermediate material in the other cutting method according to the present embodiment. FIG. 21 is an explanatory drawing illustrating a cutting process in the other cutting method according to the present embodiment.

Whilst the cutting method according to the present embodiment is a method for cutting, from the workpiece 5, a closed region of the workpiece 5 in a similar manner to the case of performing piercing that is described above, here a cutting method will be described that is performed when the portion of the closed region extracted from the workpiece 5 is to be utilized as a product, as in the case of performing punching. Similarly to when performing piercing as described above, it suffices that the closed region is a shape represented by a curved line, and for example the closed region may be a shape such as a circle or an ellipse.

Similarly to the case of performing piercing that is described above, the cutting method according to the present embodiment includes a process of forming an intermediate material from the workpiece 5, and a process of cutting the intermediate material to acquire a portion to be utilized as a product. For example, in the case of cutting a circular closed region from the workpiece 5 illustrated in FIG. 19, first, in the process of forming the intermediate material from the workpiece 5, the workpiece 5 is cut at a cutting position P1, to thereby form an intermediate material in which the portion on outer side of the cutting position P1 has been removed. The cutting position P1 is set further on the outer side than a cutting position P2 at which the intermediate material is to be finally cut. Next, in the process for cutting the intermediate material, the intermediate material is cut at the cutting position P2 at which it is desired to finally cut the intermediate material. The intermediate material is cut using a cutting tool in which a wedge-shaped cutting part is provided in a die and a punch.

Thus, in the cutting method according to the present embodiment, by cutting an intermediate material using wedge-shaped cutting parts to form the final product shape, as illustrated in FIG. 4, the cut end face of the workpiece 5 after cutting can be covered with the coating layer 5b. Therefore, the corrosion resistance of the cut end face can be enhanced while maintaining the flat surface corrosion resistance of the workpiece 5. Further, before cutting the workpiece 5 at the cutting position P2 at which it is desired to perform the final cutting, the closed region is cut to thereby leave a surplus region. By this means, when cutting the closed region at the cutting position P2, because a space for the material to move in can be secured, the workpiece 5 can be reliably cut.

(Intermediate material forming process)

An example of the process for forming the intermediate material from the workpiece 5 is illustrated in FIG. 20. In FIG. 20, the workpiece 5 is cut at the cutting position P1 using a cutting tool 50 having a die 51 and a punch 52. The cutting tool 50 illustrated in FIG. 20 has a similar configuration to the cutting tool 50 illustrated in FIG. 14. The die 51 is a tubular member having a through-hole with a shape which corresponds to the closed region to be cut at the cutting position P1. The punch 52 is a member that is to be inserted through the through-hole of the die 51, and has a shape which corresponds to the internal space of the through-hole of the die 51. By pushing down the punch 52 in a state in which the workpiece 5 has been placed on the die 51, the closed region at the cutting position P1 is cut from the workpiece 5. As a result, as illustrated on the lower side of FIG. 20, the workpiece 5 is obtained. The obtained workpiece 5 is used as an intermediate material.

The through-hole in the intermediate material is formed on the outer side of the cutting position P2 at which it is desired to perform the final cutting. In the present embodiment also, the cutting position P1 is set on the opposite side to the final shape region, along the edge of the final shape region (that is, the cutting position P2). In other words, in addition to the final shape region, the intermediate material also has, as a surplus region, a portion between the cutting position P2 and the cutting position P1. The surplus region is cut in the next process. By forming the intermediate material in this way, when the intermediate material is cut at the cutting position P2 in the next process, it is possible for the material to move outward.

Note that, the method for forming an intermediate material from the workpiece 5 is not limited to the method that uses the cutting tool 50 illustrated in FIG. 20, and may be performed using laser cutting or another cutting method.

(Cutting Process)

An example of the process for cutting the intermediate material is illustrated in FIG. 21. The cutting tool 100 illustrated in FIG. 21 has a similar configuration to the cutting tool 100 illustrated in FIG. 15. That is, the cutting tool 100 for cutting the intermediate material has, as illustrated in FIG. 21, a die 110 having a wedge-shaped first cutting part 113 on a base 111, and a punch 120 having a wedge-shaped second cutting part 123 on a base 121. The wedge-shaped first cutting part 113 and second cutting part 123 are formed in a closed shape corresponding to the cutting position P2. For example, in a case where the cutting position P2 is circular as illustrated in FIG. 21, the wedge-shaped first cutting part 113 and second cutting part 123 are formed in a circular shape.

The workpiece 5 to be cut by the first cutting part 113 of the die 110 and the second cutting part 123 of the punch 120 is arranged between the die 110 and the punch 120. For example, the workpiece 5 is placed on the die 110. At such time, the die 110 and the punch 120 are installed so that the first cutting part 113 and the second cutting part 123 face each other. Then, in a state in which the workpiece 5 has been placed on the die 110, the punch 120 is pushed down relatively with respect to the die 110 so that the workpiece 5 is cut at the cutting position P2. As illustrated on the lower side in FIG. 21, in the workpiece 5 which was cut by the cutting tool 100, the surplus region has been removed and only the final shape region remains.

As described in the first embodiment, in the cutting tool 100, when the punch 120 is pushed down to the die 110, by means of tensile forces that arise between the first cutting part 113 and second cutting part 123 and the workpiece 5, a coating layer on the respective surfaces of the workpiece 5 is caused to extend onto the cut end face so that the cut end face is covered with the coating layer. That is, the coating layer on the respective surfaces of the workpiece 5 is caused to follow the movements of the first cutting part 113 and the second cutting part 123 with respect to the workpiece 5 when the punch 120 is pushed down to the die 110, and the coating layer is caused to extend onto the cut end face. By this means, the cut end face of the workpiece 5 can be coated with the coating layer.

Note that, it suffices that the first cutting part 113 of the die 110 and the second cutting part 123 of the punch 120 are configured to have a similar shapes to the configuration in the first embodiment. Further, cutting of the intermediate material by the cutting tool 100 may be also carried out by performing cutting one time or by performing cutting a plurality of times.

A method for cutting a workpiece according to the second embodiment of the present invention have been described above. Note that, although in the above embodiment a cutting method is described in which a process for forming an intermediate material from a workpiece, and a process for cutting the intermediate material to acquire a portion to be utilized as a product are performed, the present invention is not limited to this example. For example, in a case where the intermediate material did not rupture in the process of cutting the intermediate material, a process of cutting off the surplus region from the intermediate material may be further included. The process in question is performed in order to completely separate the portion to be utilized as a product from the other portion, and the method of performing the process is not particularly limited. For example, the surplus region may be cut off from the intermediate material by using the cutting tool 50 illustrated in FIG. 14 or FIG. 20. Since the cutting tool used at this time is used to completely cut the surplus region off from the intermediate material, it is good to use a cutting tool that has a similar form to the cutting tool used in the process for forming the intermediate material from the workpiece, but which has a different die diameter and punch diameter to the cutting tool used in the process for forming the intermediate material.

3. Cut Article

[3-1. Schematic Structure]

Figure 22:
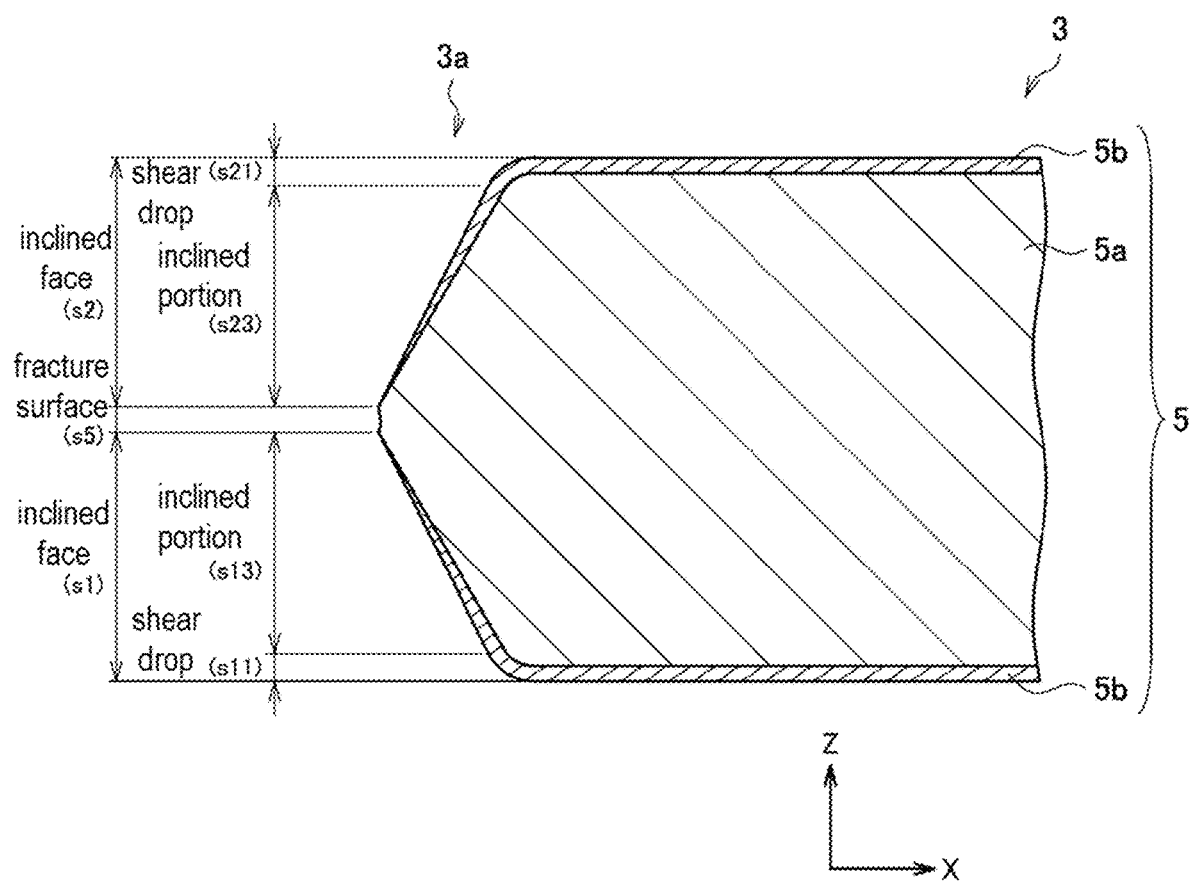
FIG. 22 is an explanatory drawing schematically illustrating a cut end face of a cut article according to one embodiment of the present invention.

Hereunder, based on FIG. 22, the structure of a cut article 3 produced by cutting a workpiece using the cutting method according to the embodiment described above will be described. FIG. 22 is an explanatory drawing that schematically illustrates a cut end face 3a of the cut article 3 according to the present embodiment, and illustrates a state in which the cut end face 3a is viewed from the side. In the following description a plated steel sheet 5 in which plating 5b which is a coating material is covered on the surface of a steel sheet 5a that is a base material is adopted as one example of a multi-layer material. The plated steel sheet 5 is, for example, a plated steel sheet defined in JIS G-3301, 3302, 3314, 3321 or 3323 or the like. Further, the sheet length direction of the plated steel sheet 5 is taken as the X direction, the sheet width direction thereof is taken as the Y direction, and the sheet thickness direction thereof is taken as the Z direction. In FIG. 22, the cut article 3 formed by cutting the plated steel sheet 5 in the sheet thickness direction (Z direction) is illustrated, and a state in which the cut end face 3a is viewed from the sheet width direction (Y direction) is shown.

As illustrated in FIG. 22, the cut end face 3a of the cut article 3 is composed of a first inclined face s1, a second inclined face s2, and a fracture surface s5.

The first inclined face s1 is composed of a shear drop s11 and an inclined portion s13. The second inclined face s2 is composed of a shear drop s21 and an inclined portion s23. The shear drops s11 and s21 are deformations that occur due to tensile forces acting on the surfaces of the plated steel sheet 5 when the plated steel sheet 5 is cut. The inclined portions s13 and s23 are faces that are continuous with the shear drops s11 and s21, and which have a predetermined inclination angle with respect to the sheet thickness direction of the plated steel sheet 5. At least one part of the first inclined face s1 and the second inclined face s2 is covered with the plating 5b which covers the surfaces of the steel sheet 5a.

The fracture surface s5 is a face formed between the first inclined face s1 and the second inclined face s2. The fracture surface s5 is formed as a result of the plated steel sheet 5 rupturing in a manner in which cracks generated in the plated steel sheet 5 during cutting serve as starting points. Therefore, it is difficult for the fracture surface s5 to be coated with the plating 5b, which leaves the steel sheet 5a being exposed.

Figure 23:
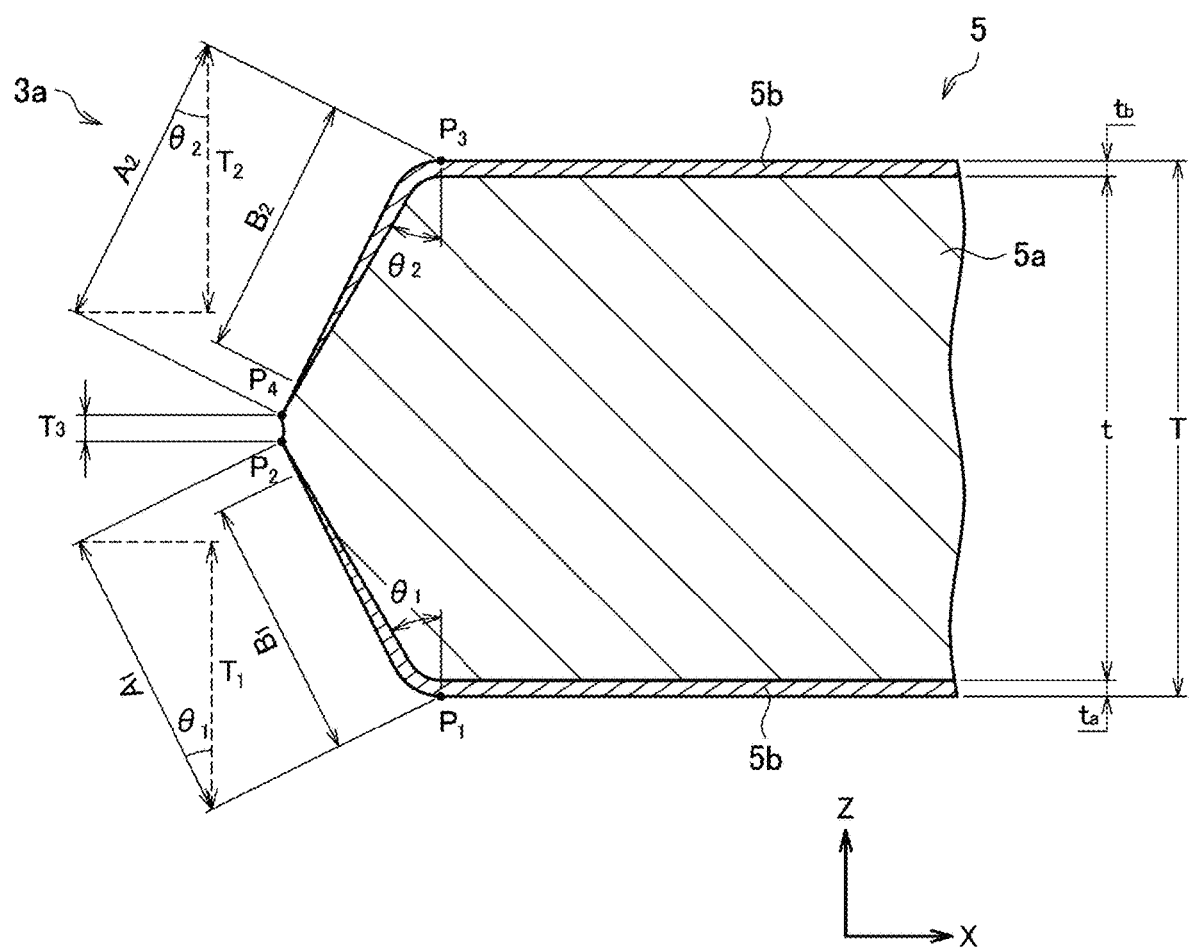
FIG. 23 is an explanatory drawing for describing the shape of the cut article according to the embodiment illustrated in FIG. 22.
Figure 24:
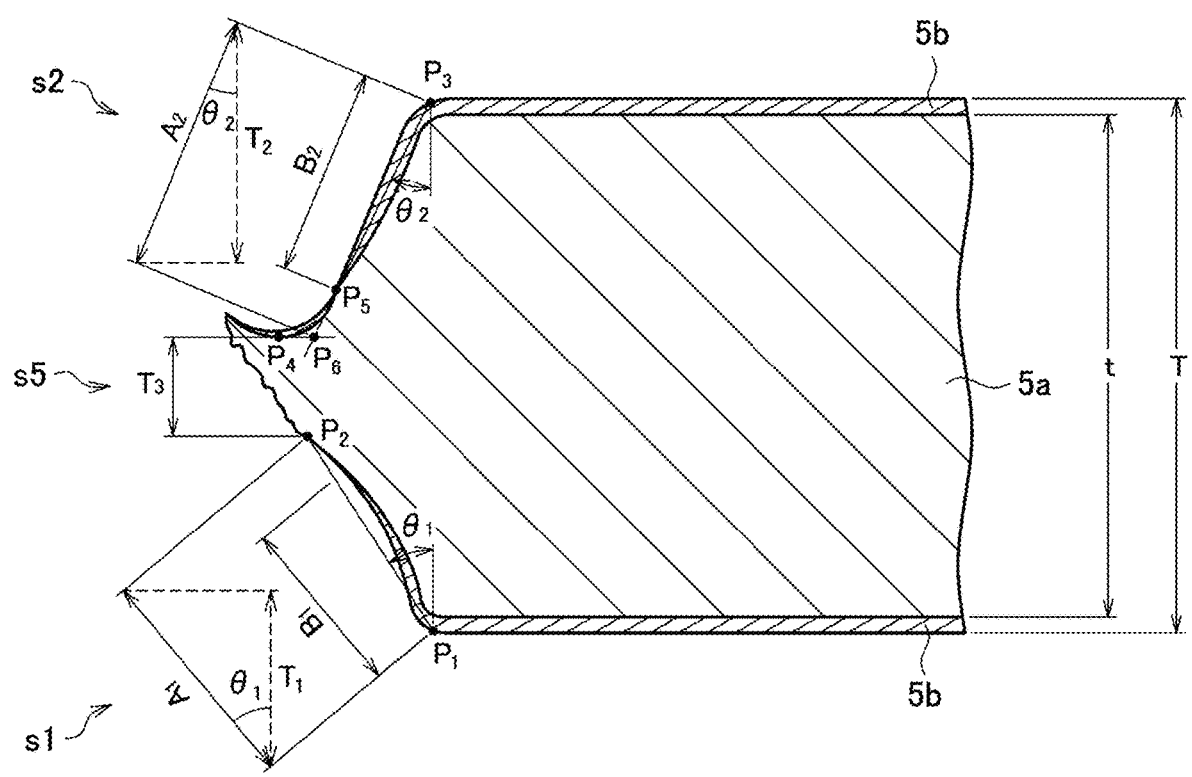
FIG. 24 is an explanatory drawing illustrating another example of the shape of the cut article according to the embodiment illustrated in FIG. 22.

As illustrated in FIG. 22, as viewed from the side, the cut end face 3a has a shape in which the fracture surface s5 protrudes more than the first inclined face s1 and the second inclined face s2. Further, when the cut end face 3a is viewed from the side, the shape of the steel sheet 5a that is the base material of the first inclined face s1 and the second inclined face s2 is a substantially linear shape. Hereunder, the structure of the cut article 3 according to the present embodiment will be described in detail based on FIG. 22 to FIG. 24. FIG. 23 is an explanatory drawing for describing the shape of the cut article 3 according to the present embodiment. FIG. 24 is an explanatory drawing illustrating another example of the shape of the cut article 3 according to the present embodiment.

[3-2. Characteristics]

(Lengths of inclined faces, and ratio between lengths of both inclined faces)

The cut article 3 has the cut end face 3a which is composed of the first inclined face s1, the second inclined face s2 and the fracture surface s5. With respect to the first inclined face s1 and the second inclined face s2 of the cut end face 3a of the cut article 3, the thicknesses of the respective inclined faces s1 and s2 when the cut end face 3a is viewed from the front (X direction) satisfy the following relational expression (3). The relational expression (3) represents that, with regard to the cut end face 3a of the cut article 3 according to the present embodiment, the sum of a thickness $T_1$ of the first inclined face s1 when the cut end face 3a is viewed from the front (that is, the length of the first inclined face s1 in the sheet thickness direction ($A_1 \cos \theta_1$)) and a thickness $T_2$ of the second inclined face s2 when the cut end face 3a is viewed from the front (that is, the length of the second inclined face s2 in the sheet thickness direction ($A_2 \cos \theta_2$)) is less than a sheet thickness T of the plated steel sheet 5.

$$(T_1+T_2)<T \tag{3}$$

$T_1=A_1 \cos \theta_1$, $T_2=A_2 \cos \theta_2$ $A_1$: length of first inclined face s1 when cut end face 3a is viewed from the side $A_2$: length of second inclined face s2 when cut end face 3a is viewed from the side $\theta_1$: inclination angle of first inclined face s1

$\theta_2$: inclination angle of second inclined face s2

T: sheet thickness of plated steel sheet 5

Further, in the cut article 3, the ratio ($T_1/T_2$) between the thickness $T_1$ of the first inclined face s1 of the cut end face 3a and the thickness $T_2$ of the second inclined face s2 satisfy the following relational expression (4). The relational expression (4) expresses that, with regard to the cut end face 3a of the cut article 3 according to the present embodiment, the ratio between the thickness ($T_1=A_1 \cos \theta_1$) of the first inclined face s1 and the thickness ($T_2=A_2 \cos \theta_2$) of the second inclined face s2 is 0.6 or more and 1.4 or less. This indicates that the difference between the shape of the first inclined face s1 and the shape of the second inclined face s2 is small, that is, that the degree of symmetry of the cut end face 3a is high. The ratio ($T_1/T_2$) between the thickness $T_1$ of the first inclined face s1 and the thickness $T_2$ of the second inclined face s2 is desirably 0.75 or more and 1.25 or less, and more desirably is 0.85 or more and 1.15 or less.

$$0.6 \leq (T_1/T_2) \leq 1.4 \tag{4}$$

By causing the ratio ($T_1/T_2$) to satisfy this relational expression, a multi-layer material in which the degree of symmetry of the cut end face 3a is high can be obtained. For example, at least one part of the cut end face 3a is covered with the coating materials covering the respective surfaces of the base material which moves to follow the blades during cutting of the multi-layer material. At this time, in a case where the respective thicknesses of the coating materials covering the two surfaces of the base material are approximately the same, the higher that the degree of symmetry of the cut end face 3a is, the greater the degree to which the thicknesses of the coating materials covering the cut end face 3a on the first inclined face s1 and the second inclined face s2, respectively, will be the same. As a result, the corrosion resistance of the cut end face 3a can be stabilized.

In this case, as illustrated in FIG. 23, the term "length $A_1$ of the first inclined face s1" refers to the linear length from the end portion of the shear drop s11 on the surface side of the plated steel sheet 5 (hereinafter, referred to as "inclination start position $P_1$") to the end portion on the fracture surface s5 side of the inclined portion s13 (hereinafter, referred to as "inclination end position $P_2$"). The term "length $A_2$ of the second inclined face s2" refers to the linear length from the end portion of the shear drop s21 on the surface side of the plated steel sheet 5 (hereinafter, referred to as "inclination start position $P_3$") to the end portion on the fracture surface s5 side of the inclined portion s23 (hereinafter, referred to as "inclination end position $P_4$").

Further, depending on the shape of the cutting tool 100, the cut end face 3a of the cut article 3 will have a shape in which, for example, as illustrated in FIG. 24, the fracture surface s5 appears to have been torn apart. In this case also, the first inclined face s1 and the second inclined face s2 are each composed of a shear drop and am inclined portion. One of the inclined faces (in FIG. 24, the first inclined face s1) has approximately the same inclination as the fracture surface s5, and the other inclined face (in FIG. 24, the second inclined face s2) has a shape that inclines toward the fracture surface s5 and thereafter turns upwards. In this case, it suffices to define the thickness $T_1$ of the first inclined face s1 and the thickness $T_2$ of the second inclined face s2 as follows.

Similarly to FIG. 23, the inclination start position $P_1$ of the first inclined face s1 and the inclination start position $P_3$ of the second inclined face s2 are end portions of the shear drops on the surface sides of the plated steel sheet 5. The length $A_1$ of the first inclined face s1 is the linear length from the inclination start position $P_1$ of the inclined face s1 to the inclination end position P2 that is the end portion of the inclined face s1 on the fracture surface s5 side. The length $A_2$ of the second inclined face s2 is the linear length from the inclination start position $P_3$ of the inclined face s2 to the inclination end position $P_4$ that is the end portion of the inclined face s2 on the fracture surface s5 side. At such time, if the inclined faces s1 and s2 are recessed and curved toward the steel sheet 5a side, the lengths may be determined by linear approximation. Further, with regard to the inclined face s2 that turns upward as illustrated in FIG. 24, the inclination between an end portion $P_5$ of a portion where the plating 5b is present on the fracture surface s5 side and the inclination start position $P_3$ may be linearly approximated, and an intersection point P6 between the approximated straight line and an extension line in the horizontal direction passing through the inclination end position $P_4$ which is also the apex of the upward turning may be regarded as the inclination end position $P_4$, and may be taken as one end of the length $A_2$ of the second inclined face s2. A thickness $T_3$ of the fracture surface s5 is the distance between the inclination end position P2 and the inclination end position $P_4$.

An inclination angle $\theta_1$ of the first inclined face s1 is, as illustrated in FIG. 23 and FIG. 24, the inclination of the inclined portion s13 with respect to a reference straight line extending in the sheet thickness direction (Z direction). The angle formed by a straight line connecting the inclination start position $P_1$ and inclination end position P2, and the reference straight line may be regarded as the inclination angle $\theta_1$. Similarly, an inclination angle $\theta_2$ of the second inclined face s2 is the inclination of the inclined portion s23 with respect to the reference straight line. The angle formed by a straight line connecting the inclination start position $P_3$ and inclination end position $P_4$, and the reference straight line may be regarded as the inclination angle $\theta_2$.

As illustrated in FIG. 23 and FIG. 24, the sheet thickness T of the plated steel sheet 5 is represented by the sum of the sheet thickness t of the steel sheet 5a and plating layer thicknesses $t_a$ and $t_b$ of the plating 5b formed on the surfaces of the steel sheet 5a. Note that, although in FIG. 22 to FIG. 24 an example is illustrated in which the plating layer thickness $t_a$ and the plating layer thickness $t_b$ are taken as being approximately the same, the present technique is not limited to this example, and the plating layer thickness $t_a$ and the plating layer thickness $t_b$ may be different thicknesses to each other.

In addition, in the cut article 3, the thickness $T_3$ of the fracture surface s5 when the cut end face 3a is viewed from the front satisfies the following relational expression (5). Relational expression (5) represents that, in the cut end face 3a of the cut article 3 according to the present embodiment, the length of the fracture surface s5 that is a ductile fracture surface at the final stage of cutting is 50% or less of the sheet thickness. Note that, when the thickness $T_3$ of the fracture surface s5 is 0, it means that the cut end face 3a is composed of only the inclined faces s1 and s2. Since the fracture surface s5 exists even in a state that is substantially close to 0 in the actual cut article, the thickness $T_3$ of the fracture surface s5 of the cut article 3 is assumed to be greater than 0. The thickness $T_3$ of the fracture surface s5 is desirably made 0.4, and more desirably is made 0.3 or less.

$$0 < T_3 \leq 0.5T \qquad (5)$$

By causing the thickness $T_3$ to satisfy this relational expression, the inclined faces s1 and s2 (that is, the shear drop portions s11 and s21 and the inclined portions s13 and s23) increase, and as a result the plating coverage improves. That is, in a case where sacrificial protection is applied to the base material, an advantageous effect of improving the corrosion resistance of the cut end face is exhibited. Further, this shape can be obtained by adjusting the cutting edge shape or position of the cutting tool.

(Plating Coating on Inclined Faces)

At least one part of each of the first inclined face s1 and the second inclined face s2 is covered with plating. More specifically, as illustrated in FIG. 22, the first inclined face s1 is coated with the plating 5b which covers the bottom surface (first surface) of the steel sheet 5a. The second inclined face s2 is coated with the plating 5b which covers the top surface (second surface) of the steel sheet 5a. Thus, the first inclined face s1 and the second inclined face s2 are covered with the plating 5b that continues from a plating layer of the plated steel sheet 5, respectively. By the same plating 5b covering the regions from the respective surfaces of the steel sheet 5a up to each inclined face in this way, oxidization of the steel sheet 5a at the cut end face 3a can be suppressed.

For example, after cutting the plated steel sheet 5, by subjecting the cut end face 3a to a plating treatment or painting, it is possible to ensure that the steel sheet 5a is not exposed at the cut end face 3a. However, it is difficult to cover the cut end face 3a with a material having the same composition as the plating 5b of the plated steel sheet 5, and the corrosion resistance of the cut end face 3a will be low compared to the corrosion resistance of the surface of the steel sheet 5a. In contrast, the cut end face 3a of the cut article 3 according to the present embodiment is covered from each surface of the steel sheet 5a up to the inclined faces s1 and s2 with the continuous same plating 5b. During cutting, while being pushed against the steel sheet 5a, the relevant plating 5b moves toward the inclined faces s1 and s2 from the surfaces of the steel sheet 5a following the movements of the cutting parts of the cutting tool. Therefore, in comparison to a case of performing a surface treatment on the cut end face 3a after cutting, the adhesion between the steel sheet 5a and the plating 5b at the cut end face 3a increases, and the corrosion resistance of the cut end face 3a can be enhanced.

Further, the amount of the plating 5b covering the first inclined face s1 and the second inclined face s2 decreases toward the center from the surfaces of the steel sheet 5a in the sheet thickness direction (Z direction). That is, as illustrated in FIG. 22 and FIG. 23, compared to the plating layer thickness of the plating 5b covering the surfaces of the steel sheet 5a, on the first inclined face s1 and the second inclined face s2 the plating layer thickness gradually decreases toward the center in the sheet width direction from the surfaces. The plating 5b covering the first inclined face s1 and the second inclined face s2 is plating that covers the first inclined face s1 and the second inclined face s2 as the result of movement of the plating 5b of the plating layers constituting the plated steel sheet 5. Therefore, if the plating layer thickness of the plating 5b on the first inclined face s1 and the second inclined face s2 becomes large, although the corrosion resistance of the cut end face 3a will increase, there is a possibility that the flat surface corrosion resistance will decrease since the plating layer thickness of the plating 5b on the surfaces of the steel sheet 5a will become smaller. Accordingly, by the plating 5b being covered on the first inclined face s1 and the second inclined face s2 in a manner so that the amount of the plating 5b covering the inclined faces decreases from the surfaces of the steel sheet 5a toward the center, along with maintaining the flat surface corrosion resistance of the cut article 3, the corrosion resistance of the cut end face 3a can also be increased.

As illustrated in FIG. 22 to FIG. 24, the shape of the steel sheet 5a that is the base material of the first inclined face s1 and the second inclined face s2 may be formed so as to be an approximately linear shape when the cut end face 3a is viewed from the side. For instance, if it is assumed that the shape of the cut end face 3a of the steel sheet 5a is an arc shape as viewed from the side, the surface area of the end face of the steel sheet 5a will be large in comparison to a case where, as illustrated in FIG. 22 to FIG. 24, the steel sheet 5a of the first inclined face s1 and the second inclined face s2 is an approximately linear shape. In such a case, it will be necessary to cause a greater amount of the plating 5b of the plating layer to move from the surface side to the cut end face 3a in order to cover the cut end face 3a. Therefore, as illustrated in FIG. 22 to FIG. 24, by adopting a configuration so that the shape of the steel sheet 5a that is the base material of the first inclined face s1 and the second inclined face s2 has an approximately linear shape when the cut end face 3a is viewed from the side, the occurrence of a defect such as cracking of the plating at the outer layer or localized thinning can be suppressed.

In addition, with respect to the first inclined face s1 and the second inclined face s2, it is not necessarily required for the entire inclined faces to be covered with the plating 5b, and it suffices that at least one part of the inclined faces is covered with the plating 5b. If one part of the inclined faces s1 and s2 is covered, the progress of corrosion will be suppressed by a sacrificial protection effect with respect to portions that are not covered with the plating 5b also. In order to exert a sacrificial protection effect on the inclined faces s1 and s2 and the fracture surface s5, a plating coverage X of the inclined faces s1 and s2 is preferably 20% or more.

Here, the plating coverage X is the ratio of lengths $B_1$ and $B_2$ of portions at which the plating 5b is present with respect to lengths $A_1$ and $A_2$ of the inclined faces s1 and s2 when the cut end face 3a is viewed from the side (that is, the sheet width direction (Y direction)), and is represented by the following expression (6). Note that, in the following expression (6), A is the sum of the length $A_1$ of the first inclined face s1 and the length $A_2$ of the second inclined face s2 (that is, $A_1+A_2$). Further, B is the sum of the length $B_1$ of a portion at which the plating 5b is present on the first inclined face s1 and the length $B_2$ of a portion at which the plating 5b is present on the second inclined face s2 (that is, $B_1+B_2$).

$$X=100\times(B/A) \qquad (6)$$

A ($=A_1+A_2$): length of inclined faces
B ($=B_1+B_2$): length of portions at which plating is present The respective lengths $B_1$ and $B_2$ of the portions at which the plating 5b is present are taken as the respective lengths from inclination start positions $P_1$ and $P_3$ to the respective positions at which the plating layer thickness of the plating 5b on the inclined faces s1 and s2 becomes about 5% of plating layer thickness $t_a$ and $t_b$ of the plated steel sheet 5 before cutting. This is because, when the long-term use of the material that is subjected to plating treatment for corrosion resistance is taken into consideration, the cut end face 3a also needs to have the same degree of corrosion resistance as the surface of the plated steel sheet 5. When taking into account the spreading of a plating component which melted out from the plated steel sheet 5 to the cut end face, it is considered that if about 5% of the plating remains on the cut end face 3a, it will be exhibited as the initial corrosion resistance. Further, it suffices to set a coefficient for identifying a position where the plating 5b remains according to the sheet thickness t of the steel sheet 5a. If the sheet thickness t of the steel sheet 5a is a small value, the coefficient may be small. Note that, it suffices that the sheet thickness t of the steel sheet 5a is a sheet thickness with which it is possible to produce the cut article 3, and for example may be the sheet thickness t set to 0.2 mm or more and 10 mm or less.

Further, in a case where the cut article 3 has the cut end face 3a having a shape as illustrated in FIG. 24, with respect to the inclined face s2 that is turned upward, although the plating 5b is substantially absent at a location located further on the shear drop side than the inclination end position $P_4$ that is also the apex of the upward turning, in some cases plating that remains at the front end of the tool adheres to the area in the vicinity of the inclination end position $P_4$. Since the adherence of plating in the vicinity of the inclination end position $P_4$ is an uncertain element, even if the plating layer thickness in the vicinity of the inclination end position $P_4$ is about 5% or more of the plating layer thicknesses $t_a$ and $t_b$ of the plated steel sheet 5 before cutting, it is better to not consider the vicinity of the inclination end position $P_4$ as part of the length $B_2$ of the portion at which the plating 5b is present.

Thus, according to the present embodiment, by making the shape of the cut end face of the plated steel sheet 5 a shape as described above, the corrosion resistance of the cut end face can be improved while maintaining the flat surface corrosion resistance by means of the plating 5b that is a multi-layer material on the plated steel sheet 5.

(Method for Observing Cut End Face)

It is possible to identify the shape of the cut article 3 by observing the cut end face 3a.

The thickness $T_1$ of the first inclined face s1 and the thickness $T_2$ of the second inclined face s2 when the cut end face 3a is viewed from the front are measured by embedding the cut article 3 in a resin or the like and polishing to prepare a sample, and then observing the sample from the side. That is, the sample is observed from the Y direction (sheet width direction) as illustrated in FIG. 22. Observation is performed using, for example, a stereoscopic microscope or a scanning electron microscope (SEM). Specifically, for example, it suffices to divide the sample equally in the width direction by the number of measurements, and to perform measurement at each of the cross sections. It is good to perform the measurement at least at three locations. It suffices to take the average value of the thickness of the first inclined face s1 at the respective cross sections as the thickness $T_1$ of the first inclined face s1, and to take the average value of the thickness of the second inclined face s2 at the respective cross sections as the thickness $T_2$ of the second inclined face s2.

When observing the coverage of a coating material on a cut end face, there are cases where, depending on the kind of coating material, coating material which is less than the actual coverage is observed. Therefore, for example, when preparing a sample, it is desirable to embed a portion around the coating material in a resin or the like in a state in which it is reinforced by a backing plate and to then perform polishing. Further, it is desirable to use a polishing method in accordance with the kind or hardness of the coating material.

As another method for observing the cut end face 3a of the cut article 3 that is different from the method which observes a sample prepared by embedding the cut article 3 in a resin or the like, for example, a method may be used which observes the cut end face 3a from the front using a stereoscopic microscope or SEM-EDS (energy dispersive X-ray spectroscopy). In a case where it is possible to determine the presence of the coating material by means of color or gloss, it suffices to determine the coating material of the cut end face 3a using a stereoscopic microscope. On the other hand, when is difficult to confirm the presence of the coating material based on color or gloss, it suffices to determine the presence of the coating material using an SEM backscattered electron image (BSE image) or EDS.

Since the places on the cut end face 3a at which the coating material is actually present can be estimated based on these methods, it can be confirmed whether or not polishing has been performed as intended. Note that, in a case where it is difficult to polish the sample, the thickness $T_1$ of the first inclined face s1 and the thickness $T_2$ of the second inclined face s2 may be identified by observing the cut article 3 from the front (that is, from the X direction) and measuring the length of portions at which the coating material is present on the cut end face 3a. At such time, the length of a portion at which the coating material is present may be measured at a plurality of locations in the sheet width direction of the cut end face 3a, and the average length of the measured lengths may be adopted as the thickness of the inclined face.

Note that, with regard to the cut article 3 according to the present embodiment, as long as a variation with respect to the sum of the thickness $T_1$ of the first inclined face s1 and the thickness $T_2$ of the second inclined face s2 as well as the value of a ratio therebetween is 30% or less in a range of 60% or more of the sheet width of the multi-layer material, it is possible to improve the corrosion resistance of the cut end face while maintaining the flat surface corrosion resistance of the multi-layer material of the cut end face 3a. At such time, it suffices that, in the range of 60% or more of the sheet width of the multi-layer material, a variation in the coverage of the coating material when the cut end face 3a is viewed from the side is 30% or less. With regard to a variation in the coverage, similarly to when measuring the coverage as described above, it suffices to measure portions which are coated with the coating material at a plurality of locations in the sheet width direction using a stereoscopic microscope or SEM-EDS, and calculate the average value of these measured values, and then calculate a variation from the average value.

The structure of the cut article 3 produced by cutting a workpiece using the cutting method according to the present embodiment has been described above. Note that, although the cut article described in the above embodiment has a shape that is vertically symmetrical with respect to the center in the sheet thickness direction, the present invention is not limited to this example, and the cut article may have a shape that is a vertically asymmetric shape. For example, the length $A_1$ of the first inclined face s1 may be shorter than the length $A_2$ of the second inclined face s2. Further, the inclination angles $\theta_1$ and $\theta_2$ need not necessarily be the same.

EXAMPLES (A. Plating Coverage State of Cut End Face)

Figure 25:
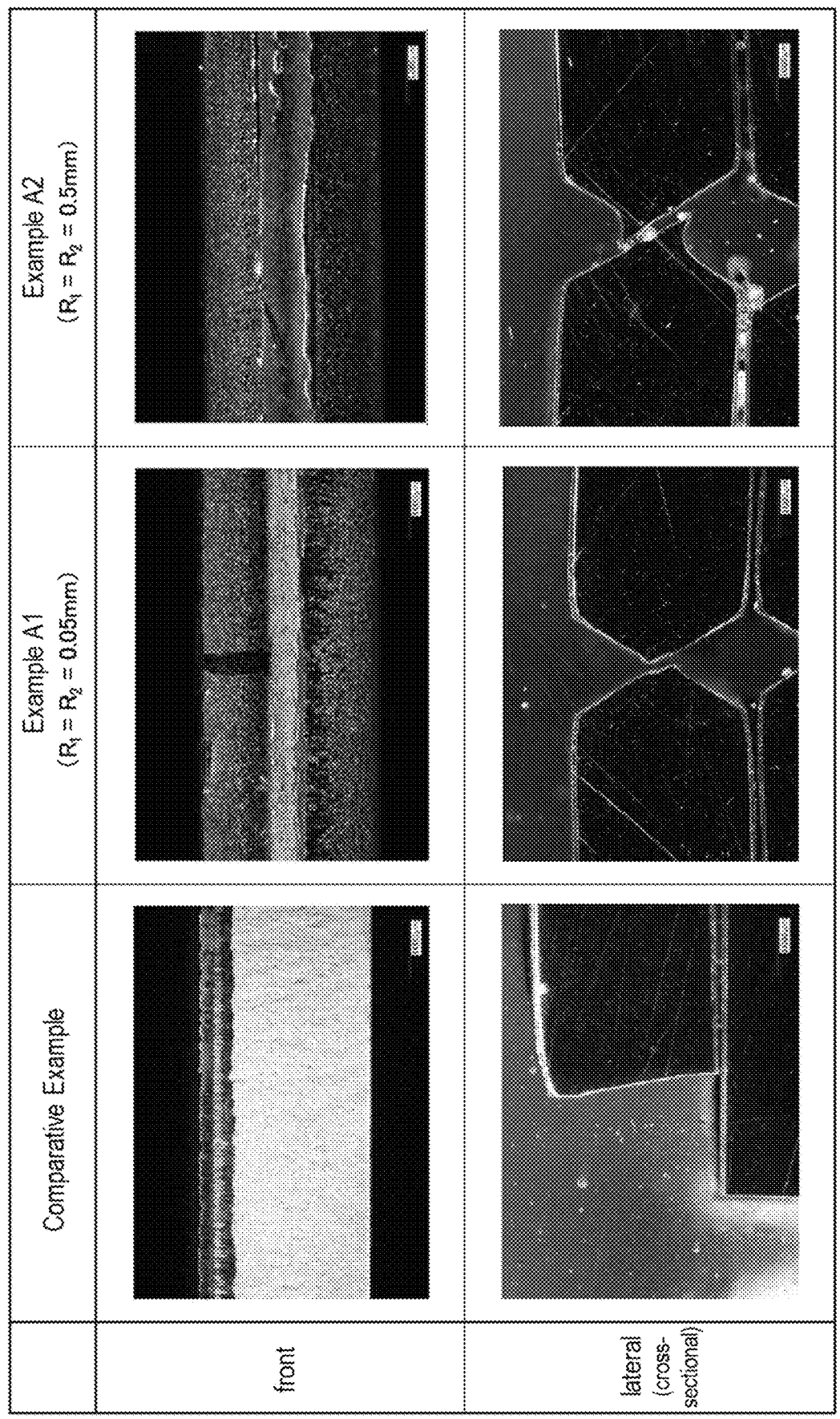
FIG. 25 shows, as Example (A), front photographs and lateral cross-sectional photographs of cut end faces of plated metallic materials which were cut with a cutting tool.
Figure 35:
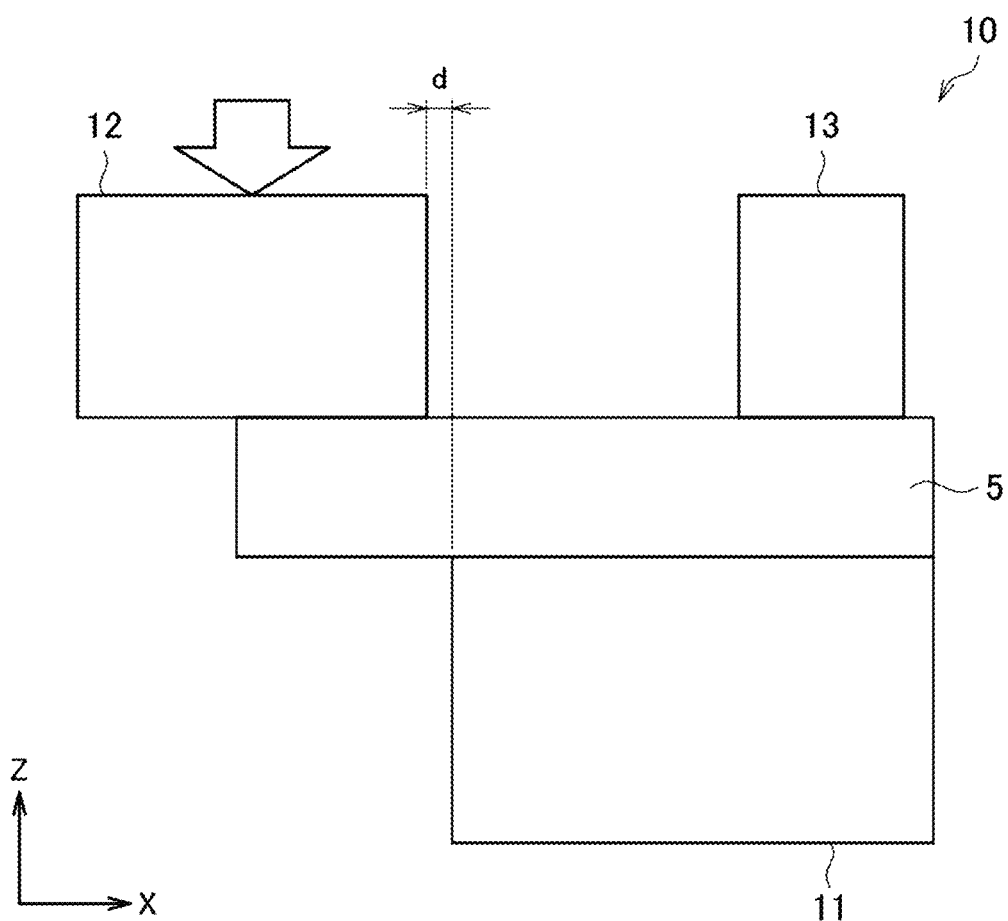
FIG. 35 is an explanatory drawing illustrating one example of a conventional shearing tool.

A plated metallic material was adopted as a workpiece that had been subjected to a surface treatment, and the coverage state of plating at a cut end face of the plated metallic material when the plated metallic material was cut by cutting tools was observed. Front photographs and lateral cross-sectional photographs of the respective cut end faces of the plated metallic material which was cut by the cutting tools are shown in FIG. 25. In FIG. 25, as a Comparative Example, a front photograph and a lateral cross-sectional photograph of the cut end face of a plated metallic material when the plated metallic material was cut using the conventional shearing tool 10 illustrated in FIG. 35 are shown. Further, in FIG. 25, as Examples $A_1$ and $A_2$, front photographs and lateral cross-sectional photographs of the cut end face of a plated metallic material when the plated metallic material was cut using the cutting tool 100 of the present invention illustrated in FIG. 1 are shown. In Example $A_1$, the front end radius $R_1$ of the cutting edge of the die and the front end radius $R_2$ of the cutting edge of the punch were each 0.05 mm. In Example $A_2$, the front end radius $R_1$ of the cutting edge of the die and the front end radius $R_2$ of the cutting edge of the punch were each 0.5 mm.

Figure 26:
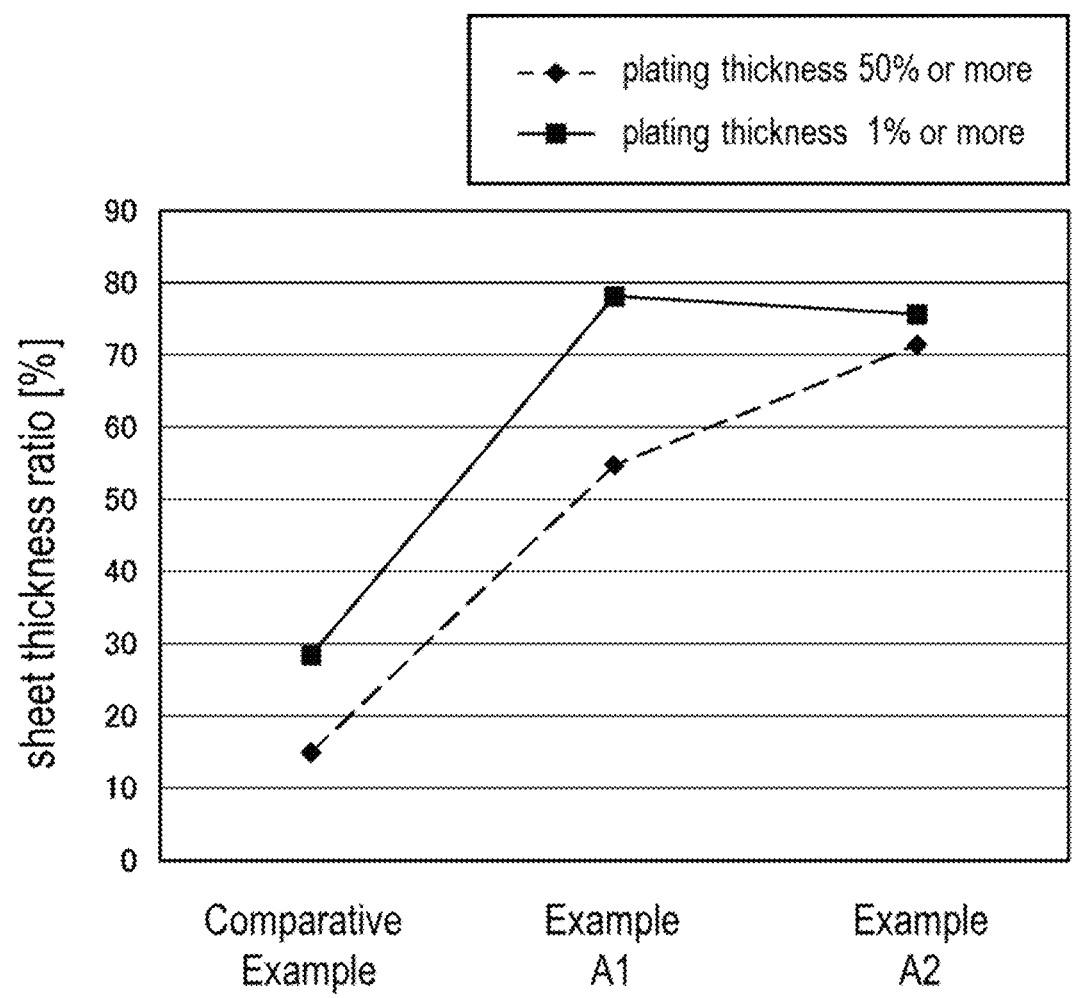
FIG. 26 is a graph illustrating, as examples, sheet thickness ratios which represent a coverage state of a metallic material by plating, with respect to the cut end face of a plated metallic material.

Furthermore, with regard to the plated metallic material used in the Comparative Example and Examples $A_1$ and $A_2$ shown in FIG. 25, a ratio of a portion coated with the plating with respect to the sheet thickness of the plated metallic material of the cut end face (hereinafter, referred to as "sheet thickness ratio") is shown in FIG. 26. The sheet thickness ratio is represented by the length in the sheet thickness direction when the cut end face of the plated metallic material is seen in plan view. In FIG. 26, with respect to a front visual field of each cut end face shown in FIG. 25, a sheet thickness ratio of the area of a portion of which 50% or more is coated with the plating that appears in white in the corresponding image (hereinafter, referred to as "50% plating-coated portion") to the total area of the cut end face, and a sheet thickness ratio of the area of a portion of which 1% or more is coated with the plating (that is, the area ratio of places at which the plating covers the metallic material even a little; hereinafter, referred to as "1% plating-coated portion") to the total area of the cut end face are shown.

Specifically, as illustrated in FIG. 27, for the Comparative Example, the sheet thickness of the plated metallic material is taken as $t_0$, the sheet thickness of the 50% plating-coated portion is taken as $t_1$, and the sheet thickness of the 1% plating-coated portion is taken as $t_2$. For Example $A_1$ and $A_2$, the sheet thickness of the plated metallic material is taken as to, the sheet thicknesses of the 50% plating-coated portion are taken as $t_1$ and $t_1'$, and the sheet thicknesses of 1% plating-coated portion are taken as $t_2$ and $t_2'$. That is, for the Comparative Example, the sheet thickness ratio of the 50% plating-coated portion was calculated by $t_1/t_0$, and the sheet thickness ratio of the 1% plating-coated portion was calculated by $t_2/t_0$. Further, for Examples $A_1$ and $A_2$, the sheet thickness ratio of the 50% plating-coated portion was calculated by $(t_1+t_1')/t_0$, and the sheet thickness ratio of the 1% plating-coated portion was calculated by $(t_2+t_2')/t_0$.

As illustrated in FIG. 25, in the Comparative Example, the cut end face was formed of a shear drop, a shear surface and a fracture surface, and the proportion of the fracture surface was large. Although a large amount of plating was present at the shear drop, almost no plating was present at the shear surface and the fracture surface. FIG. 26 shows that, in the Comparative Example, the sheet thickness ratio of the 50% plating-coated portion was approximately 15%, and the sheet thickness ratio of the 1% plating-coated portion was approximately 28%. The shear surface is formed when the cutting edge of the tool enters into the metallic material and the fracture surface is formed as the result of propagation of a ductile fracture crack. Therefore, it is considered that, in the case where the conventional shearing tool was used, the plating could not follow the tool to the shear surface and fracture surface, and hence almost no plating was present thereon.

On the other hand, with respect to Example $A_1$ and Example $A_2$, although the front end radii $R_1$ and $R_2$ of the cutting edges differed, each cut end face was formed of shear drops, inclined faces and a fracture surface, and the proportion of the inclined faces was large. Plating remained on each inclined face, and the amount of plating coating each inclined face had decreased toward the center of the sheet thickness from the metallic material surface. Further, in comparison to Example $A_1$, in Example $A_2$ in which the front end radii $R_1$ and $R_2$ of the cutting edges were larger, the rate of decrease in the amount of plating up to the vicinity of the center of the sheet thickness from the metallic material surface on the inclined faces was small and a greater amount of the plating had followed the movement of the cutting edges. FIG. 26 shows that in Example $A_1$ the sheet thickness ratio of the 50% plating-coated portion was approximately 55% and the sheet thickness ratio of the 1% plating-coated portion was approximately 78%, and that in Example $A_2$ the sheet thickness ratio of the 50% plating-coated portion was approximately 71% and the sheet thickness ratio of the 1% plating-coated portion was approximately 76%. These results indicate that by cutting a plated metallic material using the cutting tool 100 of the present invention, it is possible to extensively cover the cut end face with the plating.

(B. Front End Angle of Cutting Edge)

The damage state of the cutting edges as well as the shape of the cut end face of the relevant workpiece when the front end angle $\theta_1$ of the first cutting part and the front end angle $\theta_2$ of the second cutting part of the cutting tool illustrated in FIG. 1 were changed and the cutting tool was used to cut a workpiece were investigated. A galvanized steel sheet having a sheet thickness of 3.2 mm and a tensile strength of 460 MPa was used as the workpiece. With regard to the process for cutting the workpiece, the front end angles $\theta_1$ and $\theta_2$ of the cutting edges were changed and the cutting process was performed twice with each cutting edge. Note that, the front end radii $R_1$ and $R_2$ of the cutting edges were each set to 0.05 mm. The results are shown in Table 1. Note that, the term "projecting portion" with regard to the evaluation of the cut end face shape means a portion projecting from the cut end face which arises at the cut end face during cutting.

TABLE 1

| Front end angle $\theta_1 = \theta_2[°]$ | plating coverage state | cutting edge damage | cut end face shape |
|---|---|---|---|
| 5 | CC | EE | AA |
| 10 | CC | CC | AA |
| 30 | CC | BB | AA |
| 40 | BB | BB | AA |
| 60 | AA | AA | AA |
| 90 | AA | AA | BA |
| 120 | AA | AA | EA |
| 150 | AA | AA | EE |

(Evaluation criteria for plating coverage state)
A: The sheet thickness ratio of a 1% or more plating-coated portion is 70% or more
B: The sheet thickness ratio of a 1% or more plating-coated portion is 60% or more
C: The sheet thickness ratio of a 1% or more plating-coated portion is 50% or more
D: The sheet thickness ratio of a 1% or more plating-coated portion is 40% or more
E: The sheet thickness ratio of a 1% or more plating-coated portion is less than 40%
(Evaluation criteria for cutting edge damage)
A: No damage
B: Small flaw is present on surface
C: There is a slight plastic deformation
D: A slight plastic deformation is present for a length of 100 μm or more
E: There is plastic deformation
(Evaluation criteria for cut end face shape)
A: Very good
B: Good
C: There is a slightly projecting portion
D: A slightly projecting portion is present at multiple places
E: There is a projecting portion As illustrated in Table 1, in the case of each of the front end angles of the cutting edges, the sheet thickness ratio of the 1% or more plating-coated portion at the cut end face of the workpiece was 50% or more. In a case where the front end angle of the cutting edge was 5°, although the cutting edge plastically deformed, the cut end face of the workpiece was good, and cutting was also easy. When the front end angle of the cutting edge was made 10°, the plastic deformation of the cutting edges decreased to a permissible level compared to the case where the front end angle of the cutting edge was 5°. When the front end angle of the cutting edge was further increased, although the cutting edge did not plastically deform when the front end angle was from 30° to 40°, there were small flaws on the surface of the cutting edge, and in particular when the front end angle was from 60° to 90°, the cutting edge did not plastically deform and there was no damage to the cutting edge, and the cut end face was also good. Note that, while increasing the front end angle of the cutting edge suppressed damage to the cutting edge, when the front end angle of the cutting edge was 120° or more, a projecting portion arose at the cut end face of the workpiece, and although the load required for cutting increased, the cut end face of the workpiece was sufficiently covered with the plating. The cases for which the evaluation of the cut end face shape was E included some cases where rupturing did not occur in the workpiece and cutting was not completed.

Based on the above results, it was shown that the plating coating was sufficiently applied to the cut end face of the workpiece regardless of the front end angle of the cutting edge. In addition, it was shown that from the viewpoint of suppressing damage to the tool, the shape of the cut end face of the workpiece, and the ease of cutting, it is preferable to make the front end angles $\theta_1$ and $\theta_2$ of the cutting parts 10° or more and 120° or less, and more preferably to make the front end angles $\theta_1$ and $\theta_2$ of the cutting parts 30° or more and 90° or less.

(C. Front End Radius of Cutting Edge)

The damage state of the cutting edges as well as the shape of the cut end face of the relevant workpiece when the front end radius $R_1$ of the first cutting part and the front end radius $R_2$ of the second cutting part of the cutting tool illustrated in FIG. 1 were changed and the cutting tool was used to cut a workpiece were investigated. A galvanized steel sheet having a sheet thickness of 3.2 mm and a tensile strength of 460 MPa was used as the workpiece. With regard to the process for cutting the workpiece, the front end angles $\theta_1$ and $\theta_2$ of the cutting edges were both made 60°, and the front end radii $R_1$ and $R_2$ of the cutting edges were changed and the cutting process was performed twice with each cutting edge. The results are shown in Table 2.

TABLE 2

| front end radius $R_1 = R_2$ [mm] | front end radius/sheet thickness [%] | plating coverage state | cutting edge damage | end face shape |
|---|---|---|---|---|
| 0.01 | 0.3 | DD | EE | AA |
| 0.02 | 0.6 | CC | CC | AA |
| 0.05 | 1.6 | BB | BB | AA |
| 0.1 | 3.1 | AA | AA | AA |
| 0.3 | 9.4 | AA | AA | AA |
| 0.4 | 12.5 | AA | AA | BB |
| 0.5 | 15.6 | AA | AA | CC |
| 1.1 | 34.4 | AA | AA | DD |
| 1.6 | 50.0 | AA | AA | EE |

(Evaluation criteria for plating coverage state)
A: The sheet thickness ratio of a 1% or more plating-coated portion is 70% or more
B: The sheet thickness ratio of a 1% or more plating-coated portion is 60% or more
C: The sheet thickness ratio of a 1% or more plating-coated portion is 50% or more
D: The sheet thickness ratio of a 1% or more plating-coated portion is 40% or more
E: The sheet thickness ratio of a 1% or more plating-coated portion is less than 40%
(Evaluation criteria for cutting edge damage)
A: No damage
B: Small flaw is present on surface
C: There is a slight plastic deformation
D: A slight plastic deformation is present for a length of 100 μm or more
E: There is plastic deformation
(Evaluation criteria for cut end face shape)
A: Very good
B: Good
C: There is a slightly projecting portion
D: A slightly projecting portion is present at multiple places
E: There is a projecting portion As illustrated in Table 2, in the case of each of the front end radii of the cutting edges, the sheet thickness ratio of the 1% or more plating-coated portion at the cut end face of the workpiece was 40% or more. In cases where the ratio of the front end radius to the sheet thickness was 3.1% or more, the sheet thickness ratio of the 1% or more plating-coated portion was 70% or more. In the case where the front end radii $R_1$ and $R_2$ of the cutting edges were 0.01 mm, that is, in the case where the ratio of the front end radius to the sheet thickness was 0.3%, although the cutting edges plastically deformed, the cut end face of the workpiece was good, and cutting was also easy. In the case where the front end radii $R_1$ and $R_2$ of the cutting edges were 0.02 mm, that is, in the case where the ratio of the front end radius to the sheet thickness was made 0.6%, the plastic deformation of the cutting edges decreased to a permissible level, and the cut end face was also good. When the front end radii $R_1$ and $R_2$ of the cutting edges were further increased, when the front end radii $R_1$ and $R_2$ were from 0.05 mm to 0.3 mm, that is, in the cases where the ratio of the front end radius to the sheet thickness was from 1.6% to 9.4%, the cutting edges did not plastically deform and almost no damage to the cutting edges was observed. Furthermore, the cut end face was also good.

Note that, when the front end radii $R_1$ and $R_2$ of the cutting edges were made large, damage to the cutting edges was suppressed. On the other hand, when the front end radii $R_1$ and $R_2$ of the cutting edges were 1.6 mm, that is, in the case where the ratio of the front end radius to the sheet thickness was 50.0%, although a projecting portion arose at the cut end face of the workpiece, the cut end face of the workpiece was sufficiently covered with the plating. Further, when the ratio of the front end radius to the sheet thickness was 34.4% or less, a deterioration in the end face shape due to the presence of a projecting portion was suppressed.

Based on the above results, it was shown that the plating coating is sufficiently applied onto the cut end face of the workpiece regardless of the size of the front end radii of the cutting edges (the ratio of the front end radius to the sheet thickness). In addition, it was shown that from the viewpoint of suppressing damage to the tool, the shape of the cut end face of the workpiece, and the ease of cutting, it is preferable to make the ratio of the front end radii $R_1$ and $R_2$ of the cutting parts to the sheet thickness 0.5% or more and 35.0% or less, and more preferably to make the ratio of the front end radii $R_1$ and $R_2$ of the cutting parts to the sheet thickness 1.5% or more and 10.0% or less.

(D. Relation Between Tensile Strength of Workpiece and Cut State)

Galvanized steel sheets having tensile strengths of 270 MPa, 460 MPa, 585 MPa and 1020 MPa were adopted as workpieces, and the cut state when the workpieces were cut using the cutting tool of the present invention illustrated in FIG. 1 was investigated. The sheet thickness of each workpiece was 3.2 mm. Note that, the galvanized steel sheet having a tensile strength of 460 MPa was a separate material from the steel sheet used in the aforementioned Example C. Cutting of the workpieces was performed by making each of the front end angles $\theta_1$ and $\theta_2$ of the cutting edges 60°, and changing the front end radii $R_1$ and $R_2$ of the cutting edges, and performing cutting twice with each cutting edge. The results are shown in Table 3.

TABLE 3

| tensile strength [MPa] | 270 | 460 | 585 | 1020 |
|---|---|---|---|---|
| $R_1 = R_2 = 0.02$ mm (sheet thickness ratio 0.6%) | AA | AA | AA | AA |
| $R_1 = R_2 = 0.1$ mm (sheet thickness ratio 3.1%) | AA | AA | AA | AA |
| $R_1 = R_2 = 0.5$ mm (sheet thickness ratio 15.6%) | AC | BC | AC | AC |
| $R_1 = R_2 = 1.05$ mm (sheet thickness ratio 32.8%) | CC | CC | CC | CC |

TABLE 3-continued

| tensile strength [MPa] | 270 | 460 | 585 | 1020 |
|---|---|---|---|---|
| $R_1 = R_2 = 1.1$ mm (sheet thickness ratio 34.4%) | CD | CC | CC | CC |
| $R_1 = R_2 = 1.6$ mm (sheet thickness ratio 50.0%) | EE | EE | EE | EC |

(Evaluation criteria for cut end face shape)
A: Very good
B: Good
C: There is a slightly projecting portion
D: A slightly projecting portion is present at multiple places
E: There is a projecting portion The results of the test showed that the sheet thickness ratio of a 1% or more plating-coated portion was 50% or more on the cut end face of the workpieces having the respective tensile strengths. Further, based on Table 3, it was found that with respect to the galvanized steel sheets having a tensile strength of 270 MPa or more, in a case where the front end radii $R_1$ and $R_2$ of the cutting edges were 0.5 mm or less, cutting was possible, and a good cut end face could be obtained. In addition, with respect to the galvanized steel sheets having a tensile strength of 270 MPa or more, it was possible to perform cutting even when the front end radii $R_1$ and $R_2$ of the cutting edges were larger than 0.5 mm.

(E. Shape of Upper and Lower Cutting Parts)

With respect to the cutting tool illustrated in FIG. 1, the shapes of cut end faces of workpieces when the workpieces were cut using the first cutting part and the second cutting part in which the front end radius $R_1$ and the front end radius $R_2$ were different to each other were investigated. Similarly to the verification in section "A" that is described above, a plated metallic material was adopted as a workpiece that had been subjected to a surface treatment, and the coverage state of plating at a cut end face of the plated metallic material when the plated metallic material was cut by cutting tools was observed. Front photographs and lateral cross-sectional photographs of the respective cut end faces of the plated metallic material which was cut by the cutting tools are shown in FIG. 28.

In Example E1, the front end radius $R_1$ of the cutting edge of the die was 0.5 mm, the front end radius $R_2$ of the cutting edge of the punch was 0.05 mm, and the front end radii ratio $R_1/R_2$ was 10. In Example E2, the front end radius $R_1$ of the cutting edge of the die was 0.05 mm, the front end radius $R_2$ of the cutting edge of the punch was 0.5 mm, and the front end radii ratio $R_1/R_2$ was 0.1. Further, in FIG. 28, the cut end face of a plated metallic material obtained when the front end radii $R_1$ and $R_2$ were both made 0.05 mm is shown as Reference Example 1, and the cut end face of a plated metallic material obtained when the front end radii $R_1$ and $R_2$ were both made 0.5 mm is shown as Reference Example 2.

Figure 28:
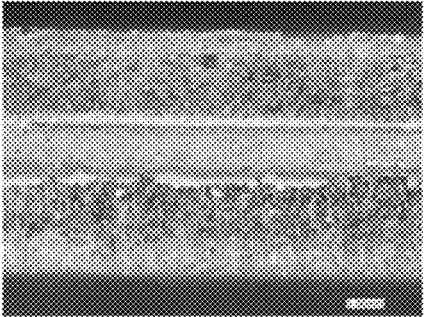
FIG. 28 shows, as Example (E), front photographs and lateral cross-sectional photographs of cut end faces of plated metallic materials which were cut with a cutting tool.

As illustrated in FIG. 28, in the respective cut end faces of the plated metallic materials of Examples E1 and E2, although the shapes as seen in side view were different on the left and right compared to the respective cut end faces of the plated metallic materials of Reference Examples 1 and 2, shear drops, inclined faces and a fracture surface had been formed. Further, although the fracture surface ratio of each Examples E1 and E2 were larger compared to Reference Examples 1 and 2, the sheet thickness ratio of the 1% or more plating-coated portions had been maintained at 50% or more. Thus, even in a case where the front end radii $R_1$ and $R_2$ of the upper and lower cutting parts differ from each other, by cutting a plated metallic material using the cutting tool 100 of the present invention, it is possible to extensively cover the cut end face with plating.

Note that, although a case in which the front end radii $R_1$ and $R_2$ of the upper and lower cutting parts are different was verified here, in a case where the front end angles $\theta_1$ and $\theta_2$ of the upper and lower cutting parts are different to each other also, by cutting a plated metallic material using the cutting tool 100 of the present invention, the cut end face can be extensively covered with plating.

(F. Cutting by Performing a Plurality of Cutting Processes)

The shape of a cut end face of a workpiece when the workpiece was cut by performing a cutting process two times using the cutting tool illustrated in FIG. 1 was investigated. Similarly to the verification in section "A" that is described above, a plated metallic material was adopted as a workpiece that had been subjected to a surface treatment, and the coverage state of plating at a cut end face of the plated metallic material when the plated metallic material was cut by a cutting tool was observed. Front photographs and lateral cross-sectional photographs of respective cut end faces of the plated metallic material which was cut by the cutting tool are shown in FIG. 29.

In Example F1, in a first cutting process, the plated metallic material was cut to a partway position using a die and a punch in which the front end radii $R_1$ and $R_2$ of the cutting edges were 0.05 mm, and in a second cutting process the plated metallic material was completely cut using a die and a punch in which the front end radii $R_1$ and $R_2$ of the cutting edges were 0.5 mm. In Example F2, in a first cutting process, the plated metallic material was cut to a partway position using a die and a punch in which the front end radii $R_1$ and $R_2$ of the cutting edges were 0.5 mm, and in a second cutting process the plated metallic material was completely cut using a die and a punch in which the front end radii $R_1$ and $R_2$ of the cutting edges were 0.05 mm. Further, Reference Examples 1 and 2 that are the same as in FIG. 28 are also shown in FIG. 29.

Figure 29:
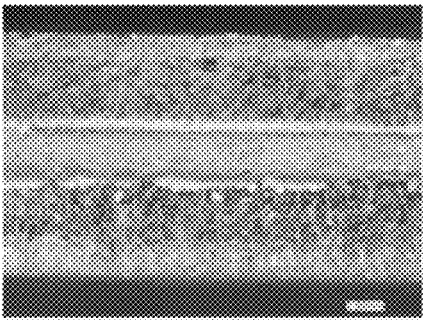
FIG. 29 shows, as Example (F), front photographs and lateral cross-sectional photographs of cut end faces of plated metallic materials which were cut with a cutting tool.

As illustrated in FIG. 29, the cut end faces of the plated metallic materials of Examples F1 and F2 were each formed of shear drops, inclined faces and a fracture surface, and the proportion of the inclined faces was large. Plating remained on each inclined face, and the amount of plating coating each inclined face had decreased toward the center of the sheet thickness from the metallic material surface. Further, comparing the cut end faces of the plated metallic materials of Examples F1 and F2 with the cut end faces of the plated metallic materials of Reference Examples 1 and 2, it was found that the cut end faces of Examples F1 and F2 were influenced by the front end radii $R_1$ and $R_2$ of the cutting edges of the cutting tool used in the second cutting process. For example, although a projecting portion as in the cut end face of Reference Example 2 was formed on the cut end face of Example F1, it was observed that a larger amount of plating remained at the cutting starting point portion than at other portions of the cut end face. Further, the cut end face of Example F2 was close to Reference Example 1, had a good end face shape with few burrs, and the ability of the plating to follow the movements of the cutting edges was good.

Thus, by cutting a plated metallic material using the cutting tool 100 of the present invention by performing a plurality of cutting processes, it is possible to extensively cover the cut end face with plating. In particular, it was found that by making the front end radii $R_1$ and $R_2$ of the cutting parts in the second cutting process smaller than the front end radii $R_1$ and $R_2$ of the cutting parts in the first cutting process, a portion coated with the plating on the cut end face can be increased and a good end face shape can be obtained. Further, it was found that by making the front end angles $\theta_1$ and $\theta_2$ of the cutting parts in the second cutting process smaller than the front end angles $\theta_1$ and $\theta_2$ of the cutting parts in the first cutting process also, a portion coated with the plating on the cut end face can be increased and a good end face shape can be obtained.

In addition, with regard to a case where cutting is performed a plurality of times, the fracture surface ratio when the front end angles or front end radii of the cutting edges were decreased during the cutting was investigated. A galvanized steel sheet having a sheet thickness of 3.2 mm and a tensile strength of 460 MPa similarly to the galvanized steel sheet described above was used as the workpiece. The results are shown in Table 4. Note that, the front end radii $R_1$ and $R_2$ were made the same ($R=R_1=R_2$), and the front end angles $\theta_1$ and $\theta_2$ were also made the same ($\theta=\theta_1=\theta_2$).

TABLE 4

| No. | first cutting process R [mm] | second cutting process R [mm] | first cutting process θ [°] | second cutting process θ [°] | fracture surface ratio [%] |
|---|---|---|---|---|---|
| 1 | 0.05 | 0.05 | 60 | 60 | 0.21 |
| 2 | 0.5 | 0.5 | | | 0.25 |
| 3 | 0.05 | 0.5 | | | 0.29 |
| 4 | 0.5 | 0.05 | | | 0.17 |
| 5 | 0.05 | 0.05 | 45 | 45 | 0.25 |
| 6 | | | 60 | 60 | 0.21 |
| 7 | | | 45 | 60 | 0.25 |
| 8 | | | 60 | 45 | 0.20 |

In Nos. 1 to 4 of Table 4, the front end angle θ was kept constant, and the front end radius R was changed. As a result, it was found that by making the front end radius R at the time of the second cutting process smaller than the front end radius R at the time of the first cutting process as in the case of No. 4, the fracture surface ratio decreases and the range coated with the plating increases. Further, in Nos. 5 to 8 of Table 4, the front end radius R was kept constant, and the front end angle θ was changed. As a result, it was found that by making the front end angle θ at the time of the second cutting process smaller than the front end angle θ at the time of the first cutting process as in the case of No. 8, the fracture surface ratio decreases and the range coated with the plating increases.

(G. Cutting by Cutting Tool Having Asymmetrical Cutting Edges)

A plated metallic material was adopted as a workpiece that had been subjected to a surface treatment, and the shape of the cut end face of the plated metallic material when the plated metallic material was cut by cutting tools was observed.

In Example G1, the plated metallic material was cut using a die and a punch each having a cutting part in which the angles on the left and right were different from each other as illustrated in FIG. 10. The die and punch had the same shape, and were arranged symmetrically with respect to the plated metallic material. The front end angles $\theta_1$ and $\theta_2$ of the respective cutting edges were 75°, and the front end angle was formed in a shape which was divided into two parts to form angles of 45° ($=\theta_{1a}=\theta_{2a}$) and 30° ($=\theta_{1b}=\theta_2 b$) by the normal line.

In Example G2, the plated metallic material was cut using a die and a punch each having a cutting part in which the front end radii on the left and right were different from each other as illustrated in FIG. 11. The die and punch had the same shape, and were arranged symmetrically with respect to the plated metallic material. The front end radii of the die and the punch were 0.5 mm ($=R_{1a}=R_{2a}$) on one side and 0.05 mm ($=R_{1b}=R_{2b}$) on the other side with respect to the normal line, respectively.

Note that, as a Reference Example, the plated metallic material was cut by a cutting tool having a shape in which the cutting parts had left-right symmetry with respect to the normal line. The die and punch had the same shape, and were arranged symmetrically with respect to the plated metallic material. The front end angles $\theta_1$ and $\theta_2$ of the cutting edges were each 60°, and angles on the left and right formed when the front end angle was divided in two by the normal line were each 30° ($=\theta_{1a}=\theta_{2a}=\theta_{1b}=\theta_2 b$).

The shape of the cut end face of each plated metallic material when the plated metallic material was cut by the cutting method of Examples G1 and G2 and the Reference Example are illustrated in FIG. 30. FIG. 30 schematically illustrates the shape when seen in side view with respect to, of the entire plated metallic material that was cut, a cut end face on a side that was cut which is at the side on which the angle or the front end radius was larger when the cutting part was divided into two parts by the normal line. Note that, with regard to the reference example drawing, since each of the cut end faces of the plated metallic material that was cut had the same shape, the shape of the cut end face of one piece thereof is illustrated. Further, in the Reference Example and Examples G1 and G2, it was confirmed that a plating layer had been formed on the end face at the inclined portion of each cut end face.

In the Reference Example having a shape in which the cutting parts had left-right symmetry with respect to the normal line as illustrated in FIG. 10, a burr occurred on the cut end face. On the other hand, in Examples G1 and G2, because the cutting parts each had a shape having left-right asymmetry with respect to the normal line, the deformation concentrated on the side where the angle or the front end radius was large, and a crack stably propagated. As a result, as illustrated in FIG. 30, a burr did not occur as in the Reference Example. Thus, it was found that by making the cutting parts of the die and the punch an asymmetrical shape, the propagation direction of a crack that occurs when cutting the workpiece can be controlled.

Further, with respect to Examples G1 and G2, when the cut end face was checked after cutting a closed region, as illustrated in FIG. 4, the cut end face was formed of shear drops, inclined faces and a fracture surface, and the proportion of the inclined faces was large. Plating remained on each inclined face, and the amount of plating coating each inclined face had decreased toward the center of the sheet thickness from the metallic material surface. Thus, it was also confirmed that when a plated metallic material is cut using the cutting tool illustrated in FIG. 10 or FIG. 11, the cut end face is extensively coated with plating.

Further, the propagation direction of a crack that arose when cutting a workpiece in the case of using the cutting tool illustrated in FIG. 10 when the front end angles $\theta_{1a}$ and $\theta_{1b}$ were made to differ from each other was investigated. A galvanized steel sheet having a sheet thickness of 3.2 mm and a tensile strength of 460 MPa was used as the workpiece. In the process for cutting the workpiece, the front end radii $R_1$ and $R_2$ of the cutting edges were both made 0.05 mm, the front end angle $\theta_2a$ of the cutting edge was made the same as the front end angle $\theta_{1a}$, and the front end angle $\theta_{2b}$ was made the same as the front end angle $\theta_{1b}$. Then, the front end angles $\theta_{1a}$ and $\theta_{1b}$ were changed, and cutting was performed 20 times with each cutting edge, and the propagation direction of generated cracks was confirmed. The results are shown in Table 5.

TABLE 5

| $\theta_{1a} + \theta_{1b}$ [°] | $\theta_{1a}$ [°] | $\theta_{1b}$ [°] | $\theta_{1a} - \theta_{1b}$ [°] | rate of crack propagation to the side of $\theta_{1a}$ | rate of crack propagation to the side of $\theta_{1b}$ |
|---|---|---|---|---|---|
| 90 | 45 | 45 | 0 | 50% | 50% |
| 90 | 47.5 | 42.5 | 5 | 70% | 30% |
| 90 | 50 | 40 | 10 | 80% | 20% |
| 90 | 52.5 | 37.5 | 15 | 80% | 20% |
| 90 | 55 | 35 | 20 | 80% | 20% |
| 90 | 57.5 | 32.5 | 25 | 85% | 15% |
| 90 | 60 | 30 | 30 | 95% | 5% |
| 90 | 62.5 | 27.5 | 35 | 95% | 5% |
| 90 | 65 | 25 | 40 | 95% | 5% |
| 90 | 67.5 | 22.5 | 45 | 95% | 5% |

From Table 5 it can be seen that when ($\theta_{1a}-\theta_{1b}$) was made 5° or more and 450 or less, a crack propagated to the side of $\theta_{1a}$ that was the larger angle. Further, when the front end angle $\theta_{1b}$ was made larger than the front end angle $\theta_{1a}$, a crack propagated to the side of $\theta_{1b}$ that is the larger angle. Thus, the propagation direction of a crack during cutting can be controlled by making the front end angles $\theta_{1a}$ and $\theta_{1b}$ different angles to each other. The same applies with respect to the front end angles $\theta_{2a}$ and $\theta_{2b}$, and a crack can be caused to propagate to the side of the larger angle by making ($\theta_{2a}-\theta_{2b}$) or ($\theta_{2b}-\theta_{2a}$) that is the angular difference between the angle $\theta_{2a}$ and the angle $\theta_2$b a difference that is 5° or more and 450 or less.

In addition, the propagation direction of a crack that arose when cutting a workpiece in the case of using the cutting tool illustrated in FIG. 11 when the front end radii $R_{1a}$ and $R_{1b}$ were made to differ from each other was investigated. A galvanized steel sheet having a sheet thickness of 3.2 mm and a tensile strength of 460 MPa was used as the workpiece. In the process for cutting the workpiece, the front end angles $\theta_1$ and $\theta_2$ of the cutting edges were both made 60°, the front end radius $R_{2a}$ of the cutting edge was made the same as the front end radius $R_{1a}$, and the front end radius $R_{2b}$ was made the same as the front end radius $R_{1b}$. Then, the front end radii $R_{1a}$ and $R_{1b}$ were changed, and cutting was performed 20 times with each cutting edge, and the propagation direction of a generated crack was confirmed. The results are shown in Table 6.

TABLE 6

| $R_{1a}$ [mm] | $R_{1b}$ [mm] | $R_{1a}/R_{1b}$ [—] | rate of crack propagation to the side of $R_{1a}$ | rate of crack propagation to the side of $R_{1b}$ |
|---|---|---|---|---|
| 0.05 | 0.05 | 1.0 | 50% | 50% |
| 0.055 | 0.05 | 1.1 | 40% | 60% |
| 0.075 | 0.05 | 1.5 | 30% | 70% |
| 0.15 | 0.05 | 3.0 | 25% | 75% |
| 0.5 | 0.05 | 10 | 20% | 80% |
| 1.5 | 0.05 | 30 | 15% | 85% |
| 5.0 | 0.05 | 100 | 5% | 95% |

From Table 6 it can be seen that when the ratio $R_{1a}/R_{1b}$ between the front end radii was made 1.1 or more and 100 or less, a crack propagated to the side of $R_{1b}$ that was the smaller front end radius. Further, when the front end radius $R_{1a}$ was made smaller than the front end radius $R_{1b}$, a crack propagated to the side of $R_{1a}$ that is the smaller front end radius. Thus, the propagation direction of a crack during cutting can be controlled by making the front end radii $R_{1a}$ and $R_{1b}$ different angles to each other. The same applies with respect to the front end radii $R_{2a}$ and $R_{2b}$, and a crack can be caused to propagate to the side of the smaller front end radius by making the ratio $R_2/R_{2b}$ or $R_{2b}/R_{2a}$ between the front end radii 1.1 or more and 100 or less.

(H. Front End Shape of Cutting Edges)

The relation between the shape of the front end radius of the cutting edges and the fracture surface ratio of the workpiece that was cut was investigated. A galvanized steel sheet having a sheet thickness of 3.2 mm and a tensile strength of 460 MPa was used as the workpiece. In the cutting tool using the process for cutting the workpiece, the front end angles $\theta_1$ and $\theta_2$ of the cutting edges were each made 60°, and the front end radii $R_1$ and $R_2$ of the cutting edges were made 0.05 mm. However, the cutting edges of Comparative Examples H1 and H2 had a shape in which, as illustrated in FIG. 31, the front end was flat and the radius of the intersection between the flat portion and wedge-shaped inclined portions was made 0.05 mm. A width RW of the flat portion was 0.2 mm in Comparative Example H1, and 0.02 mm in Comparative Example H2. In the Example, there was no flat portion at the front end of the cutting edge, and hence the width RW of the flat portion was 0 mm. Table 7 shows the fracture surface ratio of the workpieces that were cut using the respective cutting tools.

TABLE 7

| case | fracture surface ratio [%] | width RW of flat portion [mm] |
|---|---|---|
| Comparative Examples H1 | 34 | 0.2 |
| Comparative Examples H2 | 29 | 0.02 |
| Example | 22 | 0 |

Based on Table 7 it is found that in the cases in which the cutting edge was made flat (Comparative Examples H1 and H2), the fracture surface increased and the covering amount of the plating decreased in comparison to the case in which the cutting edge had a curvature (Example). This is because when the cutting edge is flat, the flow of the material is suppressed when the workpiece is cut at the flat portion, and more strain is generated during cutting. It is considered that, consequently, rupturing of the workpiece occurred earlier and the plating was split, and therefore the covering amount of the plating decreased.

(I. Cutting of Closed Region)

With respect to the method for cutting a closed region from a workpiece, it was verified whether or not a workpiece could be cut. In the present verification, a plated metallic material was adopted as a workpiece that had been subjected to a surface treatment, and a circular closed region was cut from the flat plated metallic material. The plated metallic material was a galvanized steel sheet having a tensile strength of 460 MPa, and the sheet thickness was 3.2 mm.

In the Example, with respect to the cutting method of the second embodiment that is described above, first, using the cutting tool illustrated in FIG. 14, an intermediate material was formed by cutting a closed region located further on the inner side than the position at which it was desired to finally cut the plated metallic material, and thereafter the intermediate material was cut at the final cutting position using the cutting tool illustrated in FIG. 15. On the other hand, in a Comparative Example, forming of an intermediate material was not performed, and a flat plated metallic material was cut at the final cutting position using the cutting tool illustrated in FIG. 15. In the die and the punch of the cutting tool illustrated in FIG. 15, the diameter of the cutting edge was 10 mm, and the front end angle of the cutting part was 60°.

FIG. 32 is a view that shows, with respect to when the plated metallic material was cut using the cutting method of the Example and using the cutting method of the Comparative Example, analysis results showing the magnitude of damage to the plated metallic material, and also whether or not it was possible to cut the plated metallic material. Further, as a Reference Example, an analysis result showing the magnitude of damage to the plated metallic material when the plated metallic material was cut linearly, and whether or not it was possible to cut the plated metallic material are shown. The damage was expressed using damage values calculated by the generalized Cockcroft-Latham formula (see Non-Patent Document 1). The analysis results in FIG. 32 show the magnitude of damage to the plated metallic material in grayscale, with the whiter that a portion is, the greater the damage that is indicated and the easier it is for the plated metallic material to rupture.

As illustrated in the Reference Example, in a case where the plated metallic material was cut linearly, it was found that a large amount of damage was imparted to the plated metallic material in the vicinity of the cutting edges of the cutting tool. In the Reference Example, because the plated metallic material could move in a direction away from the tool as the die and the punch were pushed toward each other relatively, a large amount of damage could be imparted to the plated metallic material. Therefore, the plated metallic material could be reliably cut.

Next, with regard to the Comparative Example, it was found that almost no damage was imparted to the plated metallic material in the vicinity of the cutting edges of the cutting tool. In the Comparative Example, because a through-hole was not formed before cutting the closed region at the final cutting position, when the die and the punch were pushed toward each other relatively, the plated metallic material could not move in a direction away from the tool. Therefore, it was not possible to impart damage to an extent that generated a crack in the plated metallic material, and the plated metallic material was not cut.

On the other hand, with respect to the Example, it was found that a large amount of damage was imparted to the plated metallic material in the vicinity of the cutting edges of the cutting tool. In the Example, because a through-hole was formed before cutting the closed region at the final cutting position, when the die and the punch were pushed toward each other relatively, the plated metallic material could move in a direction away from the tool. Therefore, a large amount of damage could be imparted to the plated metallic material, and the plated metallic material could be reliably cut.

Further, with respect to the Example, when the cut end face was checked after cutting the closed region, as illustrated in FIG. 4, the cut end face was formed of shear drops, inclined faces and a fracture surface, and the proportion of the inclined faces was large. Plating remained on each inclined face, and the amount of plating coating each inclined face had decreased toward the center of the sheet thickness from the metallic material surface. Thus, it was also confirmed that when a plated metallic material is cut using the cutting tool illustrated in FIG. 15, the cut end face is extensively coated with plating.

Figure 33:
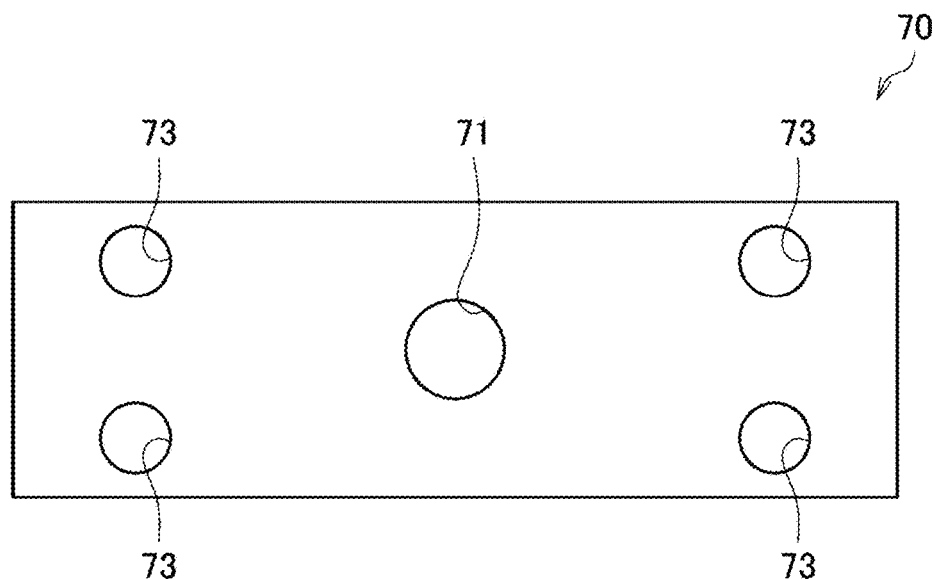
FIG. 33 is a plan view illustrating the shape of a test specimen used in a fatigue test.

Further, the fatigue characteristics of the specimens formed in the Comparative Example and the Example illustrated in FIG. 32 were investigated. As illustrated in FIG. 33, a test specimen 70 was formed by forming a through-hole 71 of 10 mm in diameter at the center of a plate-like plated metallic material having dimensions of 90 mm×30 mm, and forming through-holes 73 of 7 mm in diameter at four corner portions of the plated metallic material. The test specimen 70 was subjected to a fatigue test with a stress ratio of −1 and a frequency of 25 Hz in atmospheric air at room temperature. In this case, the load stress applied to achieve a fatigue life of 107 cycles was defined as the fatigue limit. The fatigue test results are shown in FIG. 34 and Table 8 below.

TABLE 8

| | TS[MPa] | 460 | 616 | 790 | 1010 | 1210 |
|---|---|---|---|---|---|---|
| fracture surface ratio [%] | Comparative Example | 0.78 | 0.80 | 0.82 | 0.84 | 0.85 |
| | Example | 0.20 | 0.30 | 0.35 | 0.38 | 0.40 |
| fatigue limit [Mpa] | Comparative Example | 224 | 300 | 397 | 498 | 600 |
| | Example | 268 | 360 | 476 | 598 | 720 |

Figure 34:
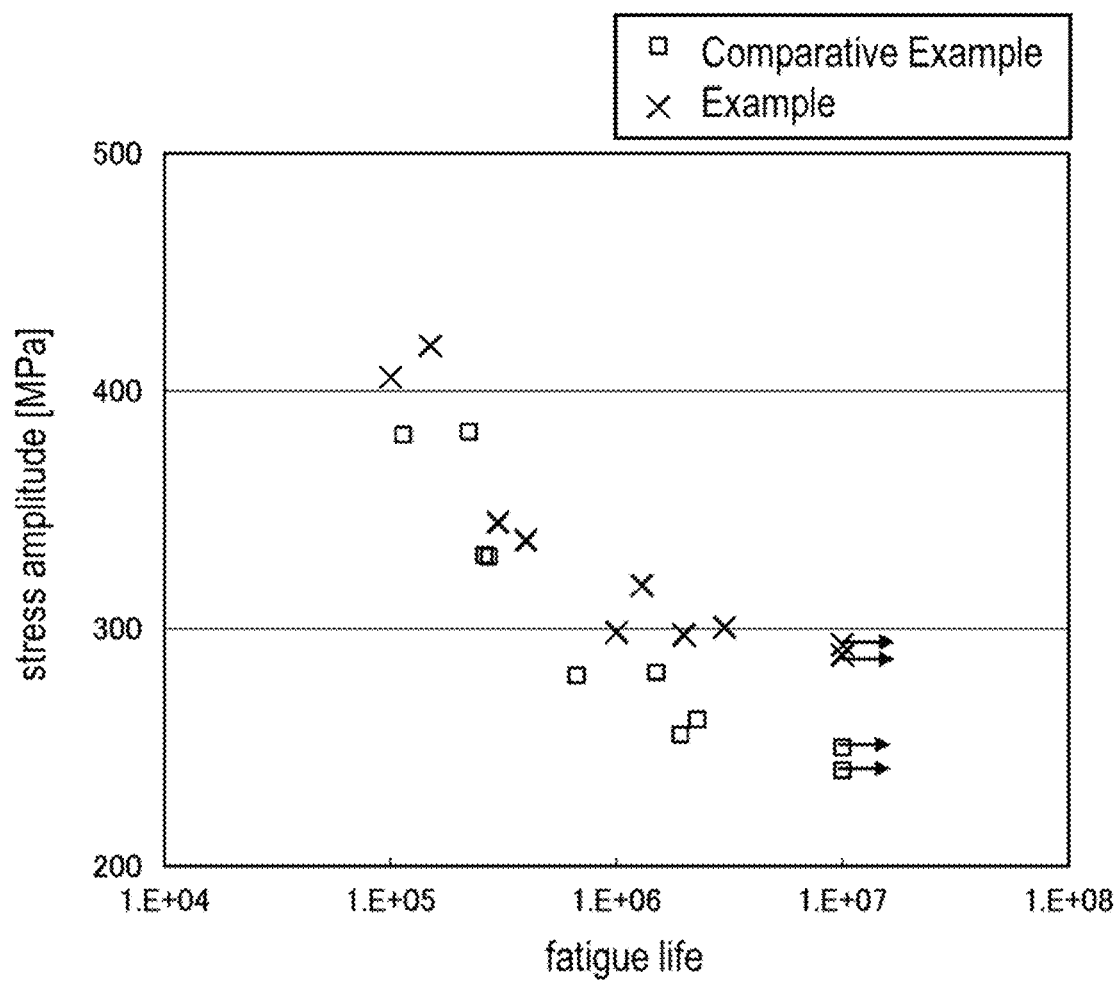
FIG. 34 is a graph showing fatigue test results.

From FIG. 34 and Table 8 it can be seen that, regardless of the tensile strength of the test specimen, the fatigue life of the test specimen of the Example was longer than the fatigue life of the test specimen of the Comparative Example. Further, with respect to the test specimens formed in the Comparative Example and the Example illustrated in FIG. 32, the plating was removed by surface grinding and the same test was performed. As a result, results equivalent to those in Table 8 were obtained. Thus, it was found that by performing cutting by the cutting method of the Example, an effect of improving the fatigue life can be obtained regardless of the presence or absence of coating on the steel sheet.

(J. Verification of Plated Steel Sheet)

Based on the above relational expressions (3) to (5), the relation between the shape of a processed article and the result of conducting a 50-day exposure test was investigated with respect to covered materials A to H which were plated steel sheets and a steel sheet I that are shown in Table 9 below. The results are shown in Table 10. Note that, with regard to the evaluation of the aforementioned expression (3), a case where expression (3) was satisfied is denoted by "X", and a case where expression (3) was not satisfied is denoted by "Y". Further, to evaluate corrosion resistance, each sample was placed in a sunny environment by the seashore with the cut end face (evaluation surface) of the sample facing upward, and evaluation was performed based on the state of the evaluation surface after exposure for 50 days. The states of the evaluation surfaces were classified as follows based on the ratio of the area in which red rust had occurred with respect to the total area of the evaluation surface (red rust occurrence area ratio).

A (Excellent): Red rust occurrence area ratio is less than 30%

B (Good): Red rust occurrence area ratio is 30% or more and less than 60%

C (Acceptable): Red rust occurrence area ratio is 60% or more and less than 75%

D (Unacceptable): Red rust occurrence area ratio is 75% or more and less than 90%

E (Unacceptable): Red rust occurrence area ratio is 90% or more

TABLE 9

| covered material | plating | note |
| --- | --- | --- |
| A | Zn | hot-dip galvanized steel sheet defined in JIS G3301 or G3302 |
| B | Zn-Fe | — |
| C | 55% Al-Zn-1.6% Si | hot-dip 55% Al-Zn alloy plated steel sheet defined in JIS G3321 |
| D | Zn-11% Al-3% Mg-0.2% Si | hot-dip Zn-Al-Mg alloy plated steel sheet defined in JIS G3323 |
| E | Al-10% Si | hot dip al plated steel sheet defined in JIS G3314 |
| F | Cr | — |
| G | Ni | — |
| H | Sn | — |
| I | nonexistence | cold rolled steel sheet defined in JIS G3141 |

TABLE 10

| No. | | covered material | plating coating weight [both side: g/m²] | sheet thickness [mm] | shape of upper and lower cutting parts | end radius R | (T1 + T2) < T | T3/ sheet thickness T | Red rust occurrence area ratio after exposure for 50 days | note |
| --- | --- | --- | --- | --- | --- | --- | --- | --- | --- | --- |
| 1 | Example J1 | A | 900 | 3.2 | same | 0.50 | X | 0.28 | A | |
| 2 | Example J2 | A | 900 | 3.2 | same | 0.05 | X | 0.19 | A | |
| 3 | Comparative Example J1 | A | 900 | 3.2 | — | — | Y | 0.78 | D | |
| 4 | Example J3 | A | 900 | 4.5 | same | 0.50 | X | 0.30 | A | |
| 5 | Example J4 | A | 900 | 4.5 | same | 0.05 | X | 0.28 | A | |
| 6 | Comparative Example J2 | A | 900 | 4.5 | — | — | Y | 0.63 | D | |
| 7 | Example J5 | A | 450 | 6.0 | same | 0.50 | X | 0.32 | B | |
| 8 | Example J6 | A | 450 | 6.0 | same | 0.05 | X | 0.30 | B | |
| 9 | Comparative Example J3 | A | 450 | 6.0 | — | — | Y | 0.65 | D | |
| 10 | Example J7 | A | 900 | 6.0 | same | 0.50 | X | 0.29 | A | |
| 11 | Example J8 | A | 900 | 6.0 | same | 0.05 | X | 0.31 | A | |
| 12 | Comparative Example J4 | A | 900 | 6.0 | — | — | Y | 0.66 | D | |
| 13 | Example J9 | A | 900 | 9.0 | same | 0.50 | X | 0.47 | B | |
| 14 | Example J10 | A | 900 | 9.0 | same | 0.05 | X | 0.40 | B | |
| 15 | Comparative Example J5 | A | 900 | 9.0 | — | — | Y | 0.69 | D | |
| 16 | Example J11 | B | 90 | 0.2 | same | 0.50 | X | 0.42 | C | |
| 17 | Example J12 | B | 90 | 0.2 | same | 0.05 | X | 0.43 | C | |
| 18 | Comparative Example J6 | B | 90 | 0.2 | — | — | Y | 0.63 | D | |
| 19 | Example J13 | B | 90 | 0.8 | same | 0.50 | X | 0.26 | B | |
| 20 | Example J14 | B | 90 | 0.8 | same | 0.05 | X | 0.21 | B | |

TABLE 10-continued

| No. | | covered material | plating coating weight [both side: g/m²] | sheet thickness [mm] | shape of upper and lower cutting parts | end radius R | (T1 + T2) < T | T3/ sheet thickness T | Red rust occurrence area ratio after exposure for 50 days | note |
|---|---|---|---|---|---|---|---|---|---|---|
| 21 | Comparative Example J7 | B | 90 | 0.8 | — | — | Y | 0.79 | D | |
| 22 | Example J15 | C | 150 | 1.6 | same | 0.50 | X | 0.29 | A | |
| 23 | Example J16 | C | 150 | 1.6 | same | 0.05 | X | 0.18 | A | |
| 24 | Comparative Example J8 | C | 150 | 1.6 | — | — | Y | 0.81 | D | |
| 25 | Example J17 | D | 90 | 3.2 | same | 0.50 | X | 0.20 | B | |
| 26 | Example J18 | D | 90 | 3.2 | same | 0.05 | X | 0.18 | B | |
| 27 | Comparative Example J9 | D | 90 | 3.2 | — | — | Y | 0.77 | D | |
| 28 | Example J19 | D | 180 | 3.2 | same | 0.50 | X | 0.18 | A | |
| 29 | Example J20 | D | 180 | 3.2 | same | 0.05 | X | 0.19 | A | |
| 30 | Comparative Example J10 | D | 180 | 3.2 | — | — | Y | 0.76 | D | |
| 31 | Example J21 | D | 270 | 3.2 | same | 0.50 | X | 0.08 | A | |
| 32 | Example J22 | D | 270 | 3.2 | same | 0.05 | X | 0.19 | A | |
| 33 | Comparative Example J11 | D | 270 | 3.2 | — | — | Y | 0.74 | D | |
| 34 | Comparative Example J12 | D | 270 | 3.2 | — | — | X | 0.52 | D | patent document 7 |
| 35 | Comparative Example J13 | D | 270 | 3.2 | — | — | X | 0.60 | D | patent document 7 |
| 36 | Example J23 | D | 450 | 4.5 | same | 0.50 | X | 0.30 | A | |
| 37 | Example J24 | D | 450 | 4.5 | same | 0.05 | X | 0.25 | A | |
| 38 | Comparative Example J14 | D | 450 | 4.5 | — | — | Y | 0.64 | D | |
| 39 | Example J25 | D | 450 | 6.0 | same | 0.50 | X | 0.35 | A | |
| 40 | Example J26 | D | 450 | 6.0 | same | 0.05 | X | 0.31 | A | |
| 41 | Comparative Example J15 | D | 450 | 6.0 | — | — | Y | 0.70 | D | |
| 42 | Example J27 | E | 120 | 2.3 | same | 0.50 | X | 0.25 | B | |
| 43 | Example J28 | E | 120 | 2.3 | same | 0.05 | X | 0.23 | B | |
| 44 | Comparative Example J16 | E | 120 | 2.3 | — | — | Y | 0.78 | E | |
| 45 | Example J29 | F | 150 | 2.3 | same | 0.50 | X | 0.32 | B | |
| 46 | Example J30 | F | 150 | 2.3 | same | 0.05 | X | 0.30 | B | |
| 47 | Comparative Example J17 | F | 150 | 2.3 | — | — | Y | 0.72 | E | |
| 48 | Example J31 | G | 180 | 2.3 | same | 0.50 | X | 0.32 | B | |
| 49 | Example J32 | G | 180 | 2.3 | same | 0.05 | X | 0.29 | B | |
| 50 | Comparative Example J18 | G | 180 | 2.3 | — | — | Y | 0.71 | E | |
| 51 | Example J33 | H | 250 | 2.3 | same | 0.50 | X | 0.34 | C | |
| 52 | Example J34 | H | 250 | 2.3 | same | 0.05 | X | 0.28 | C | |
| 53 | Comparative Example J19 | H | 250 | 2.3 | — | — | Y | 0.72 | E | |
| 54 | Comparative Example J20 | I | 0 | 2.3 | same | 0.50 | X | 0.31 | E | |
| 55 | Comparative Example J21 | I | 0 | 2.3 | same | 0.05 | X | 0.33 | E | |
| 56 | Comparative Example J22 | I | 0 | 2.3 | — | — | Y | 0.73 | E | |

From Table 10 it can be seen that, in Examples J1 to J34, as a result of satisfying the relation of the aforementioned expression (3), the red rust occurrence area ratio of the evaluation surface after the 50-day exposure test was less than 75% for each sample. Note that, with regard to Examples J11 and J12, the sheet thickness was thin compared to the cut articles of the other Examples. Therefore, if the plated steel sheet is not firmly suppressed during the cutting process, the timing at which the cutting parts strike the plated steel sheet will deviate and skewing is liable to occur. However, the red rust occurrence area ratio of the evaluation surface after the 50-day exposure test remained at less than 75%. Further, because the cut articles of Examples J1 to J34 satisfied the relational expressions (4) and (5), it is surmised that stable corrosion resistance of the cut end face could be exhibited.

On the other hand, because Comparative Examples J1 to J11 and J14 to J19 did not satisfy the relations of the aforementioned expressions (3) to (5), the red rust occurrence area ratio of the evaluation surface after the 50-day exposure test was 75% or more in each of Comparative Examples J1 to J11 and J14 to J19. Further, with regard to Comparative Examples J12 and J13, evaluation of sheared articles which were sheared based on the technique disclosed in Patent Document 7 was performed. In this case also, because the relation of the aforementioned expression (5) was not satisfied, the red rust occurrence area ratio of the evaluation surface after the 50-day exposure test was 75% or more in each of Comparative Examples J12 and J13. Comparative Examples J20 to J22 were each a sheared article of a cold-rolled steel sheet without a plating layer. Therefore, although the shape of the cut end face of Comparative Examples J20 and J21 was similar to the shape of the cut end face of the Examples, because none of Comparative Examples J20 to J22 had corrosion resistance, the red rust occurrence area ratio of the evaluation surface after the 50-day exposure test was 75% or more in each of Comparative Examples J20 to J22.

Whilst preferred embodiments of the present invention have been described in detail above with reference to the accompanying drawings, the present invention is not limited to the above examples. It is clear that a person having common knowledge in the field of the art to which the present invention pertains will be able to contrive various examples of changes and modifications within the category of the technical idea described in the appended claims, and it should be understood that they also naturally belong to the technical scope of the present invention.

For example, although in the above embodiments the workpiece is a plated steel sheet, the present invention is not limited to this example. The workpiece may be any kind of workpiece formed by coating the surface of a base material with a coating material. For example, a metallic material such as a steel sheet may be used as a base material, and a material composed of Zn, Al or an alloy of these elements, an oxide coating, a painting material, a resin material or the like may be used as a coating material. Consequently, the workpiece may be a coated steel sheet obtained by coating the surface of a metallic material as a base material with paint, or may be a film-laminated steel sheet obtained by laminating a film on a steel sheet. Alternatively, it is also possible to produce a cut article from a clad material composed of a base material and a coating material. Examples of the clad material include an Ni-clad copper material having a Cu sheet as a base material and an Ni sheet as a coating material.

Note that, the workpiece is not limited to a material covered with only one layer, and may be covered with multiple layers. For example, the surface of the aforementioned plated steel sheet may be subjected to a chemical treatment, painting, laminating or the like.

Furthermore, according to the cutting method of the present invention, it is possible to also similarly form an article obtained by cutting a workpiece in which a resin material, such as plastic, was used as a base material, and a metallic material such as Cu, Cr, Ag, Au or Pt was used as a coating material.

When a resin material, such as plastic, that is covered with a metal is cut, electrical conductivity of the end face is lost. Further, when the exposed proportion of the resin is high, it is easy to become charged, and hence the occurrence of sparking or the like is a concern. Therefore, by cutting such a resin material by using the cutting method described above, it is possible to improve the electrical conductivity of the cut end face and to prevent charging.

Further, in the case of a clad material, the required purpose when cutting will differ depending on the combination with the workpiece as well as the intended use. However, by cutting the workpiece by using the aforementioned cutting method, the corrosion resistance and chemical resistance and the like of the base material of the cut end face can be improved. Further, the electrical conductivity, thermal conductivity, magnetism and the like of one part or all of the cut end face can be improved as compared with the conventional cutting method.

In the case of coating films and laminates, by cutting the workpiece using the aforementioned cutting method, as well as improving the corrosion resistance of the base material, it is also possible to suppress the occurrence of bulging underneath the coating film, improve the appearance because the base material is not exposed, and to improve the insulation property of one part of or all of the cut end face.

Thus, by cutting a workpiece by using the aforementioned cutting method, it is possible to cause a function which a coating material possesses at a flat surface to also be imparted at a cut end face. Note that, a function which a coating material possesses is not limited to the aforementioned example, and the function of the coating material can be exhibited according to the intended use of the coating material. In other words, by means of the cutting method according to the present embodiment, when cutting a workpiece, the occurrence of a situation in which the performance which the workpiece has is reduced after the cutting can be suppressed. This similarly applies with respect to cutting of an untreated material, and not only to cutting of a workpiece that was subjected to a surface treatment. For example, by using the cutting method according to the present embodiment, irrespective of the presence or absence of a coating material, a decrease in the fatigue life of the cut workpiece can be suppressed.

Note that, the following configurations are also included in the technical scope of the present invention.

(A1) A cutting method for cutting a workpiece subjected to a surface treatment, using a cutting tool including a die and a punch, the cutting method including:

arranging the workpiece between the die and the punch, and in a state in which a wedge-shaped first cutting part of the die and a wedge-shaped second cutting part of the punch are opposed, pushing the punch relatively to the die side to cut the workpiece.

(A2) The cutting method according to the above (A1), wherein:

a blank holder that is arranged between the die and the punch is provided in at least one of the die and the punch, and in a state in which the workpiece is held by the blank holder, the punch is pushed relatively to the die side.

(A3) The cutting method according to the above (A1) or (A2), wherein a front end angle $\theta_1$ of the first cutting part and a front end angle $\theta_2$ of the second cutting part are each 10° or more and 120° or less.

(A4) The cutting method according to the above (A3), wherein a front end angle $\theta_1$ of the first cutting part and a front end angle $\theta_2$ of the second cutting part are each 30° or more and 90° or less.

(A5) The cutting method according to the above (A3) or (A4), wherein $\theta_1/\theta_2$ or $\theta_2/\theta_1$ that is a ratio between a front end angle $\theta_1$ of the first cutting part and a front end angle $\theta_2$ of the second cutting part is less than 4.

(A6) The cutting method according to the above (A5), wherein $\theta_1/\theta_2$ or $\theta_2/\theta_1$ that is a ratio between a front end angle $\theta_1$ of the first cutting part and a front end angle $\theta_2$ of the second cutting part is less than 2.

(A7) The cutting method according to any one of the above (A1) to (A6), wherein a front end radius $R_1$ of the first cutting part and a front end radius $R_2$ of the second cutting part are each 0.5% or more and 35.0% or less of a sheet thickness.

(A8) The cutting method according to the above (A7), wherein the front end radius $R_1$ of the first cutting part and the front end radius $R_2$ of the second cutting part are each 3.0% or more and 10.0% or less of a sheet thickness.

(A9) The cutting method according to the above (A7) or (A8), wherein $R_1/R_2$ or $R_2/R_1$ that is a ratio between the front end radius $R_1$ of the first cutting part and the front end radius $R_2$ of the second cutting part is less than 100.

(A10) The cutting method according to the above (A9), wherein $R_1/R_2$ or $R_2/R_1$ that is a ratio between the front end radius $R_1$ of the first cutting part and the front end radius $R_2$ of the second cutting part is less than 10.

(A11) The cutting method according to any one of the above (A1) to (A10), wherein the die and the punch are caused to face each other with a front end position of the first cutting part and a front end position of the second cutting part aligned with each other.

(A12) The cutting method according to any one of the above (A1) to (A10), wherein, when the first cutting part of the die and the second cutting part of the punch are opposed, an amount of deviation between a front end position of the first cutting part and a front end position of the second cutting part is made 50% or less of a sheet thickness.

(A13) The cutting method according to any one of the above (A1) to (A12), wherein the first cutting part of the die and the second cutting part of the punch are an identical shape, and are arranged symmetrically with respect to the workpiece.

(A14) The cutting method according to any one of the above (A1) to (A13), wherein cutting of the workpiece is performed by a plurality of cutting processes.

(A15) The cutting method according to the above (A14), the plurality of cutting processes including a first cutting process, and a second cutting process that is performed after the first cutting process, wherein:

in the second cutting process, at least one of the following is performed:

a front end angle $\theta_1$ of the first cutting part in the second cutting process is made smaller than a front end angle $\theta_1$ of the first cutting part in the first cutting process, and a front end angle $\theta_2$ of the second cutting part in the second cutting process is made smaller than a front end angle $\theta_2$ of the second cutting part in the first cutting process;

and thereafter the workpiece is cut.

(A16) The cutting method according to the above (A14) or (A15), the plurality of cutting processes including a first cutting process, and a second cutting process that is performed after the first cutting process, wherein:

in the second cutting process, at least one of the following is performed:

a front end radius $R_1$ of the first cutting part in the second cutting process is made smaller than a front end radius $R_1$ of the first cutting part in the first cutting process, and a front end radius $R_2$ of the second cutting part in the second cutting process is made smaller than a front end radius $R_2$ of the second cutting part in the first cutting process;

and thereafter the workpiece is cut.

(A17) The cutting method according to any one of the above (A14) to (A16), wherein, among the plurality of cutting processes, when a front end radius of the first cutting part is defined as $R_1$, a front end radius of the second cutting part is defined as $R_2$, and a sheet thickness of the workpiece is defined as t, a stroke S of the punch in a first cutting process satisfies expression (a1) below:

$$(R_1+R_2) \leq S \leq \{t-(R_1+R_2)\} \tag{a1}$$

(A18) The cutting method according to the above (A17), wherein the stroke S of the punch in the first cutting process satisfies expression (a2) below:

$$(R_1+R_2) \times 2 \leq S \leq \{t-(R_1+R_2) \times 2\} \tag{a2}$$

(A19) The cutting method according to any one of the above (A1) to (A18) wherein:

a trimming width of the workpiece is a distance between one end portion of the workpiece and a cutting position of the workpiece, and when a front end radius of the first cutting part is defined as $R_1$, a front end radius of the second cutting part is defined as $R_2$, and a sheet thickness of the workpiece is defined as t, a trimming width D of the workpiece satisfies expression (a3) below:

$$R \leq D \leq 5t \tag{a3}$$

$R=\text{Min}(R_1, R_2)$.

(A20) The cutting method according to the above (A19), wherein a trimming width D of the workpiece satisfies expression (a4) below:

$$3R \leq D \leq t \tag{a4}$$

(A21) The cutting method according to any one of the above (A1) to (A20), wherein the workpiece is a material having a tensile strength of 270 MPa or more.

(A22) The cutting method according to the above (A21), wherein the workpiece is a material having a tensile strength of 590 MPa or more.

(A23) The cutting method according to any one of the above (A1) to (A22), wherein the workpiece is a plated metal sheet.

(A24) A cutting tool, including:

a die on which a workpiece can be placed, and which has a wedge-shaped first cutting part; and a punch which has a wedge-shaped second cutting part that is provided facing the first cutting part, and which is provided facing the die and so as to be movable relatively to the die side.

(A25) The cutting tool according to the above (A24), wherein, in a state in which the workpiece is arranged between the die and the punch, the workpiece is cut by the punch being pushed relatively to the die side.

(B1) A cutting method for cutting a workpiece subjected to a surface treatment, using a cutting tool including a die and a punch, wherein a wedge-shaped first cutting part of the die and a wedge-shaped second cutting part of the punch have an asymmetrical shape with respect to a normal line at a cutting edge, respectively, the cutting method including:

arranging the workpiece between the die and the punch, and in a state in which a wedge-shaped first cutting part of the die and a wedge-shaped second cutting part of the punch are opposed, pushing the punch relatively to the die side to cut the workpiece.

(B2) The cutting method according to the above (B1), wherein:

a blank holder that is arranged between the die and the punch is provided in at least one of the die and the punch, and in a state in which the workpiece is held by the blank holder, the punch is pushed relatively to the die side.

(B3) The cutting method according to the above (B1) or (B2), wherein a front end angle $\theta_1$ of the first cutting part and a front end angle $\theta_2$ of the second cutting part are each 10° or more and 120° or less.

(B4) The cutting method according to the above (B3), wherein a front end angle $\theta_1$ of the first cutting part and a front end angle $\theta_2$ of the second cutting part are each 30° or more and 90° or less.

(B5) The cutting method according to the above (B3) or (B4), wherein:

a front end angle $\theta_1$ of the first cutting part is divided into two angles $\theta_{1a}$ and $\theta_{1b}$ by a normal line at a cutting edge of the first cutting part, a front end angle $\theta_2$ of the second cutting part is divided into two angles $\theta_{2a}$ and $\theta_{2b}$ by a normal line at a cutting edge of the second cutting part, and $(\theta_{1a}-\theta_{1b})$ or $(\theta_{1b}-\theta_{1a})$ that is an angular difference between the angle $\theta_{1a}$ and the angle $\theta_{1b}$, and $(\theta_{2a}-\theta_{2b})$ or $(\theta_{2b}-\theta_{2a})$ that is an angular difference between the angle $\theta_{2a}$ and the angle $\theta_{2b}$ are each 5° or more and 450 or less.

(B6) The cutting method according to the above (B5), wherein $(\theta_{1a}-\theta_{1b})$ or $(\theta_{1b}-\theta_{1a})$ that is an angular difference between the angle $\theta_{1a}$ and the angle $\theta_{1b}$, and $(\theta_{2a}-\theta_{2b})$ or $(\theta_{2b}-\theta_{2a})$ that is an angular difference between the angle $\theta_{2a}$ and the angle $\theta_{2b}$ are each 10° or more and 30° or less.

(B7) The cutting method according to any one of the above (B1) to (B6), wherein:

when a front end radius $R_1$ of the first cutting part is taken as an average value of respective front end radii $R_{1a}$ and $R_{1b}$ of the first cutting part that are formed when the front end radius $R_1$ is divided in two by a normal line at a cutting edge of the first cutting part, and a front end radius $R_2$ of the second cutting part is taken as an average value of respective front end radii $R_{2a}$ and $R_{2b}$ of the second cutting part that are formed when the front end radius $R_2$ is divided in two by a normal line at a cutting edge of the second cutting part, the front end radii $R_1$ and $R_2$ are 0.5% or more and 35.0% or less of a sheet thickness, respectively.

(B8) The cutting method according to the above (B7), wherein the front end radii $R_1$ and $R_2$ are 3.0% or more and 10.0% or less of a sheet thickness, respectively.

(B9) The cutting method according to the above (B7) or (B8), wherein a ratio $R_{1a}/R_{1b}$ or $R_{1b}/R_{1a}$ between two front end radii formed when the front end radius $R_1$ of the first cutting part is divided in two, and a ratio $R_{2a}/R_{2b}$ or $R_{2b}/R_{2a}$ between two front end radii formed when the front end radius $R_2$ of the second cutting part is divided in two are each 1.1 or more and 100 or less.

(B10) The cutting method according to the above (B9), wherein a ratio $R_{1a}/R_{1b}$ or $R_{1b}/R_{1a}$ between two front end radii formed when the front end radius $R_1$ of the first cutting part is divided in two, and a ratio $R_{2a}/R_{2b}$ or $R_{2b}/R_{2a}$ between two front end radii formed when the front end radius $R_2$ of the second cutting part is divided in two are each 5 or more and 20 or less.

(B11) The cutting method according to any one of the above (B1) to (B10), wherein the die and the punch are arranged facing each other with a front end position of the first cutting part and a front end position of the second cutting part aligned with each other.

(B12) The cutting method according to any one of the above (B1) to (B10), wherein, when the first cutting part of the die and the second cutting part of the punch are opposed, an amount of deviation between a front end position of the first cutting part and a front end position of the second cutting part is made 50% or less of a sheet thickness.

(B13) The cutting method according to any one of the above (B1) to (B12), wherein the first cutting part of the die and the second cutting part of the punch are an identical shape, and are arranged symmetrically with respect to the workpiece.

(B14) The cutting method according to any one of the above (B1) to (B13), wherein cutting of the workpiece is performed by performing a plurality of cutting processes.

(B15) The cutting method according to any one of the above (B1) to (B14), wherein:

a trimming width of the workpiece is a distance between one end portion of the workpiece and a cutting position of the workpiece, and when:

a front end radius $R_1$ of the first cutting part is taken as an average value of respective front end radii $R_{1a}$ and $R_{1b}$ of the first cutting part that are formed when the front end radius $R_1$ is divided in two by a normal line at a cutting edge of the first cutting part, a front end radius $R_2$ of the second cutting part is taken as an average value of respective front end radii $R_{2a}$ and $R_{2b}$ of the second cutting part that are formed when the front end radius $R_2$ is divided in two by a normal line at a cutting edge of the second cutting part, and a sheet thickness of the workpiece is defined as t, a trimming width D of the workpiece satisfies expression (b1) below:

$$R \le D \le 5t \tag{b1}$$

$R = \text{Min}(R_{1a}, R_{1b}, R_{2a}, R_{2b})$.

(B16) The cutting method according to the above (B15), wherein a trimming width D of the workpiece satisfies expression (b2) below:

$$3R \le D \le t \tag{b2}$$

(B17) The cutting method according to any one of the above (B1) to (B16), wherein the workpiece is a material having a tensile strength of 270 MPa or more.

(B18) The cutting method according to the above (B17), wherein the workpiece is a material having a tensile strength of 590 MPa or more.

(B19) The cutting method according to any one of the above (B1) to (B18), wherein the workpiece is a plated metal sheet.

(B20) A cutting tool including:

a die on which a workpiece can be placed, and which has a wedge-shaped first cutting part, and a punch which has a wedge-shaped second cutting part that is provided facing the first cutting part, and which is provided facing the die and so as to be movable relatively to the die side, wherein:

the first cutting part and the second cutting part have an asymmetrical shape with respect to a normal line at a cutting edge, respectively.

(B21) The cutting tool according to the above (B20), wherein, in a state in which the workpiece is arranged between the die and the punch, the workpiece is cut by the punch being pushed relatively to the die side.

(C1) A cutting method for cutting a workpiece subjected to a surface treatment, including:

forming, from the workpiece, an intermediate material having a final shape region, and a surplus region provided along an edge of the final shape region; and using a cutting tool including a die and a punch in each of which a cutting part is formed in a closed shape in correspondence with the edge of the final shape region, in a state in which a wedge-shaped first cutting part of the die and a wedge-shaped second cutting part of the punch are opposed, pushing the punch relatively to the die side to cut the intermediate material.

(C2) The cutting method according to the above (C1), wherein the die and the punch are caused to face each other with a front end position of the first cutting part and a front end position of the second cutting part aligned with each other.

(C3) The cutting method according to the above (C1), wherein, when the first cutting part of the die and the second cutting part of the punch are opposed, an amount of deviation between a front end position of the first cutting part and a front end position of the second cutting part is 50% or less of a sheet thickness.

(C4) The cutting method according to any one of the above (C1) to (C3), wherein cutting of the intermediate material is performed by performing a plurality of cutting processes.

(C5) The cutting method according to the above (C4), the plurality of cutting processes including a first cutting process, and a second cutting process that is performed after the first cutting process, wherein:

in the second cutting process, at least one of the following is performed:

a front end angle $\theta_1$ of the first cutting part in the second cutting process is made smaller than a front end angle $\theta_1$ of the first cutting part in the first cutting process, and a front end angle $\theta_2$ of the second cutting part in the second cutting process is made smaller than a front end angle $\theta_2$ of the second cutting part in the first cutting process;

and thereafter the intermediate material is cut.

(C6) The cutting method according to the above (C4) or (C5), the plurality of cutting processes including a first cutting process, and a second cutting process that is performed after the first cutting process, wherein:

in the second cutting process, at least one of the following is performed:

a front end radius $R_1$ of the first cutting part in the second cutting process is made smaller than a front end radius $R_1$ of the first cutting part in the first cutting process, and a front end radius $R_2$ of the second cutting part in the second cutting process is made smaller than a front end radius $R_2$ of the second cutting part in the first cutting process;

and thereafter the intermediate material is cut.

(C7) The cutting method according to any one of the above (C4) to (C6), wherein, among the plurality of cutting processes, when a front end radius of the first cutting part is defined as $R_1$, a front end radius of the second cutting part is defined as $R_2$, and a sheet thickness of the workpiece is defined as t, a stroke S of the punch in a first cutting process satisfies expression (c1) below:

$$(R_1+R_2) \leq S \leq \{t-(R_1+R_2)\} \quad (c1)$$

(C8) The cutting method according to the above (C7), wherein the stroke S of the punch in the first cutting process satisfies expression (c2) below:

$$(R_1+R_2) \times 2 \leq S \leq \{t-(R_1+R_2) \times 2\} \quad (c2)$$

(C9) The cutting method according to any one of the above (C1) to (C8), wherein:

when cutting the intermediate material, a trimming width of the intermediate material is a distance between one end portion of the intermediate material and a cutting position of the intermediate material that is an edge of the final shape region; and when a front end radius of the first cutting part is defined as $R_1$, a front end radius of the second cutting part is defined as $R_2$, and a sheet thickness of the workpiece is defined as t, a trimming width D of the intermediate material satisfies expression (c3) below:

$$R \leq D \leq 5t \quad (c3)$$

$R = \mathrm{Min}(R_1, R_2)$.

(C10) The cutting method according to the above (C9), wherein the trimming width D of the intermediate material satisfies expression (c4) below:

$$3R \leq D \leq t \quad (c4).$$

(C11) The cutting method according to any one of the above (C1) to (C10), wherein forming of the intermediate material is performed by punching, piercing, or laser cutting.

(C12) The cutting method according to any one of the above (C1) to (C11), wherein, in a case where the intermediate material does not rupture during cutting of the intermediate material, the cutting method further includes cutting off the surplus region from the intermediate material.

(C13) The cutting method according to any one of the above (C1) to (C12), wherein, in the process for forming the intermediate material, among portions which were divided in two by removing a closed region from the workpiece, a portion in which a through-hole is formed by removing the closed region is adopted as the intermediate material.

(C14) The cutting method according to any one of the above (C1) to (C12) wherein, in the process for forming the intermediate material, among portions which were divided in two by removing a closed region from the workpiece, a portion of the closed region that is extracted from the workpiece is adopted as the intermediate material.

(C15) The cutting method according to any one of the above (C1) to (C14), wherein the workpiece is a material having a tensile strength of 270 MPa or more.

(C16) The cutting method according to the above (C15), wherein the workpiece is a material having a tensile strength of 590 MPa or more.

(C17) The cutting method according to any one of the above (C1) to (C16), wherein the workpiece is a plated metal sheet.

REFERENCE SIGNS LIST

3 Cut Article
3a Cut End Face
Workpiece (Plated Steel Sheet)
5a Metallic Material (Steel Sheet)
5b Coating Layer (Plating)
50, 100 Cutting Tool
51, 110 Die
111, 121 Base
113 First Cutting Part
52, 120 Punch
123 Second Cutting Part
130 Blank Holder
131, 132, 133, 134, 140 Pad

The invention claimed is:

1. A cutting method for cutting a workpiece using a cutting tool comprising a die and a punch, including:
arranging the workpiece between the die and the punch, and
arranging a wedge-shaped first cutting part of the die opposite a wedge-shaped second cutting part of the punch, and pushing the punch relatively to the die to cut the workpiece;
the method further including:
providing a front end angle ($\theta_1$) of the first cutting part and a front end angle ($\theta_2$) of the second cutting part, each being 10° or more and 120° or less, and providing a front end radius ($R_1$) of the first cutting part and a front end radius ($R_2$) of the second cutting part, each being 0.5% or more and 35.0% or less of a sheet thickness.

2. The cutting method according to claim 1, wherein arranging the workpiece includes providing a multi-layer material workpiece formed by coating a surface of a base material with a coating material.

3. The cutting method according to claim 1, wherein providing the front end angle ($\theta_1$) of the first cutting part and the front end angle ($\theta_2$) of the second cutting part includes providing the front end angle ($\theta_1$) of the first cutting part and the front end angle ($\theta_2$) of the second cutting part, each being 30° or more and 90° or less.

4. The cutting method according to claim 1, wherein providing the front end radius ($R_1$) of the first cutting part and the front end radius ($R_2$) of the second cutting part includes providing the front end radius ($R_1$) of the first cutting part and the front end radius ($R_2$) of the second cutting part, each being 1.5% or more and 10.0% or less of a sheet thickness.

5. The cutting method according to claim 1, the method further including cutting of the workpiece by a plurality of cutting processes.

6. The cutting method according to claim 5, wherein:
cutting the workpiece by the plurality of cutting processes includes a first cutting process, and a second cutting process that is performed after the first cutting process; and
performing at least one of the following in the second cutting process:
providing a front end angle ($\theta_1$) of the first cutting part in the second cutting process is smaller than a front end angle ($\theta_1$) of the first cutting part in the first cutting process, and
providing a front end angle ($\theta_2$) of the second cutting part in the second cutting process is smaller than a front end angle ($\theta_2$) of the second cutting part in the first cutting process,
and thereafter the workpiece is cut.

7. The cutting method according to claim 5, wherein:
cutting the workpiece by the plurality of cutting processes includes a first cutting process, and a second cutting process that is performed after the first cutting process; and
performing at least one of the following in the second cutting process:
providing a front end radius ($R_1$) of the first cutting part in the second cutting process is smaller than a front end radius ($R_1$) of the first cutting part in the first cutting process, and
providing a front end radius ($R_2$) of the second cutting part in the second cutting process is smaller than a front end radius ($R_2$) of the second cutting part in the first cutting process;
and thereafter the workpiece is cut.

8. The cutting method according to claim 5, wherein:
when performing the plurality of cutting processes, providing a front end radius of the first cutting part defined as ($R_1$), a front end radius of the second cutting part defined as ($R_2$), and a sheet thickness of the workpiece defined as (t), and a stroke(S) of the punch in a first cutting process satisfies expression (A) below:

$$(R_1+R_2) \leq S \leq \{t-(R_1+R_2)\} \quad\quad (A).$$

9. The cutting method according to claim 1, the method further including:
defining a trimming width of the workpiece is a distance between one end portion of the workpiece and a cutting position of the workpiece, and
satisfying an expression (B) of a trimming width (d) via the expression (B) below, $$R \leq D \leq 3t \quad\quad (B)$$

R=Min ($R_1$, $R_2$)
when a front end radius of the first cutting part is defined as ($R_1$), a front end radius of the second cutting part is defined as ($R_2$), and a sheet thickness of the workpiece is defined as (t).

10. The cutting method according to claim 1, the method further comprising:
providing a wedge-shaped first cutting part of the die and a wedge-shaped second cutting part of the punch having an asymmetrical shape with respect to a normal line at a cutting edge, respectively.

11. The cutting method according to claim 10, the method further comprising:
dividing a front end angle ($\theta_1$) of the first cutting part into two angles ($\theta_{1a}$) and ($\theta_{1b}$) by a normal line at a cutting edge of the first cutting part,
dividing a front end angle ($\theta_2$) of the second cutting part into two angles ($\theta_{2a}$) and ($\theta_{2b}$) by a normal line at a cutting edge of the second cutting part, and
($\theta_{1a}-\theta_{1b}$) or ($\theta_{1b}-\theta_{1a}$) that is an angular difference between the angle ($\theta_{1a}$) and the angle ($\theta_{1b}$), and ($\theta_{2a}-\theta_{2b}$) or ($\theta_{2b}-\theta_{2a}$) that is an angular difference between the angle ($\theta_{2a}$) and the angle($\theta_{2b}$) are each 5° or more and 45° or less.

12. The cutting method according to claim 10, the method further comprising:
providing a front end radius ($R_1$) of the first cutting part is taken as an average value of respective front end radii ($R_{1a}$) and ($R_{1b}$) of the first cutting part that are formed when the front end radius ($R_1$) is divided in two by a normal line at a cutting edge of the first cutting part, and
providing a front end radius ($R_2$) of the second cutting part is taken as an average value of respective front end radii ($R_{2a}$) and ($R_{2b}$) of the second cutting part that are formed when the front end radius ($R_2$) is divided in two by a normal line at a cutting edge of the second cutting part,
the front end radii ($R_1$) and ($R_2$) are 0.5% or more and 35.0% or less of a sheet thickness, respectively.

13. The cutting method according to claim 12, the method further comprising:
dividing a ratio $R_{1a}/R_{1b}$ or $R_{1b}/R_{1a}$ between two front end radii formed when the front end radius ($R_1$) of the first cutting part in two, and dividing a ratio $R_{2a}/R_{2b}$ or $R_{2b}/R_{2a}$ between two front end radii formed when the front end radius ($R_2$) of the second cutting part in two are each 1.1 or more and 100 or less.

14. The cutting method according to claim 1, comprising:
forming, from the workpiece, an intermediate material having a final shape region, and a surplus region provided along an edge of the final shape region; and
using a cutting tool including a die and a punch in each of which a cutting part is formed in a closed shape in correspondence with the edge of the final shape region, in a state in which a wedge-shaped first cutting part of the die and a wedge-shaped second cutting part of the punch are opposed, pushing the punch relatively to the die side to cut the intermediate material.

* * * * *